(12) United States Patent
Hayes

(10) Patent No.: US 7,193,029 B2
(45) Date of Patent: *Mar. 20, 2007

(54) SULFONATED COPOLYETHERESTER COMPOSITIONS FROM HYDROXYALKANOIC ACIDS AND SHAPED ARTICLES PRODUCED THEREFROM

(75) Inventor: Richard Allen Hayes, Brentwood, TN (US)

(73) Assignee: E. I. du Pont de Nemours and Company, Wilmington, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/888,046

(22) Filed: Jul. 9, 2004

(65) Prior Publication Data

US 2006/0009610 A1  Jan. 12, 2006

(51) Int. Cl.
  *C08G 63/02*   (2006.01)
  *C08G 63/688*  (2006.01)
  *C08G 63/18*   (2006.01)
  *C08G 63/66*   (2006.01)
  *C08F 20/00*   (2006.01)
  *C08K 3/00*    (2006.01)
  *B65B 53/00*   (2006.01)
  *B29D 29/00*   (2006.01)
  *B32B 1/08*    (2006.01)
  *B32B 27/00*   (2006.01)

(52) U.S. Cl. ............... 528/293; 528/296; 528/298; 528/300; 528/301; 528/302; 528/307; 528/308; 528/308.6; 525/437; 525/444; 525/450; 524/401; 428/34.9; 428/37.7; 428/36.4; 428/36.5; 428/221; 428/480; 428/482; 428/364

(58) Field of Classification Search ......... 528/293, 528/296, 298, 300, 301, 302, 307, 308, 308.6, 528/361; 525/437, 444, 450; 524/401; 428/34.9, 428/35.7, 36.4, 36.5, 221, 480, 482, 364
  See application file for complete search history.

(56) References Cited

U.S. PATENT DOCUMENTS

| | | | |
|---|---|---|---|
| 2,828,290 A | 3/1958 | Caldwell | |
| 3,784,585 A | 1/1974 | Schmitt et al. | |
| 4,729,927 A | 3/1988 | Hirose et al. | |
| 5,097,004 A | 3/1992 | Gallagher et al. | |
| 5,097,005 A * | 3/1992 | Tietz | 528/272 |
| 5,171,308 A | 12/1992 | Gallagher et al. | |
| 5,173,357 A | 12/1992 | Nakane et al. | |
| 5,219,646 A | 6/1993 | Gallagher et al. | |
| 5,295,985 A | 3/1994 | Romesser et al. | |
| 5,401,796 A | 3/1995 | Kashima et al. | |
| 5,428,126 A | 6/1995 | Kashima et al. | |
| 5,475,080 A | 12/1995 | Gruber et al. | |
| 5,593,778 A | 1/1997 | Kondo et al. | |
| 5,605,981 A | 2/1997 | Imamura et al. | |
| 5,616,657 A | 4/1997 | Imamura et al. | |
| 5,637,631 A | 6/1997 | Kitada et al. | |
| 5,714,230 A | 2/1998 | Kameoka et al. | |
| 5,763,098 A | 6/1998 | Kameoka et al. | |
| 5,817,721 A | 10/1998 | Warzelhan et al. | |
| 5,821,327 A | 10/1998 | Oota et al. | |
| 5,889,135 A | 3/1999 | Warzelhan et al. | |
| 6,018,004 A | 1/2000 | Warzelhan et al. | |
| 6,051,663 A | 4/2000 | Yamamoto et al. | |
| 6,258,924 B1 | 7/2001 | Warzelhan et al. | |
| 6,303,677 B1 | 10/2001 | Warzelhan et al. | |
| 6,342,304 B1 | 1/2002 | Buchanan et al. | |
| 6,358,604 B1 | 3/2002 | Peiffer et al. | |
| 6,414,108 B1 | 7/2002 | Warzelhan et al. | |
| 2003/0207110 A1 | 11/2003 | Matsui et al. | |

FOREIGN PATENT DOCUMENTS

| | | |
|---|---|---|
| EP | 1 054 085 A1 | 11/2000 |
| JP | 9052965 A | 2/1997 |
| WO | WO 91/02015 | 2/1991 |
| WO | WO 92/13019 | 8/1992 |
| WO | WO 92/13020 | 8/1992 |
| WO | WO 95/16562 | 6/1995 |
| WO | WO 00/01530 | 1/2000 |
| WO | WO 02/059201 A1 | 8/2002 |
| WO | WO 2004/011524 A2 | 2/2004 |
| WO | WO 2004/037888 A2 | 5/2004 |

OTHER PUBLICATIONS

C. Irwin, "Blow Molding", Encyclopedia of Polymer Science and Engineering, Second Edition, 1985, pp. 447-478, vol. 2, John Wiley and Sons, New York.
Kirk-Othmer, Encyclopedia of Chemical Technology, Third Edition, 1980, pp. 82-145, vol. 11, John Wiley & Sons, New York, NY.
Encyclopedia of Polymer Science and Engineering, Second Edition, 1985, pp. 434-446, vol. 2, John Wiley & Sons, New York, NY.
PCT International Search Report for PCT application No. PCT/US2005/024386, dated Oct. 31, 2005.

* cited by examiner

Primary Examiner—Nathan M. Nutter
(74) Attorney, Agent, or Firm—Gail A. Dalickas

(57) ABSTRACT

The present invention provides certain sulfonated copolyetherester compositions containing hydroxyalkanoic acids and processes for producing such sulfonated aromatic copolyetheresters. The invention further provides shaped articles, preferably in the shape of films, coatings and laminates, having improved thermal properties, wherein the shaped articles are produced from the certain sulfonated copolyetherester compositions. Some of these materials are also biocompastable. The sulfonated copolyetheresters are produced from a mixture of an aromatic dicarboxylic acid component, hydroxyalkanoic acid component, a sulfonate component, a poly(alkylene ether) glycol component, a glycol component, an optional other glycol component, an optional branching agent, and an optional color reducing agent.

80 Claims, No Drawings

SULFONATED COPOLYETHERESTER COMPOSITIONS FROM HYDROXYALKANOIC ACIDS AND SHAPED ARTICLES PRODUCED THEREFROM

FIELD OF THE INVENTION

The present invention relates to polyesters, in particular sulfonated copolyetheresters made using hydroxyalkanoic acids and containing hydroxyalkanoic acid residues. The present invention also relates to shaped articles made from the sulfonated copolyetheresters.

BACKGROUND

The present invention overcomes the shortcomings of the background art and provides sulfonated aromatic copolyetheresters containing hydroxyalkanoic acids with improved thermal properties, such as crystalline melting points, glass transition temperatures, and heat deflection temperatures, as compared to comparable art sulfonated aromatic copolyetheresters that contain hydroxyalkanoic acids.

Copolyesters of poly(hydroxyalkanoates) with aromatic dicarboxylic acids are known. For example, Gordon et al., in WO 91/02015, disclose hydrodegradable aliphatic-aromatic copolyesters that may include hydroxy acids. Imamura et al., in U.S. Pat. No. 5,605,981 and U.S. Pat. No. 5,616,657, disclose a process for the preparation of certain lactic acid copolyesters comprising 50–98 wt. % lactide. Warzelhan et al., in U.S. Pat. No. 5,817,721; U.S. Pat. No. 5,889,135; U.S. Pat. No. 6,018,004; and U.S. Pat. No. 6,303,677, disclose certain aliphatic-aromatic copolyesters containing hydroxy acids. Buchanan et al., in U.S. Pat. No. 6,342,304, disclose oriented films derived from linear aliphatic-aromatic copolyesters prepared from polyester forming combinations of hydroxy acids, dicarboxylic acids or derivatives thereof, and diols.

Copolyesters of poly(hydroxyalkanoates) with aromatic dicarboxylic acids and sulfonate functionality are known. For example, Gallagher et al. in U.S. Pat. No. 5,097,004, U.S. Pat. No. 5,171,308, and U.S. Pat. No. 5,219,646; Tietz in U.S. Pat. No. 5,097,005; and Romesser et al. in U.S. Pat. No. 5,295,985 disclose certain sulfonated aromatic copolyesters containing 2 to 40 wt. % of a hydroxy acid component. Warzelhan et al., in U.S. Pat. No. 6,018,004 and U.S. Pat. No. 6,303,677, disclose sulfonated aliphatic-aromatic copolyesters containing hydroxy acids.

Copolyesters of poly(hydroxyalkanoates) with aromatic dicarboxylic acid having sulfonate functionality and poly(alkylene ether) glycol components are also known. For example, Gallagher et al., in U.S. Pat. No. 5,097,004 and U.S. Pat. No. 5,219,646, disclose certain sulfonated aromatic copolyesters containing 2 to 40 wt. % of a hydroxy acid component and a poly(alkylene ether) glycol component.

Some of the known sulfonated aromatic copolyetheresters that contain hydroxyalkanoic acid components have inadequate thermal properties for some applications, as evidenced by the low observed crystalline melting temperatures and glass transition temperatures. The present invention provides sulfonated aromatic copolyetheresters that contain hydroxyalkanoic acids with improved thermal properties, such as crystalline melting points, glass transition temperatures, and heat deflection temperatures, as compared to conventional aromatic copolyetheresters that contain hydroxyalkanoic acids.

SUMMARY OF THE INVENTION

One aspect of the present invention is a sulfonated aromatic copolyetherester that incorporates from about 1.0 to about 99.0 mole percent of a hydroxyalkanoic acid component and about 0.1 to about 30.0 mole percent of a poly(alkylene ether) glycol component, and processes for producing the sulfonated aromatic copolyetherester. The sulfonated aromatic copolyetheresters are comprised essentially of from about 98.9 to about 1.0 mole percent of an aromatic dicarboxylic acid component based on 100 mole percent total acid component; from about 1.0 to about 99.0 mole percent of a hydroxyalkanoic acid component selected from lactic acid, glycolic acid and mixtures thereof based on 100 mole percent total acid component; from about 0.1 to about 10.0 mole percent of a sulfonate component based on 100 mole percent total acid component; from about 98.9 to about 1.0 mole percent of a single first glycol component selected from ethylene glycol, 1,3-propanediol and 1,4-butanediol based on 100 mole percent total glycol component; from about 0.1 to about 30.0 mole percent of a poly(alkylene ether) glycol component based on 100 mole percent total glycol component; from about 0 to about 5.0 mole percent of an other glycol component based on 100 mole percent total glycol component; from about 0 to about 5.0 mole percent of a polyfunctional branching agent selected from polyfunctional acid, glycol, and mixtures thereof based on 100 mole percent of total acid component; and optionally an effective amount of a color reducing agent. In some preferred embodiments the sulfonated aromatic copolyetherester composition also contains fillers. At least some of the sulfonated aromatic copolyetheresters produced in accordance with the present invention are biodegradable.

A further aspect of the present invention includes shaped articles produced from sulfonated aromatic copolyetheresters that incorporate from about 1.0 to about 99.0 mole percent of a hydroxyalkanoic acid component and about 0.1 to about 30.0 mole percent of a poly(alkylene ether) glycol component, and processes for producing same. The sulfonated aromatic copolyetheresters are comprised essentially of from about 98.9 to about 1.0 mole percent of an aromatic dicarboxylic acid component based on 100 mole percent total acid component; from about 1.0 to about 99.0 mole percent of a hydroxyalkanoic acid component selected from lactic acid, glycolic acid and mixtures thereof based on 100 mole percent total acid component; from about 0.1 to about 10.0 mole percent of a sulfonate component based on 100 mole percent total acid component; from about 98.9 to about 1.0 mole percent of a single first glycol component selected from ethylene glycol, 1,3-propanediol and 1,4-butanediol based on 100 mole percent total glycol component; from about 0.1 to about 30.0 mole percent of a poly(alkylene ether) glycol component based on 100 mole percent total glycol component; from about 0 to about 5.0 mole percent of an other glycol component based on 100 mole percent total glycol component; from about 0 to about 5.0 mole percent of a polyfunctional branching agent selected from polyfunctional acid, glycol, and mixtures thereof based on 100 mole percent of total acid component; and optionally an effective amount of a color reducing agent. In some preferred embodiments the sulfonated aromatic copolyetherester composition also contains fillers. At least some of the sulfonated aromatic copolyetheresters used to produce the shaped articles are biodegradable.

A further aspect of the present invention includes sulfonated aromatic copolyetheresters that incorporate from about 1.0 to about 99.0 mole percent of a hydroxyalkanoic acid component and from about 0.1 to about 30.0 mole percent of a poly(alkylene ether) glycol component, wherein the sulfonated aromatic copolyetheresters are filled with from about 0.01 to about 80 wt. % fillers based on total wt. of the final composition and processes to produce same. The sulfonated aromatic copolyetheresters are comprised essentially of from about 98.9 to about 1.0 mole percent of an aromatic dicarboxylic acid component based on 100 mole percent total acid component; from about 1.0 to about 99.0 mole percent of a hydroxyalkanoic acid component selected from lactic acid, glycolic acid and mixtures thereof based on 100 mole percent total acid component; from about 0.1 to about 10.0 mole percent of a sulfonate component based on 100 mole percent total acid component; from about 98.9 to about 1.0 mole percent of a single first glycol component selected from ethylene glycol, 1,3-propanediol and 1,4-butanediol based on 100 mole percent total glycol component; from about 0.1 to about 30.0 mole percent of a poly(alkylene ether) glycol component based on 100 mole percent total glycol component; from about 0 to about 5.0 mole percent of an other glycol component based on 100 mole percent total glycol component; from about 0 to about 5.0 mole percent of a polyfunctional branching agent selected from polyfunctional acid, glycol, and mixtures thereof based on 100 mole percent of total acid component; and optionally an effective amount of a color reducing agent. At least some of the above described filled sulfonated aromatic copolyetheresters are biodegradable. In some preferred embodiments, shaped articles are produced from the filled sulfonated aromatic copolyetheresters.

In some preferred embodiments the shaped articles comprising the sulfonated aromatic copolyetheresters of the present invention include, but are not limited to, films; sheets; wraps; fibers; melt blown containers; molded parts, such as cutlery; foamed parts; coatings; polymeric melt extrusion coatings on a substrate; polymeric solution coatings on a substrate; and laminates.

A further preferred aspect of the present invention includes films comprised of sulfonated aromatic copolyetheresters that incorporate from about 1.0 to about 99.0 mole percent of a hydroxyalkanoic acid component and from about 0.1 to about 30.0 mole percent of a poly(alkylene ether) glycol component and processes to produce same. The sulfonated aromatic copolyetheresters are comprised essentially of from about 98.9 to about 1.0 mole percent of an aromatic dicarboxylic acid component based on 100 mole percent total acid component; from about 1.0 to about 99.0 mole percent of a hydroxyalkanoic acid component selected from lactic acid, glycolic acid and mixtures thereof based on 100 mole percent total acid component; from about 0.1 to about 10.0 mole percent of a sulfonate component based on 100 mole percent total acid component; from about 98.9 to about 1.0 mole percent of a single first glycol component selected from ethylene glycol, 1,3-propanediol and 1,4-butanediol based on 100 mole percent total glycol component; from about 0.1 to about 30.0 mole percent of a poly(alkylene ether) glycol component based on 100 mole percent total glycol component; from about 0 to about 5.0 mole percent of an other glycol component based on 100 mole percent total glycol component; from about 0 to about 5.0 mole percent of a polyfunctional branching agent selected from polyfunctional acid, glycol, and mixtures thereof based on 100 mole percent of total acid component; and optionally an effective amount of a color reducing agent. In some preferred embodiments the sulfonated aromatic copolyetherester composition also contains fillers. At least some of the sulfonated aromatic copolyetheresters produced in accordance with the present invention are biodegradable.

In some embodiments, the films comprising the sulfonated aromatic copolyetheresters of the present invention are either uniaxially, or biaxially oriented.

In some preferred embodiments, the films comprising the sulfonated aromatic copolyetheresters of the present invention are laminated onto substrates, wherein the substrates may include, for example, paper, paperboard, inorganic foams, organic foams, and inorganic-organic foams.

In other preferred embodiments, the films comprising the sulfonated aromatic copolyetheresters of the present invention are coated onto substrates, wherein the substrates may include, for example, paper, paperboard, inorganic foams, organic foams, and inorganic-organic foams.

The films, including the laminated and coated films, comprising the sulfonated aromatic copolyetheresters of the present invention have an optimized balance of physical properties, such as toughness, thermal dimensional stability and moisture barrier, as compared to films, including coated and laminated films, of comparable sulfonated aromatic copolyetheresters of the art.

A further preferred aspect of the present invention includes using the films, including an oriented film, such as a uniaxially oriented or biaxially oriented film, comprising the sulfonated aromatic copolyetheresters of the present invention for food packaging end uses, especially disposable food packaging end uses, such as food wraps. The food packaging films, including the oriented films, of the sulfonated aromatic copolyetheresters of the present invention have an optimized balance of physical properties, such as toughness, thermal dimensional stability, deadfold performance, and moisture barrier, as compared to food packaging films of comparable sulfonated aromatic copolyetheresters of the art.

A further preferred aspect of the present invention includes using laminated or coated films comprising the sulfonated aromatic copolyetheresters of the present invention for food packaging end uses, especially disposable food packaging end uses, such as food wraps. The food packaging or food service laminated films of the present invention, as well as, the food packaging or food service coated films of the present invention have an optimized balance of physical properties, such as toughness, thermal dimensional stability and moisture barrier, as compared to either food packaging or food service laminated films, or food packaging or food service coated films comprised of comparable sulfonated aromatic copolyetheresters of the art.

DETAILED DESCRIPTION OF THE INVENTION

The features and advantages of the present invention will be more readily understood by those of ordinary skill in the art upon reading the following detailed description. It is to be appreciated that certain features of the invention that are, for clarity reasons, described above and below in the context of separate embodiments, may also be combined to form a single embodiment. Conversely, various features of the invention that are, for brevity reasons, described in the context of a single embodiment, may be combined so as to form sub-combinations thereof.

Moreover, unless specifically stated otherwise herein, references made in the singular may also include the plural (for example, "a" and "an" may refer to either one, or one or more). In addition, unless specifically stated otherwise herein, the minimum and maximum values of any of the variously stated numerical ranges used herein are only approximations that are understood to be preceded by the word "about" so that slight variations above and below the stated ranges can be used to achieve substantially the same results as those values within the stated ranges. Moreover, each of the variously stated ranges are intended to be continuous so as to include every value between the stated minimum and maximum value of each of the ranges.

All patents, patent applications and publications referred to herein are incorporated by reference.

The present invention is directed to compositions comprising sulfonated aromatic copolyetheresters containing a hydroxyalkanoic acid component; shaped articles, such as films, coatings, and laminates, produced therefrom; and processes for producing same. The present invention is further directed to a substrate, such as, for example, paper, paperboard, inorganic foam, organic foam, and inorganic-organic foam, as well as, food packaging end uses, especially disposable food packaging, such as, for example, wraps, cups, bowls, and plates, wherein the substrates and food packaging are coated or laminated with a film comprising the copolyetherester composition of the present invention.

The sulfonated aromatic copolyetheresters consist essentially of, 98.9 to 1.0 mole percent of an aromatic dicarboxylic acid component based on 100 mole percent total acid component;

1.0 to 99.0 mole percent of a hydroxyalkanoic acid selected from lactic acid, glycolic acid and mixtures thereof based on 100 mole percent total acid component;

0.1 to 10.0 mole percent of a sulfonate component based on 100 mole percent total acid component;

about 98.9 to about 1.0 mole percent of a single first glycol component selected from ethylene glycol, 1,3-propanediol, and 1,4-butanediol based on 100 mole percent total glycol component;

0.1 to 30.0 mole percent of a poly(alkylene ether) glycol component based on 100 mole percent total glycol component;

0 to about 5.0 mole percent of an other glycol component based on 100 mole percent total glycol component;

0 to about 5.0 mole percent of a polyfunctional branching agent selected from polyfunctional acid, glycol, and mixtures thereof based on 100 mole percent total acid component; and optionally an effective amount of a color reducing agent component.

"Total acid component", as used herein, is defined as being the summation of the aromatic dicarboxylic acid component, the hydroxyalkanoic acid component, the sulfonate component (when applicable), and the optional polyfunctional branching agent "Total glycol component" as used herein, is defined as being the summation of the first single glycol component, poly(alkylene ether) glycol component, and other glycol component.

It is of import to note that the mole percent of the total glycol component will necessarily be less than 100 mole percent because the hydroxyacid component is defined as being part of the acid component, and not the glycol component. That is, the amount of glycol component maxes out at 99 mole percent because there is a minimum of 1 mole percent of hydroxyacid component present, and this 1 mole percent of hydroxyacid is included in the mole percent of the total acid component.

Preferably, the aromatic dicarboxylic acid component is selected from unsubstituted and substituted aromatic dicarboxylic acids, lower alkyl esters of aromatic dicarboxylic acids having from 8 to 20 carbons, and bisglycolate esters of aromatic dicarboxylic acids. Examples of desirable diacid moieties include, but are not limited to, those derived from terephthalates, isophthalates, naphthalates and bibenzoates. Examples of the aromatic dicarboxylic acid component include, but are not limited to, terephthalic acid; dimethyl terephthalate; isophthalic acid; dimethyl isophthalate; 2,6-naphthalene dicarboxylic acid; dimethyl-2,6-naphthalate; 2,7-naphthalene dicarboxylic acid; dimethyl-2,7-naphthalate; 3,4'-diphenyl ether dicarboxylic acid; dimethyl-3,4'diphenyl ether dicarboxylate; 4,4'-diphenyl ether dicarboxylic acid; dimethyl-4,4'-diphenyl ether dicarboxylate; 3,4'-diphenyl sulfide dicarboxylic acid; dimethyl-3,4'-diphenyl sulfide dicarboxylate; 4,4'-diphenyl sulfide dicarboxylic acid; dimethyl-4,4'-diphenyl sulfide dicarboxylate; 3,4'-diphenyl sulfone dicarboxylic acid; dimethyl-3,4'-diphenyl sulfone dicarboxylate; 4,4'-diphenyl sulfone dicarboxylic acid; dimethyl-4,4'-diphenyl sulfone dicarboxylate; 3,4'-benzophenone dicarboxylic acid; dimethyl-3,4'-benzophenone dicarboxylate; 4,4'-benzophenone dicarboxylic acid; dimethyl-4,4'-benzophenone dicarboxylate; 1,4-naphthalene dicarboxylic acid; dimethyl-1,4-naphthalate; 4,4'-methylene bis(benzoic acid); dimethyl-4,4'-methylenebis(benzoate); bis(2-hydroxyethyl)terephthalate; bis(2-hydroxyethyl)isophthalate; bis(3-hydroxypropyl)terephthalate; bis(4-hydroxybutyl)terephthalate; bis(4-hydroxybutyl)isophthalate; bis(3-hydroxypropyl)isophthalate, and mixtures derived therefrom. Preferably, the aromatic dicarboxylic acid component is derived from terephthalic acid; dimethyl terephthalate; isophthalic acid; dimethyl isophthalate; 2,6-naphthalene dicarboxylic acid; dimethyl-2,6-naphthalate; and mixtures derived therefrom. This should not be considered limiting. Essentially any aromatic dicarboxylic acid known in the art may find utility within the present invention. Preferably, the aromatic dicarboxylic acid component is selected from terephthalic acid; isophthalic acid; lower alkyl esters, such as dimethyl terephthalate and dimethyl isophthalate; and glycolate esters, such as bis(2-hydroxyethyl) terephthalate, bis(2-hydroxyethyl)isophthalate, bis(3-hydroxypropyl)terephthalate, bis(3-hydroxypropyl) isophthalate, bis(4-hydroxybutyl)terephthalate, bis(4-hydroxybutyl)isophthalate; and mixtures thereof.

Preferably, the sulfonated aromatic copolyetherester compositions of the present invention contain from about 98.9 to about 30 mole percent aromatic dicarboxylic acid component, more preferably from about 98.9 to about 50 mole percent, and even more preferably from about 95 to about 50 mole percent.

Preferably, the hydroxyalkanoic acid component is selected from lactic acid; glycolic acid; lower alkyl esters having 2 to 10 carbon atoms; glycolate esters of lactic acid; glycolate esters of glycolic acid; cyclic dimers of lactic acid; cyclic dimers of glycolic acid; oligomers and polymers of lactic acid; and oligomers and polymers of glycolic acid. Examples of the hydroxyalkanoic acid component include, but are not limited to, lactic acid; DL-lactic acid; L-lactic acid, glycolic acid; methyl lactate; methyl (R)-(+)-lactate; methyl (S)-(−)-lactate; methyl glycolate; ethyl lactate; ethyl (R)-(+)-lactate; ethyl (S)-(−)-lactate; ethyl glycolate; (2-hydroxyethyl)lactate; (2-hydroxyethyl) (R)-(+)-lactate; (2-hydroxyethyl) (S)-(−)-lactate; (3-hydroxypropyl)lactate; (3-hydroxypropyl) (R)-(+)-lactate; (3-hydroxypropyl) (S)-(−)-lactate; (4-hydroxybutyl)lactate; (2-hydroxyethyl)glycolate; (3-hydroxypropyl)glycolate; (4-hydroxybutyl)glycolate; lactide; 3,6-dimethyl-1,4-dioxane-2,5-dione; L-lactide; (3S-cis)-3,6-dimethyl-1,4-dioxane-2,5-dione; glycolide;

poly(lactide); poly(DL-lactide); poly(glycolide); and mixtures derived therefrom. This should not be considered limiting. Essentially any derivative of lactic acid and glycolic acid known may find utility within the present invention. Preferably, the hydroxyalkanoic acid component is bio-derived.

Preferably, the sulfonated aromatic copolyetherester compositions of the present invention contain from about 1 to about 70 mole percent hydroxyalkanoic acid component, more preferably from about 1 to about 50 mole percent, and even more preferably from about 5 to about 50 mole percent.

The sulfonate component may be introduced via aliphatic or aromatic monomers, or as endgroups. An example of an aliphatic sulfonate component includes, but is not limited to, the metal salts of sulfosuccinic acid. Specific examples of aromatic sulfonate components that can be used as endgroups include, but are not limited to, the metal salts of 3-sulfobenzoic acid, 4-sulfobenzoic acid, and 5-sulfosalicylic acid. Preferred are sulfonate components whereby the sulfonate salt group is attached to an aromatic dicarboxylic acid. The aromatic nucleus may be, for example, benzene, naphthalene, diphenyl, oxydiphenyl, sulfonyldiphenyl, or methylenediphenyl.

Preferably, the sulfonate monomer is the residue of a sulfonate-substituted phthalic acid, terephthalic acid, isophthalic acid, or 2,6-naphthalene dicarboxylic acid. More preferably, the sulfonate component is a metal salt of 5-sulfoisophthalic acid or the lower alkyl esters of 5-sulfoisophthalate. The metal salt may be monovalent or polyvalent alkali metal ions, alkaline earth metal ions, or other metal ions. The alkali metal ion is preferably, for example, sodium, potassium or lithium. However, alkaline earth metals, such as magnesium are also useful. Other useful metal ions include the transition metal ions, such as zinc, cobalt and iron. The multivalent metal ions may be used when an increase in the melt viscosity of the sulfonated aromatic copolyesters of the present invention is desired. Melt viscosity enhancements may prove useful, for example, in melt extrusion coatings, melt blown containers or films, and foams. As little as 0.1 mole percent of the sulfonate component contributes significantly to the property characteristics of the resultant films or coatings. Preferably, the sulfonated copolyetherester composition of the present invention contains from about 0.1 to about 4.0 mole percent sulfonate component.

Preferably, the single first glycol component is selected from ethylene glycol; 1,3-propanediol; and 1,4-butanediol. Preferably, the sulfonated copolyetherester composition of the present invention contains from about 98.9 to about 1.0 mole percent single first glycol component.

The poly(alkylene ether) glycol component may have a molecular weight in the range of from about 500 to about 4000. Examples of poly(alkylene ether)glycols useful within the present invention include, but are not limited to, poly (ethylene glycol); poly(1,3-propylene glycol); poly(1,4-butylene glycol); (polytetrahydrofuran); poly(pentmethylene glycol); poly(hexamethylene glycol); poly(hepthamethylene glycol); poly(ethylene glycol)-block-poly(propylene glycol)-block-poly(ethylene glycol); 4,4'-isopropylidenediphenol ethoxylate (Bisphenol A ethoxylate); 4,4'-(1-phenylethylidene)bisphenol ethoxylate (Bisphenol AP ethoxylate); 4,4'-ethylidenebisphenol ethoxylate (Bisphenol E ethoxylate); bis(4-hydroxyphenyl)methane ethoxylate (Bisphenol F ethoxylate); 4,4'-(1,3-phenylenediisopropylidene)bisphenol ethoxylate (Bisphenol M ethoxylate); 4,4'-(1,4-phenylenediisopropylidene)bisphenol ethoxylate (Bisphenol P ethoxylate); 4,4'sulfonyldiphenol ethoxylate (Bisphenol S ethoxylate); 4,4'-cyclohexylidenebisphenol ethoxylate (Bisphenol Z ethoxylate); and mixtures thereof. This should not be considered limiting. Essentially any poly(alkylene ether) glycol known may find use in the process of the present invention.

Preferably, the sulfonated aromatic copolyetherester compositions of the present invention contain from about 0.1 to about 20 mole percent poly(alkylene ether) glycol component, and more preferably from about 0.1 to about 15 mole percent.

The optional other glycol component includes, but is not limited to, unsubstituted, substituted, straight chain, branched, cyclic aliphatic, aliphatic-aromatic or aromatic diols having from 2 to 36 carbon atoms. Examples of the other glycol component include, but are not limited to, ethylene glycol; 1,3-propanediol; 1,4-butanediol; 1,6-hexanediol; 1,8-octanediol; 1,10-decanediol; 1,12-dodecanediol; 1,14-tetradecanediol; 1,16-hexadecanediol; dimer diol; 4,8-bis(hydroxymethyl)-tricyclo[5.2.1.0/2.6]decane; 1,4-cyclohexanedimethanol; isosorbide; di(ethylene glycol); tri(ethylene glycol); and mixtures derived therefrom. This should not be taken as limiting. Essentially any other glycol known may find use within the present invention.

The optional polyfunctional branching agent is selected from polyfunctional acid, glycol and mixtures thereof. Essentially, any material containing three or more carboxylic acid functions, ester functions, or hydroxy functions, and mixture thereof can be used. Examples of the polyfunctional branching agent include, but are not limited to, 1,2,4-benzenetricarboxylic acid (trimellitic acid); trimethyl-1,2,4-benzenetricarboxylate; tris(2-hydroxyethyl)-1,2,4-benzenetricarboxylate; 1,2,4-benzenetricarboxylic anhydride (trimellitic anhydride); 1,3,5-benzenetricarboxylic acid; 1,2,4,5-benzenetetracarboxylic acid (pyromellitic acid); 1,2,4,5-benzenetetracarboxylic dianhydride (pyromellitic anhydride); 3,3',4,4'-benzophenonetetracarboxylic dianhydride; 1,4,5,8-naphthalenetetracarboxylic dianhydride; citric acid; tetrahydrofuran-2,3,4,5-tetracarboxylic acid; 1,3,5-cyclohexanetricarboxylic acid; pentaerythritol; glycerol; 2-(hydroxymethyl)-1,3-propanediol; 2,2-bis(hydroxymethyl)propionic acid; and mixtures thereof. This should not be considered limiting. Essentially any polyfunctional material that contains three or more carboxylic acid or hydroxyl functions can be used.

The optional polyfunctional branching agent may be included when a higher resin melt viscosity is desired. A higher resin melt viscosity is useful in forming, for example, melt extrusion coatings; melt blown containers or films; and foams. A person of ordinary skill in the art is familiar with other situations wherein a higher resin melt viscosity is useful. Preferably, the sulfonated aromatic copolyetherester compositions containing the hydroxyalkanoic acid residues of the present invention contain from about 0 to 1.0 mole percent polyfunctional branching agent.

The optional color reducing agent includes any material that effectively reduces the color of the formed polymer. A person of ordinary skill in the art is familiar with such materials.

Examples of general classes of color reducing agents include, but are not limited to, phosphorus-containing materials; hindered phenolic materials, such as antioxidants; nitrogen-containing materials, especially secondary and tertiary amines; hindered amine light stabilizers (HALS); and mixtures thereof. This should not be considered limiting as any material capable of reducing the color of the sulfonated aromatic copolyetheresters of the present invention can be used as the color reducing agent.

Examples of phosphorus-containing materials include, but are not limited to, phosphoric acid; phosphorous acid; hypophosphorous acid; sodium hypophosphite; potassium tripolyphosphate; polyphosphoric acid; 6H-dibenzo[c,e]oxaphosphorin-6-oxide; phenylphosphinic acid; phenylphosphinic acid, sodium salt hydrate; diphenyl phosphate; potassium pyrophosphate; sodium pyrophosphate decahydrate; triethyl phosphate; 2,2'-ethylidenebis(4,6-di-tert-butylphenyl)fluorophosphite; 3,9-bis(2,4-dicumylphenoxy)-2,4,8,10-tetraoxa-3,9-diphosphaspiro[5.5]undecane; 3,9-bis(octadecyloxy)-2,4,8,10-tetraoxa-3,9-diphosphaspiro[5.5]undecane; diisodecyl phenyl phosphate; 4,4'-isopropylidenebis(diisodecyl phenyl phosphite); tetrakis(2,4-di-tert-butylphenyl)-4,4'-biphenyldiphosphonite; triisodecyl phosphite; tris(2,4-di-tert-butylphenyl) phosphite; tris(nonylphenyl) phosphite; tris(tridecyl) phosphite; calcium bis[monoethyl(3,5-di-tert-butyl-4-hydroxybenzyl)phosphonate]; 2,2',2''-nitrilo triethyl-tris[3,3',5',5'-tetra-tert-butyl-1,1'-biphenyl-2,2'-diyl]phosphite; bis[2,4-bis(1,1-dimethylethyl)-6-methylphenyl] ethyl ester of phosphorous acid; bis(2,4-di-tert-butylphenyl)-pentaerythritol diphosphite; and mixtures thereof.

Examples of hindered phenolic materials include, but are not limited to, 1,3,5-trimethyl-2,4,6-tris(3,5-di-tert-butyl-4-hydroxybenzyl)benzene; 2-(2H-benzotriazol-2-yl)-4-(1,1,3,3-tetramethylbutyl)phenol; 3-tert-butyl-4-hydroxy-5-methylphenyl sulfide; 5-tert-butyl-4-hydroxy-2-methylphenyl sulfide; 2,4-di-tert-butyl-6-(5-chloro-2H-benzotriazol-2-yl)phenol; 2,2'-ethylidenebis(4,6-di-tert-butylphenol); 4,4'-isopropylidenebis(2,6-dimethylphenol); 2,2'-methylenebis[6-(2H-benzotriazol-2-yl)-4-(1,1,3,3-tetramethylbutyl)phenol]; 2-(2H-benzotriazol-2-yl)-4,6-bis-(1-methyl-1-phenylethyl)phenol; 2-(2'-hydroxy-3',5'-di-tert-amylphenyl)benzotriazole; 2-(2H-benzotriazol-2-yl)-4-(1,1,3,3-tetramethylbutyl)phenol; 2-(2'-hydroxy-5'-methylphenyl)benzotriazole; 2,2'-methylenebis(6-tert-butyl-4-ethylphenol); 2,2'-methylenebis(6-tert-butyl-4-methylphenol); 4,4'-methylenebis(2,6-di-tert-butylphenol); octadecyl 3-(3,5-di-tert-butyl-4-hydroxyphenyl)propionate; pentaerythritol tetrakis(3,5-di-tert-butyl-4-hydroxyhydrocinnamate); tetrakis[methylene(3,5-di-tert-butyl-4-hydroxyhydrocinnamate)]methane; tris(4-tert-butyl-3-hydroxy-2,6-dimethylbenzyl) isocyanurate; tris(3,5-di-tert-butyl-4-hydroxybenzyl)isocyanurate; 1,3,5-tris-(3,5-di-tert-butyl-4-hydroxybenzyl)-s-triazine-2,4,6(1H,3H,5H)trione; 1,1,3-tris(2-methyl-4-hydroxy-5-tert-butylphenyl)butane; Vitamin E; 2,5,7,8-tetramethyl-2-(4',8',12'-trimethyltridecyl)-6-chromanol; alpha-tocopherol; ethylene bis(oxyethylene) bis(3-tert-butyl-4-hydroxy-5-methylhydrocinnamate); hexamethylene bis(3,5-di-tert-butyl-4-hydroxyhydrocinnamate); 4-[[4,6-bis(octylthio)-s-triazin-2-yl]amino]-2,6-di-tert-butylphenol; N,N'-1,3-propanediylbis(3,5-di-tert-butyl-4-hydroxyhydrocinnamamide); N,N'-hexamethylene bis(3,5-di-tert-butyl-4-hydroxyhydrocinnamamide); thiodiethylene bis(3,5-di-tert-butyl-4-hydroxyhydrocinnamate); 2-methyl-4,6-bis[(octylthio)methyl]phenol; 3,5-di-tert-butyl-4-hydroxyhydrocinnamic acid triester with 1,3,5-tris(2-hydroxyethyl)-s-triazine-2,4,6(1H,3H,5H)-trione; 1,2-bis(3,5-di-tert-butyl-4-hydroxyhydrocinnamoyl)hydrazine; mono-methylhydroquinone; mono-tert-butylhydroquinone; 2,5-di-tert-butylhydroquinone; and mixtures thereof.

Examples of nitrogen-containing materials include, but are not limited to, trioctyl amine; tridodecylamine; triisodecylamine; triisooctylamine; trioctylamine; bis(hydrogenated tallow alkyl)amine; bis(hydrogenated tallow alkyl)amine, oxidized; 4-acetamido-2,2,6,6-tetramethylpiperidine; N-(1-acetyl-2,2,6,6-tetramethyl-4-piperidinyl)-2-dodecylsuccinimide; bis[2-[2-(1-methylethyl)-3-oxazolidinyl]ethyl] 1,6-hexanediylbiscarbamate; N,N'-bis(2,2,6,6-tetramethyl-4-piperidinyl)-1,6-hexanediamine; 1,4-diazabicyclo[2.2.2]octane; 4-(dimethylamino)-1,2,2,6,6-pentamethylpiperidine; 4-dimethylamino-2,2,6,6-tetramethylpiperidine; 2-dodecyl-N-(1,2,2,6,6-pentamethyl-4-piperidinyl)succinimide; 2-dodecyl-N-(2,2,6,6-tetramethyl-4-piperidinyl)succinimide; hexahydro-2,6-bis(2,2,6,6-tetramethyl-4-piperidinyl)-1H,4H,5H,8H-2,3a,4a,6,7a,8a-hexaazacyclopenta[def]fluorene-4,8-dione; 4-hydroxy-2,2,6,6-tetramethyl-4-piperidinecarboxylic acid; phenothiazine; poly[N,N'-bis(2,2,6,6-tetramethyl-4-piperidinyl)1,6-hexanediamine-co-2,4-dichloro-6-morpholino-1,3,5-triazine]; poly(1,2-dihydro-2,2,4-trimethylquinoline); 7,7,9,9-tetramethyl-1,4-dioxa-8-azaspiro[4.5]decane-2-methanol; 2,2,6,6-tetramethylpiperidine; 2,2,6,6-tetramethyl-4-piperidinol; poly[[6-[-(1,1,3,3-tetramethylbutyl)amino]-s-triazine-2,4-diyl][2,2,6,6-tetramethyl-4-piperidyl)imino]hexamethylene [(2,2,6,6-tetramethyl-4-piperidyl)imino]]; reaction products of N-phenylbenzenamine with 2,4,4-trimethylpentenes and dimethyl succinate polymer with 4-hydroxy-2,2,6,6-tetramethyl-1-piperidineethanol; 2,2'-(2,5-thiophenediyl)bis[5-tert-butylbenzoxazole]; bis(2,2,6,6-tetramethyl-4-piperidinyl)sebacate; 1,3,5-triazine-2,4,6-triamine; N,N'-[1,2-ethanediylbis[N-[3-[4,6-bis-[butyl(1,2,2,6,6-penyamethyl-4-piperidinyl)amino]-1,3,5-triazin-2-yl]amino]propyl]-[N', N"-dibutyl-N',N"-bis(1,2,2,6,6-pentamethyl-4-piperidinyl); bis(1-octyloxy-2,2,6,6-tetramethyl-4-piperidinyl)sebacate; and mixtures thereof.

A person of ordinary skill in the art readily understands that the "effective amount" of optional color reducing agent varies as a result of the diverse chemical structure and molecular weight of the chemical components utilized as the optional color reducing agent. However, the "effective amount" of optional coloring reducing agent preferably ranges from about 0.001 to about 5 wt. % based on weight of the polymer, more preferably from about 0.001 to about 1 wt. %, and most preferably from about 0.001 to about 0.5 wt. %.

The color reducing agent can be added at any stage of polymerization. For example, the color reducing agent can be added with the other monomers, after the esterification or transesterification process, or at any stage of the finishing operation. Preferably the color reducing agent is added prior to the polymer reaching an inherent viscosity (IV) of about 0.50 dL/g. More preferably, the color reducing agent is added prior to the polymer reaching an IV of about 0.25 dL/g. If desired, additional color reducing agent may be added after polymerization to reduce color formation in subsequent processes, fabrication into shaped articles, or within the intended end use.

While a color reducing agent can reduce color at any polymerization temperature, it can also allow polymerization temperatures to be raised without undue increases in discoloration of the polymer produced therefrom. As one skilled in the art will appreciate, the polymerization rate is generally enhanced as the polymerization temperature is increased allowing for a more rapid, economical polymerization process as compared to comparable sulfonated aromatic copolyetheresters that contain hydroxyalkanoic acid residues of the prior art.

In order to obtain the desired physical properties, the sulfonated aromatic copolyetheresters of the present invention have an IV, which is an indicator of molecular weight, that is at least equal to or greater than 0.15 dL/g. More preferably, the IV is at least equal to 0.35 dL/g, as measured on a 0.5 percent (weight/volume) solution of the sulfonated aromatic copolyetherester in a 50:50 (weight) solution of trifluoroacetic acid:dichloromethane solvent system at room temperature. Such an IV is sufficient for some applications, but a person of ordinary skill in the art is familiar with other applications, such as, for example, films, bottles, sheets, and molding resins that require a higher IV. A desired IV of up to at least about 0.5 dL/g and even higher than about 0.65 dL/g can be obtained by adjusting the polymerization conditions. In fact, further processing of the sulfonated copolyetherester can produce IVs of 0.7, 0.8, 0.9, 1.0, 1.5, 2.0 dL/g and even higher.

The Molecular weight of a polymer is normally not measured directly. Instead, either the IV of the polymer in solution, or the melt viscosity of the polymer is used as an indicator of molecular weight. IVs are an indicator of molecular weight for comparing samples within a polymer family, such as poly(ethylene terephthalate), poly(butylene terephthalate) etc., and are used as an indicator of molecular weight herein.

The polyesters of the present invention can be prepared by any conventional polycondensation technique. The product compositions may vary somewhat based on the method of preparation used, particularly in the amount of diol and hydroxyalkanoic acid component present within the polymer. Preferably, the sulfonated aromatic copolyetheresters of the present invention are produced through a melt polymerization method. In the melt polymerization method, the aromatic dicarboxylic acid component (either as acids, esters, glycolate esters, polymers, or mixtures thereof), the hydroxyalkanoic acid component (either as acids, esters, glycolate esters, cyclic dimers, polymers, or mixtures thereof), the sulfonate component, the poly(alkylene ether) glycol component, the single first glycol component, the other glycol component, optionally the polyfunctional branching agent, and optionally the color reducing agent, are combined in the presence of a catalyst at a high enough temperature that the monomers are able to form esters and diesters, then oligomers, and finally polymers. The polymeric product obtained via the polymerization process is a molten product. Generally, the other glycol component and the single first glycol component are volatile and distill from the reactor as polymerization proceeds. When polymeric components are utilized, they may be heated to a temperature high enough to melt the polymeric components. Additional catalysts can be used or polymerization can proceed with the catalyst residues contained in the polymeric component. When all of the components utilized are polymeric, the polymerization process is commonly referred to as transesterification. Such procedures are generally known within the art.

The melt process conditions of the present invention, particularly the amounts of monomers used, depend on the polymer composition desired. A person of ordinary skill in the art, however, is readily able to determine the process conditions, including the exact amount of monomer needed to obtain the desired polymer. The amount of the single first glycol component, other glycol component, aromatic dicarboxylic acid component, hydroxyalkanoic acid component, sulfonate component, poly(alkylene ether) glycol component, and branching agent are desirably chosen so that the final polymeric product contains the desired amounts of the various monomer units, desirably with equimolar amounts of monomer units derived from the respective diol and diacid components. Because of the volatility of some of the monomers, especially some of the hydroxyalkanoic acid components, other glycol components, and single first glycol components, and depending on such variables as whether the reactor is sealed (i.e., the reactor is under pressure), the polymerization temperature ramp rate, and the efficiency of the distillation columns used in synthesizing the polymer, excess amounts of certain monomers may need to be added at the beginning of the polymerization reaction, and subsequently removed by distillation as the reaction proceeds. This is particularly true of the hydroxyalkanoic acid component, other glycol component, and single first glycol component.

For example, excess amounts of the dicarboxylic acid component, hydroxyalkanoic acid component, sulfonate component, single first glycol component, and other glycol component are often added to the reactor, and then, as indicated hereinabove, removed by distillation or other means of evaporation as the polymerization reaction proceeds. The single first glycol components of ethylene glycol, 1,3-propanediol, and 1,4-butanediol are charged to the reactor at a level that is preferably from about 10 to about 100 percent greater than the level at which the components are desired to be incorporated into the final polymer, and more preferably at a level from about 20 to about 70 percent greater than the desired incorporation level. The other glycol component is desirably charged at a level from about 0 to about 100 percent greater than the level at which the component is desired to be incorporated into the final polymer, depending on the exact volatility of the other glycol component.

The monomer ranges are very broad because of the wide variation in amount of monomer lost during polymerization, wherein the amount of monomer lost will further depend on the efficiency of the distillation columns and other kinds of recovery and recycle systems, and therefore are only approximations. A person of ordinary skill in the art is readily able to determine the exact amount of monomers to charge to a specific reactor to achieve the desired polymer composition.

In the polymerization process, the monomers are combined, and while being mixed with a catalyst or catalyst mixture, are gradually heated to a temperature in the range of from about 150 to about 300° C., preferably 180 to 275° C. The exact conditions and catalysts used depend on whether the acids are polymerized as true acids, esters, or polymers. The catalysts may be included initially with the reactants, and/or may be added one or more times to the mixture as it is heated. The catalyst used may be modified as the reaction proceeds. The heating and stirring are continued for a sufficient time and to a sufficient temperature, generally with the excess reactants being removed via distillation, to yield a molten polymer having a high enough molecular weight to enable suitable products to be fabricated therefrom.

Catalysts that may be used include, but are not limited to salts of Li, Ca, Mg, Mn, Zn, Pb, Sb, Sn, Ge, and Ti, such as acetate salts and oxides, including glycol adducts, and Ti alkoxides. A person of ordinary skill in the art is familiar with the acceptable catalysts, and therefore is readily and easily able to select either the specific catalyst, or combination or sequence of catalysts that can be used. The catalyst and conditions that are preferred differ depending on, for example, whether the diacid monomer is polymerized as a free diacid, a dimethyl ester, or a polymer; whether the hydroxyalkanoic acid monomer is polymerized as a free acid, an ester, a cyclic dimer or a polymer; and the exact chemical identity of the sulfonate and diol components. This should not be considered limiting. Essentially any catalyst system known will find use within the present invention.

Alternatively, the aromatic dicarboxylic acid component, sulfonate component, and hydroxyalkanoic acid component may be substituted with oligomers or polymers derived therefrom. For example, poly(lactide) may be conveniently substituted for lactic acid.

As a further alternative, polymers containing the appropriate residues may be combined to produce the sulfonated aromatic copolyetheresters of the present invention. While not being limited to a specific mechanism, typically when two polymers are melt mixed together, they transesterify to initially form copolymers with long blocks of each of the initial polymers added. The very blocky copolymers then further transesterify to form block copolymers with shorter blocks of the constituent polymers. After a certain amount of time, these blocky copolymers will further transesterify to form random copolymers. The melt mixing may be stopped at any time to form block sulfonated aromatic copolyetheresters of the present invention having long blocks of the constituent polymers used as the starting materials; block sulfonated aromatic copolyetheresters of the present invention having short blocks of the constituent polymers used as the starting materials; random sulfonated aromatic copolyetheresters of the present invention having no blocks of the constituent polymers used as the starting materials; or any sulfonated aromatic copolyetherester of the present invention that is desired. When polymers are used to produce the sulfonated aromatic copolyetheresters of the present invention, catalysts may be optionally added if desired.

The monomer composition of the polymer is chosen for specific uses and for specific sets of properties. As one skilled in the art can appreciate, the exact thermal properties of the sulfonated copolyetherester of the present invention will be a complex function of the exact chemical identity and level of each component utilized in such copolyetherester.

Polymers having an IV that is suitable for many different applications can be made by the melt condensation process set forth above. Solid state polymerization, however, can be used to achieve even higher IVs (molecular weights).

A product made by melt polymerization, after extruding, cooling and pelletizing, may be essentially noncrystalline. Noncrystalline material can be made semicrystalline by heating it to a temperature above the glass transition temperature ($T_g$) for an extended period of time. This induces crystallization so that the product can then be heated to a higher temperature to raise the molecular weight.

The polymer may also be crystallized prior to solid state polymerization by treatment with a relatively poor solvent for polyesters which induces crystallization. Such solvents reduce the $T_g$ thereby allowing crystallization to occur. Solvent induced crystallization of polyesters is known, and is disclosed in U.S. Pat. Nos. 5,164,478 and 3,684,766.

A semicrystalline polymer can be subjected to solid state polymerization by placing a pelletized or pulverized form of the polymer either in a stream of inert gas, usually nitrogen, or under a vacuum of 1 Torr, at an elevated temperature that is below the melting temperature of the polymer for an extended period of time.

The sulfonated aromatic copolyetheresters of the present invention may also further contain known additives. The additives are preferably nontoxic, biodegradable and biobenign. Such additives may include, but are not limited to, thermal stabilizers, for example, phenolic antioxidants; secondary thermal stabilizers, for example, thioethers and phosphites; UV absorbers, for example benzophenone- and benzotriazole-derivatives; UV stabilizers, for example, hindered amine light stabilizers (HALS); plasticizers; processing aides; flow enhancing additives; lubricants; pigments; flame retardants; impact modifiers; nucleating agents to increase crystallinity; antiblocking agents, such as silica; base buffers, such as sodium acetate; potassium acetate; and tetramethyl ammonium hydroxide (such as, for example, is disclosed in U.S. Pat. Nos. 3,779,993; 4,340,519; 5,171,308; 5,171,309; and 5,219,646 and references cited therein). A person of ordinary skill in the art is familiar with other useful additives.

Plasticizers may be added to improve processing, final mechanical properties, or to reduce rattle or rustle of the films, coatings and laminates of the present invention. Examples of plasticizers include, but are not limited to, soybean oil; epoxidized soybean oil; corn oil; caster oil; linseed oil; epoxidized linseed oil; mineral oil; alkyl phosphate esters; Tween® 20; Tween® 40; Tween® 60; Tween® 80; Tween® 85; sorbitan monolaurate; sorbitan monooleate; sorbitan monopalmitate; sorbitan trioleate; sorbitan monostearate; citrate esters, such as trimethyl citrate, triethyl citrate (Citroflex® 2, produced by Morflex, Inc. Greensboro, N.C.), tributyl citrate (Citroflex® 4, produced by Morflex, Inc., Greensboro, N.C.), trioctyl citrate, acetyltri-n-butyl citrate (Citroflex® A-4, produced by Morflex, Inc., Greensboro, N.C.), acetyltriethyl citrate (Citroflex® A-2, produced by Morflex, Inc., Greensboro, N.C.), acetyltri-n-hexyl citrate (Citroflex® A-6, produced by Morflex, Inc., Greensboro, N.C.), and butyryltri-n-hexyl citrate (Citroflex® B-6, produced by Morflex, Inc., Greensboro, N.C.); tartarate esters, such as dimethyl tartarate, diethyl tartarate, dibutyl tartarate, and dioctyl tartarate; poly(ethylene glycol); derivatives of poly(ethylene glycol); paraffin; monoacyl carbohydrates, such as 6-O-sterylglucopyranoside; glyceryl monostearate; Myvaplex® 600 (concentrated glycerol monostearates); Nyvaplex® (concentrated glycerol monostearate that is a 90% minimum distilled monoglyceride produced from hydrogenated soybean oil and is composed primarily of stearic acid esters); Myvacet® (distilled acetylated monoglycerides of modified fats); Myvacet® 507 (48.5 to 51.5 percent acetylation); Myvacet® 707 (66.5 to 69.5 percent acetylation); Myvacet® 908 (minimum of 96 percent acetylation); Myverol® (concentrated glyceryl monostearates); Acrawax® (N,N-ethylene bis-stearamide); N,N-ethylene bis-oleamide; dioctyl adipate; diisobutyl adipate; diethylene glycol dibenzoate; dipropylene glycol dibenzoate; polymeric plasticizers, such as poly(1,6-hexamethylene adipate), poly(ethylene adipate), Rucoflex®, and other compatible low molecular weight polymers; and mixtures thereof. Preferably, the plasticizers are nontoxic and biodegradable and/or bioderived. This should not be considered limiting. Essentially any additive known may find use in the present invention.

In addition, the compositions of the present invention may be filled with inorganic, organic and/or clay fillers. Such fillers include, but are not limited to, for example, wood flour; gypsum; talc; mica; carbon black; wollastonite; montmorillonite minerals; chalk; diatomaceous earth; sand; gravel; crushed rock; bauxite; limestone; sandstone; aerogels; xerogels; microspheres; porous ceramic spheres; gypsum dihydrate; calcium aluminate; magnesium carbonate; ceramic materials; pozzolamic materials; zirconium compounds; xonotlite (a crystalline calcium silicate gel); perlite; vermiculite; hydrated or unhydrated hydraulic cement particles; pumice; perlite; zeolites; kaolin; clay fillers, including both natural and synthetic clays and treated and untreated clays, such as organoclays and clays which have been surface treated with silanes or stearic acid to enhance adhesion with the copolyester matrix; smectite clays; montmorillonite clays; magnesium aluminum silicate; bentonite clays; hectorite clays; silicon oxide; calcium terephthalate; aluminum oxide; titanium dioxide; iron oxides; calcium phosphate; barium sulfate; sodium carbonate; magnesium sulfate; aluminum sulfate; magnesium carbonate; barium carbonate; calcium oxide; magnesium oxide; aluminum hydroxide; calcium sulfate; barium sulfate; lithium fluoride; polymer particles; powdered metals; pulp powder; cellulose; starch; chemically modified starch; thermoplastic starch; lignin powder; wheat; chitin; chitosan; keratin; gluten; nut shell flour; wood flour; corn cob flour; calcium carbonate; calcium hydroxide; glass beads; hollow glass beads; seagel; cork; seeds; gelatins; wood flour; saw dust; agar-based materials; reinforcing agents, such as glass fiber; natural fibers, such as sisal, hemp, cotton, wool, wood, flax, abaca, sisal, ramie, bagasse, and cellulose fibers; carbon fibers; graphite fibers; silica fibers; ceramic fibers; metal fibers; stainless steel fibers; and recycled paper fibers, for example, from repulping operations. A person of ordinary skill in the art is familiar with other acceptable fillers. Fillers may tend to increase the Young's modulus; improve the dead-fold properties; improve the rigidity of the film, coating or laminate; decrease the cost; and reduce the tendency of the film, coating, or laminate to block or self-adhere during processing or use. Fillers have also been found to produce plastic articles that have many of the qualities of paper, such as texture and feel, as disclosed by, for example, Miyazaki, et. al., in U.S. Pat. No. 4,578,296. This should not be considered limiting as essentially any known filler material can be used.

The clay fillers may be further treated with organic materials, such as surfactants, to make them organophilic. Commercial examples of usable clay fillers include Gelwhite® MAS 100, which is a white smectite clay (magnesium aluminum silicate) produced by the Southern Clay Company; Claytone® 2000, an organophilic smectite clay produced by the Southern Clay Company; Gelwhite® L, a montmorillonite clay from a white bentonite clay produced by the Southern Clay Company; Cloisite® 30 B, a organophilic natural montmorillonite clay with bis(2-hydroxyethyl) methyl tallow quarternary ammonium chloride salt produced by the Southern Clay Company; Cloisite® Na, a natural montmorillonite clay produced by the Southern Clay Company; Garamite® 1958, a mixture of minerals produced by the Southern Clay Company; Laponite® RDS, a synthetic layered silicate with an inorganic polyphosphate peptiser produced by the Southern Clay Company; Laponite® RD, a synthetic colloidal clay produced by the Southern Clay Company; Nanomer®, surface modified montmorillonite minerals produced by the Nanocor Company; Nanomer® 1.24TL, surface modified montmorillonite minerals produce by the Nanocor Company, wherein the surface is treated with amino acids; "P Series" Nanomer®, surface modified montmorillonite minerals produced by the Nanocor Company; Polymer Grade (PG) Montmorillonite PGW, a high purity aluminosilicate mineral, sometimes referred to as a phyllosilicate, produced by the Nanocor Company; Polymer Grade (PG) Montmorillonite PGA, a high purity aluminosilicate mineral, sometimes referred to as a phyllosilicate, produced by the Nanocor Company; Polymer Grade (PG) Montmorillonite PGV, a high purity aluminosilicate mineral, sometimes referred to as a phyllosilicate, produced by the Nanocor Company; Polymer Grade (PG) Montmorillonite PGN, a high purity aluminosilicate mineral, sometimes referred to as a phyllosilicate, produced by the Nanocor Company; and mixtures thereof. This should not be considered limiting as essentially any known clay filler can be used.

Some of the desirable clay fillers of the present invention can exfoliate through the process to provide nanocomposites. This is especially true for layered silicate clays, such as, for example, smectite clays, magnesium aluminum silicate, bentonite clays, montmorillonite clays, and hectorite clays. As discussed above, such clays can be natural or synthetic, treated or not. This should not be considered limiting. The clay filler contained in the final filled copolyester can have a broad range of particle sizes.

The filler utilized in the present invention can have a broad range of particle sizes. As one skilled in the art can appreciate, the size of the filler particles can be tailored to accommodate the manner in which the filled copolyetherester composition is going to be used. It is generally preferred that the average diameter of the filler be less than about 40 microns, and more preferably less than about 20 microns. However, this should not be considered limiting. The filler may include particle sizes ranging up to 40 mesh (US Standard) or larger. A filler containing a mixture of particle sizes can also be advantageously used. For example, a calcium carbonate filler having average particle sizes of about 5 microns and about 0.7 microns can provide better space filling of the filler within the copolyester matrix. Use of two or more filler particle sizes allows for improved particle packing. Particle packing is the process of selecting two or more ranges of filler particle sizes in order that the spaces between a group of large particles are substantially occupied by a selected group of smaller filler particles. In general, the particle packing will be increased whenever any given set of particles is mixed with another set of particles having a particle size that is at least about 2 times larger or smaller than the first group of particles. The particle packing density for a two-particle system will be maximized whenever the size ratio of a given set of particles is from about 3 to 10 times the size of another set of particles. Similarly, three or more different sets of particles may be used to further increase the particle packing density. The optimal packing density depends on a number of factors, for example, the types and concentrations of the various components within both the thermoplastic phase and the solid filler phase; the film, coating or lamination process used; and the desired mechanical, thermal and other performance properties of the final product being produced. Particle packing techniques are further disclosed by Andersen et. al. in U.S. Pat. No. 5,527,387. Filler concentrates containing a mixture of filler particle sizes based on the above particle packing techniques are commercially available from the Shulman Company under the tradename Papermatch®.

The sulfonated aromatic copolyetheresters of the present invention can also be blended with other polymeric materials. These materials can be biodegradable or non-biodegradable, and can be naturally derived, modified naturally derived or synthetic.

Examples of biodegradable polymeric materials include, but are not limited to poly(hydroxy alkanoates); polycarbonates; poly(caprolactone); aliphatic polyesters; aliphatic-aromatic copolyesters; aliphatic-aromatic copolyetheresters; aliphatic-aromatic copolyamideesters; sulfonated aliphatic-aromatic copolyesters; sulfonated aliphatic-aromatic copolyetheresters; sulfonated aliphatic-aromatic copolyamideesters; copolymers and mixtures thereof.

Specific examples of acceptable biodegradable polymeric materials include, but are not limited to Biomax® sulfonated aliphatic-aromatic copolyesters of the DuPont Company; Eastar Bio® aliphatic-aromatic copolyesters of the Eastman Chemical Company; Ecoflex® aliphatic-aromatic copolyesters of the BASF Corporation; poly(1,4-butylene terephthalate-co-adipate (50:50 molar); EnPol® polyesters of the Ire Chemical Company; poly(1,4-butylene succinate); Bionolle® polyesters of the Showa High Polymer Company; poly(ethylene succinate); poly(1,4-butylene adipate-co-succinate); poly(1,4-butylene adipate); poly(amide esters); Bak® poly(amide esters) of the Bayer Company; poly (ethylene carbonate); poly(hydroxybutyrate); poly(hydroxyvalerate); poly(hydroxybutyrate-co-hydroxyvalerate); Biopol® poly(hydroxy alkanoates) of the Monsanto Company; poly(lactide-co-glycolide-co-caprolactone); Tone® poly(caprolactone) of the Union Carbide Company; EcoPLA® poly(lactide) of the Cargill Dow Company; and copolymers and mixtures thereof. This should not be taken as limiting. Essentially any biodegradable material may be blended with the sulfonated aromatic copolyetheresters of the present invention.

Examples of non-biodegradable polymeric materials include, but are not limited to polyethylene; high density polyethylene; low density polyethylene; linear low density polyethylene; ultralow density polyethylene polyolefins; poly(ethylene-co-glycidylmethacrylate); poly(ethylene-co-methyl (meth)acrylate-co-glycidyl acrylate); poly(ethylene-co-n-butyl acrylate-co-glycidyl acrylate); poly(ethylene-co-methyl acrylate); poly(ethylene-co-ethyl acrylate); poly(ethylene-co-butyl acrylate); poly(ethylene-co-(meth) acrylic acid); metal salts of poly(ethylene-co-(meth)acrylic acid); poly((meth)acrylates), such as poly(methyl methacrylate) and poly(ethyl methacrylate); poly(ethylene-co-carbon monoxide); poly(vinyl acetate); poly(ethylene-co-vinyl acetate); poly(vinyl alcohol); poly(ethylene-co-vinyl alcohol); polypropylene; polybutylene; poly(cyclic olefins); polyesters; poly(ethylene terephthalate); poly(1,3-propylene terephthalate); poly(1,4-butylene terephthalate); PETG; poly(ethylene-co-1,4-cyclohexanedimethanol terephthalate); poly(vinyl chloride); poly(vinylidene chloride) (PVDC); polystyrene; syndiotactic polystyrene; poly(4-hydroxystyrene); novalacs; poly(cresols); polyamides; nylon; nylon 6; nylon 46; nylon 66; nylon 612; polycarbonates; poly(bisphenol A carbonate); polysulfides; poly(phenylene sulfide); polyethers; poly(2,6-dimethylphenylene oxide); polysulfones; and copolymers and mixtures thereof.

Examples of natural polymeric materials include, but are not limited to starch; starch derivatives; modified starch; thermoplastic starch; cationic starch; anionic starch; starch esters, such as starch acetate; starch hydroxyethyl ether; alkyl starches; dextrins; amine starches; phosphate starches; dialdehyde starches; cellulose; cellulose derivatives; modified cellulose; cellulose esters, such as cellulose acetate, cellulose diacetate, cellulose priopionate, cellulose butyrate, cellulose valerate, cellulose triacetate, cellulose tripropionate, and cellulose tributyrate; cellulose mixed esters, such as cellulose acetate propionate and cellulose acetate butyrate; cellulose ethers, such as methylhydroxyethylcellulose, hydroxymethylethylcellulose, carboxymethylcellulose, methyl cellulose, ethylcellulose, hydroxyethylcellulose, and hydroxyethylpropylcellulose; polysaccharides; alginic acid; alginates; phycocolloids; agar; gum arabic; guar gum; acaia gum; carrageenan gum; furcellaran gum; ghatti gum; psyllium gum; quince gum; tamarind gum; locust bean gum; gum karaya; xantahn gum; gum tragacanth; proteins; Zein® (a prolamine derived from corn); collagen (extracted from animal connective tissue and bones) and derivatives thereof such as gelatin and glue; casein (the principle protein in cow milk); sunflower protein; egg protein; soybean protein; vegetable gelatins; gluten; and mixtures thereof. Thermoplastic starch may be produced, for example, as disclosed in U.S. Pat. No. 5,362,777, wherein native or modified starch is mixed and heated with high boiling plasticizers, such as glycerin or sorbitol, in such a way that the starch has little or no crystallinity, a low glass transition temperature, and a low water content. This should not be taken as limiting as essentially any known polymeric material can be blended with the sulfonated aromatic copolyetheresters of the present invention.

The fillers and/or polymeric materials can be added to the polymer of the present invention before the polymerization process starts, at any stage during the polymerization process, after the polymerization process is completed or in a post polymerization process. For example, the fillers and/or polymeric materials can be added with the copolyester monomers at the start of the polymerization process. For example, silica and titanium dioxide fillers are preferably added with the copolyester monomers so that the fillers are adequately dispersed in the polyester matrix. Alternatively, the fillers and/or polymeric materials can be added at an intermediate stage of the polymerization, for example, as the precondensate passes into the polymerization vessel. As yet a further alternative, the fillers and/or polymeric materials can be added after the copolyester exits the polymerizer. For example, the aromatic copolyetherester of the present invention and polymeric materials, if being added, can be melt fed to an extruder, and compounded with the filler and/or polymeric materials.

In yet a further alternative, the sulfonated aromatic copolyetherester of the present invention can be combined with the fillers and/or polymeric materials in a subsequent post polymerization process. Typically, such a process involves intensive mixing of the molten copolyester with the filler and/or polymeric materials. The intensive mixing can be provided by, for example, static mixers, Brabender mixers, single screw extruders, and twin screw extruders. In a typical process, the copolyester is dried. The dried copolyester is then mixed with the filler and/or polymeric materials. Alternatively, the copolyester and the filler and/or polymeric materials are co-fed through different feeders. In an extrusion process, the copolyester and the fillers and/or polymeric materials are typically fed in the back feed section of the extruder. However, this is not to be considered limiting. The copolyester and the filler and/or polymeric materials can also be advantageously fed into different locations on the extruder. For example, the copolyester may be added in the back feed section of the extruder while the filler and/or polymeric material is fed, ("side-stuffed"), in the front of the extruder near the die plate. The extruder temperature profile is set up to allow the copolyester to melt under the processing conditions. The screw design will also provide stress and, in turn, heat to the resin as it mixes the molten aromatic copolyetherester with the filler and/or polymeric material. Processes for melt mixing fillers with polymers are further disclosed, for example, by Dohrer, et. al., in U.S. Pat. No. 6,359,050. Alternatively, the filler and/or polymeric material can be blended with the sulfonated aromatic copolyetherester of the present invention when the films and coatings of the present invention are formed, as is further described below.

In a further aspect of the present invention, the sulfonated aromatic copolyetheresters of the present invention can be used to produce a wide variety of shaped articles. Shaped articles produced from the copolyetheresters of the present invention have greater thermal properties as compared to shaped articles produced from comparable sulfonated copolyetheresters of the prior art. Shaped articles include, but are not limited to films; sheets; fibers; melt blown containers; molded parts, such as cutlery; foamed parts;

coatings; polymeric melt extrusion coatings on substrates; polymeric solution coatings on substrates; and laminates. This should not be considered limiting as a person of ordinary skill in the art is familiar with other shaped articles that can be produced from the copolyetheresters of the present invention. The copolyetheresters of the present invention can be used in essentially any process known for forming shaped articles.

A preferred aspect of the present invention relates to films comprising the sulfonated aromatic copolyetheresters of the present invention and processes for producing such films, as well as, articles derived therefrom. Polymeric films have a variety of uses, such as, for example, in packaging, especially of foodstuffs; adhesives; tapes; insulators; capacitors; photographic development; x-ray development; and laminates. For many of these uses, the heat resistance of the film is an important factor. Therefore, a higher melting point, $T_g$, and crystallinity level are desired so that better heat resistance and more stable electrical characteristics, along with a rapid biodegradation rate can be provided. Furthermore, films having good barrier properties, such as, for example, moisture barrier, oxygen barrier, and carbon dioxide barrier; good grease resistance; good tensile strength; and a high elongation at break are desired.

The sulfonated aromatic copolyetheresters of the present invention can be used to produce films used in any one of a number of different applications, such as, for example, food packaging; labels; dielectric insulation; and barrier to water vapor. While not intended to be limiting, in at least one embodiment, the monomer composition of the copolyester polymer is preferably chosen so as to produce a partially crystalline polymer, wherein the crystallinity provides strength and elasticity to the film produced therefrom. When first produced, the polyester is generally semi-crystalline in structure, wherein the crystallinity increases on reheating and/or stretching of the polymer, such as occurs in the production of a film.

The sulfonated aromatic copolyetheresters of the present invention can be used in any process known in the art for producing a film. For example, thin films may be formed through dipcoating as disclosed in U.S. Pat. No. 4,372,311; through compression molding as disclosed in U.S. Pat. No. 4,427,614; through melt extrusion as disclosed in U.S. Pat. No. 4,880,592; and through melt blowing as disclosed in U.S. Pat. No. 5,525,281. The difference between a film and a sheet is the thickness, but there is no set industry standard as to when a film becomes a sheet. For purposes of this invention, a film is less than or equal to 0.25 mm (10 mils) thick, preferably between about 0.025 mm and about 0.15 mm (1 mil and 6 mils). However, thicker films can be formed up to a thickness of about 0.50 mm (20 mils).

The film of the present invention is preferably formed by either solution casting, or extrusion. Extrusion is particularly preferred for formation of "endless" products, such as films and sheets, which emerge as a continuous length. In extrusion, the polymeric material, whether provided as a molten polymer or as plastic pellets or granules, is fluidized and homogenized. Additives, as already described hereinabove, can also be added thereto. The mixture is then forced through a suitably shaped die to produce the desired cross-sectional film shape. The extruding force may be exerted by a piston or ram (ram extrusion), or by a rotating screw (screw extrusion), which operates within a cylinder in which the material is heated and plasticized. Single screw, twin screw, and multi-screw extruders that are known in the art can be used. Different kinds of die are used to produce different products, such as, for example, blown film (formed by a blow head for blown extrusions), sheets and strips (slot dies), and hollow and solid sections (circular dies). In this manner, films of different widths and thicknesses can be produced. After extrusion, the polymeric film is taken up on rollers, cooled, and then taken off by means of a suitable device designed to prevent subsequent deformation of the film.

Using extruders in accordance with what is known in the art, a film can be produced by extruding a thin layer of polymer over chilled rolls and then further drawing down the film to size by tension rolls. In the extrusion casting process, the polymer melt is conveyed from the extruder through a slot die (T-shaped or "coat hanger" die). The die may be as wide as 10 feet and typically has thick wall sections on the final lands to minimize deflection of the lips from internal pressure. Die openings may be within a wide range, but 0.015 inch to 0.030 inch is typical. The nascent cast film may be drawn down, and thinned significantly, depending on the speed of the rolls taking up the film. The film is then solidified by being cooled below the crystalline melting point, or $T_g$. This may be accomplished by passing the film through either a water bath, or over two or more chrome-plated chill rolls that have been cored for water cooling. The cast film is then conveyed though nip rolls, a slitter to trim the edges, and then wound up. The cast film conditions may be tailored to allow a relatively high degree of orientation in the machine direction, especially at high draw down conditions and wind up speeds, and a much lower level of orientation in the transverse direction. Alternatively, the conditions may be tailored to minimize the level of orientation, thus providing films with essentially equivalent physical properties in both the machine direction and the transverse direction. Preferably, the finished film is less than or equal to about 0.25 mm thick.

Blown film, which is generally stronger, tougher, and made more rapidly than cast film, is made by extruding a tube. In producing blown film, the melt flow of molten polymer is typically turned upward from the extruder and fed through an annular die. In doing so, the molten polymer melt flows around a mandrel and emerges through a ring-shaped opening in the form of a tube. As the tube leaves the die, internal pressure is introduced through the die mandrel with air, which expands the tube from about 1.5 to about 2.5 times the die diameter and simultaneously draws the film, causing a reduction in thickness. The air contained in the bubble cannot escape because it is sealed by the die on one end and by nip (or pinch) rolls on the other. Desirably, an even air pressure is maintained to ensure uniform thickness of the film bubble. The tubular film may be cooled internally and/or externally by directing air onto the film. Faster quenching in the blown film method may be accomplished by passing the expanded film about a cooled mandrel that is situated within the bubble. For example, a method that uses a cooled mandrel is disclosed by Bunga et. al. in Canadian Patent No. 893,216. If the polymer being used to prepare the blown film is semicrystalline, the bubble may become cloudy as it cools below the softening point of the polymer. Drawdown of the extrudate is not essential, but preferably the drawdown ratio is between about 2 and about 40. The draw down ratio is defined as the ratio of the die gap to the product of the thickness of the cooled film and the blow-up ratio. Drawdown may be induced by tension from pinch rolls. Blow-up ratio is the ratio of the diameter of the cooled film bubble to the diameter of the circular die. The blow-up ratio may be as great as 4 to 5, but 2.5 is more typical. The drawdown induces molecular orientation within the film in the machine direction (i.e., direction of the extrudate flow), and the blow-up ratio induces molecular orientation in the film in the transverse or hoop direction. The quenched bubble moves upward through guiding devices into a set of pinch rolls that flatten it. The resulting sleeve may subsequently be slit along one side, making a larger film width than could be conveniently made via the cast film method. The slit film may be further gusseted and surface-treated in line. In addition, the blown film may be produced through more elaborate techniques, such as the double-bubble, tape bubble, or trapped bubble processes. In the double-bubble process, the polymeric tube is first quenched and then reheated and oriented by inflating the polymeric tube above the $T_g$, but below the crystalline melting temperature (Tm) of the polyester (if the polyester is crystalline). Further information regarding the double-bubble technique is disclosed in, for example, U.S. Pat. No. 3,456,044.

A complex combination of many factors, such as exact chemical composition of the polymer; amount and type of additives used; and thermal properties of the polymeric composition are involved in determining the exact conditions needed to produce a blown film. Using the blown film process, however, offers many advantages, such as, for example, the relative ease of changing the film width and caliber simply by changing the volume of air in the bubble and the speed of the screw; the elimination of end effects; and the capability of biaxially orienting the film that is produced. The thickness of a typical film produced in a blown film operation may range from about 0.004 to about 0.008 inches and the flat film width may range up to 24 feet or more after slitting.

A sheeting calender can be employed to manufacture large quantities of film. The rough film is fed into the gap of the calender. A calender is a machine comprising a number of heatable parallel cylindrical rollers that rotate in opposite directions and spread out and stretch the polymer to the required thickness. The last roller smoothes the film that is produced. If the film is required to have a textured surface, the final roller is provided with an appropriate embossing pattern. Alternatively, the film may be reheated and then passed through an embossing calender. The calender is followed by one or more cooling drums. Finally, the finished film is reeled up.

Extruded films can also be used as the starting material for other products. For example, the film may be cut into smaller segments for use as feed material for other processing methods, such as injection molding. As a further example, the film may be laminated onto a substrate as described below. As yet a further example, the film may be metallized, as further disclosed below. The film tubes available from blown film operations may be converted to bags through, for example, heat sealing processes.

The extrusion process can be combined with a variety of post-extruding operations for expanded versatility. Such post-forming operations include, but are not limited to changing round shapes into oval shapes; blowing the film to different dimensions; machining and punching; and biaxial stretching. A person of ordinary skill in the art is familiar with other post-forming operations.

A film can also be made by solution casting, which consistently produces a more uniform gauged film than melt extrusion. Solution casting comprises dissolving polymeric granules, powder or the like in a suitable solvent with any desired formulant, such as a plasticizer or colorant. The solution is filtered to remove dirt or large particles, and then cast from a slot die onto a moving belt that is preferably made of stainless steel, dried, whereon the film cools. The extrudate thickness is typically five to ten times that of the finished film. The film may then be finished in a like manner to the extruded film. A person of ordinary skill in the art can easily select appropriate process parameters based on the polymeric composition and process being used to form the film. The solution cast film can be subjected to the same post treatments as described hereinabove for extrusion cast films.

Multilayer films having bilayer, trilayer, and multilayer structures can also be produced. The specific properties of a multilayer film can be advantageously tailored to solve critical use needs while allowing the more costly ingredients to be relegated to the outer layers where they provide the most benefit. Multilayer films can be formed through, for example, coextrusion; blown film; dipcoating; solution coating; blade; puddle; air-knife; printing; Dahlgren; gravure; powder coating; and spraying. Generally, multilayer films are produced through extrusion casting processes. For example, the resin materials are heated in a uniform manner. The molten materials are conveyed to a coextrusion adapter that combines the molten materials to form a multilayer coextruded structure. The layered polymeric material is transferred through an extrusion die opened to a predetermined gap, commonly in the range of between about 0.05 inch (0.13 cm) and about 0.012 inch (0.03 cm). The material is then drawn down to the intended gauge thickness by means of a primary chill or casting roll typically maintained in the range of from about 15 to 55° C. Typically, the drawdown ratios range from about 5:1 to about 40:1. The additional layers may serve as, for example, barrier layers; adhesive layers; and/or antiblocking layers. Furthermore, for example, the inner layers may be filled and the outer layers may be unfilled, as disclosed in U.S. Pat. No. 4,842,741 and U.S. Pat. No. 6,309,736. Production processes are well known, for example, as disclosed in U.S. Pat. No. 3,748,962; U.S. Pat. No. 4,522,203; U.S. Pat. No. 4,734,324; U.S. Pat. No. 5,261,899; and U.S. Pat. No. 6,309,736. For example, El-Afandi et. al. in U.S. Pat. No. 5,849,374; U.S. Pat. No. 5,849,401; and U.S. Pat. No. 6,312,823 disclose compostable multilayer films with a core poly(lactide) layer with inner and outer layers of blocking reducing layers composed of, for example, aliphatic polyesters.

The additional layers can be comprised of the sulfonated copolyetheresters of the present invention or of materials that are either biodegradable or non-biodegradable, wherein a non-limiting list of at least some examples of acceptable biodegradable and non-biodegradable materials is already set forth hereinabove. The materials can further be naturally derived; modified naturally derived; or synthetic, wherein a non-limiting list of at least some examples of natural polymeric materials is set forth hereinabove.

Regardless of how the film is formed, it may be subjected to biaxial orientation by being stretched in both the machine and transverse direction after it is formed. The film is stretched in the machine direction during its formation simply by being rolled out and taken up. This inherently stretches the film in the direction of takeup, orienting some of the fibers. Although this strengthens the film in the machine direction, it allows the film to tear easily in the direction at right angles because all of the fibers are oriented in one direction. The biaxially oriented film may further be subjected to additional drawing of the film in the machine direction, in a process known as tensilizing.

Biaxial stretching of the film provides superior tensile strength, flexibility, toughness and shrinkability, for example, in comparison to non-oriented films. It is desirable to stretch the film along two axes at right angles to each other. This increases tensile strength and elastic modulus in the directions of stretch. It is most desirable for the amount of stretch in each direction to be roughly equivalent, thereby providing similar properties or behavior within the film when tested from any direction. However, certain applications, such as those desiring a certain amount of shrinkage or greater strength in one direction over another, as in labels or adhesive and magnetic tapes, will require uneven, or uniaxial, orientation of the fibers of the film.

Biaxial orientation can be obtained by any process known in the art. However, tentering is preferred, wherein the material is stretched while heating in the transverse direction simultaneously with, or subsequent to, stretching in the machine direction. The orientation may be performed on available commercial equipment. For example, suitable equipment is available from Bruckner Maschenenbau of West Germany. One form of such equipment operates by attaching clamps to the edges of the sheet to be drawn and, at the appropriate temperature, separating the edges of the sheet at a controlled rate. For example, a film may be fed into a temperature-controlled box, heated above its $T_g$ and grasped on either side by tenterhooks that simultaneously exert a drawing tension (longitudinal stretching) and a widening tension (lateral stretching). Typically, stretch ratios of about 3:1 to about 4:1 may be employed. Alternatively, and preferably for commercial purposes, the biaxial drawing process is conducted continuously at high production rates in multi-stage roll drawing equipment, as available from Bruckner, where the drawing of the extruded film stock takes place in a series of steps between heated rolls rotating at different and increasing rates. When the appropriate combinations of draw temperatures and draw rates are employed, the monoaxial stretching will be preferably from about 4 to about 20, more preferably from about 4 to about 10. Draw ratio is defined as the ratio of a dimension of a stretched film to a non-stretched film.

Uniaxial orientation can be obtained by either stretching the film in only one direction as in the above described biaxial processes, or directing the film through a machine direction orienter (MDO) such as is commercially available from vendors like the Marshall and Williams Company of Providence, R.I. The MDO apparatus has a plurality of stretch rollers that progressively stretch and thin the film in the machine direction of the film, which is the direction of travel of the film through the apparatus.

Preferably, the stretching process takes place at a temperature of at least 10° C. above the $T_g$, but below the Vicat softening temperature, of the film material, especially at least 10° C. below the Vicat softening point, depending to some degree on the rate of stretching.

Orientation can be enhanced within the blown film operations by adjusting the blow-up ratio (BUR), which is defined as the ratio of the diameter of the film bubble to the die diameter. For example, when producing bags or wraps, a BUR of about 1 to about 5 is generally preferred. However, the BUR is modified based on the balance of properties desired in the machine direction and the transverse direction. For a balanced film, a BUR of about 3:1 is generally appropriate, but if a "splitty" film that easily tears in one direction is desired, a BUR of about 1:1 to about 1.5:1 is generally preferred.

Shrinkage can be controlled by what is typically referred to as "heat setting", which involves holding the film in a stretched position and heating for a few seconds before quenching. The heat stabilizes the oriented film, which then may be forced to shrink only at temperatures above the heat stabilization temperature. Further, the film can also be subjected to rolling, calendering, coating, embossing, printing, or any other typically known finishing operation.

A person of ordinary skill in the art can readily determine the process conditions and parameters needed to make a film from any given polymeric composition, including the sulfonated copolyetheresters of the present invention, by using any method known in the art, as well as, how to choose an appropriate film type for any desired application.

The properties a film possesses depends on the combination of factors already set forth hereinabove, including, but not limited to, the polymeric composition; the method of forming the polymer; the method of forming the film; and whether the film is stretch treated or biaxially oriented. These factors affect many properties of the film, such as, for example, shrinkage; tensile strength; elongation at break; impact strength; dielectric strength and constant; tensile modulus; chemical resistance; melting point; and heat deflection temperature.

The film properties can be further adjusted by adding certain additives and fillers to the polymeric composition, wherein a non-limiting list of at least some examples of additives and fillers is already set forth hereinabove. Alternatively, the sulfonated aromatic copolyetheresters of the present invention can be blended with at least one other polymeric material to improve certain characteristics, wherein a non-limiting list of at least some examples of polymeric materials is already set forth hereinabove.

As disclosed by Moss in U.S. Pat. No. 4,698,372; Haffner et. al. in U.S. Pat. No. 6,045,900; and McCormack in WO 95/16562, films, especially filled films, can, if desired, be microporous, that is formed so as to contain micropores. Additional disclosures related to microporous films can be found in U.S. Pat. No. 4,626,252; U.S. Pat. No. 5,073,316; and U.S. Pat. No. 6,359,050. As is known, the stretching of a filled film can create fine pores that prevent liquid and particulate matter from passing through, but allow air and water vapor to pass through.

In order to enhance the printability, ink receptivity of the surface, adhesion or other desirable characteristics of the films of the present invention, the films may be further treated by known conventional post forming operations, such as corona discharge, chemical treatments, and flame treatments.

Films comprised of sulfonated aromatic copolyetheresters of the present invention can be used in a wide variety of areas. For example, such films can be used as a component of personal sanitary items, such as disposable diapers; incontinence briefs; feminine pads; sanitary napkins; tampons; tampon applicators; motion sickness bags; baby pants; and personal absorbent products. The films of the present invention combine excellent water barrier properties, to avoid leak through, with excellent toughness to easily conform to the body and to stretch with the body movements during use. Additionally, a soiled sanitary item that is properly discarded can biocompost rapidly.

As further examples, the films of the present invention can be used as protective films for agriculture, such as mulch films, seed coverings, and agriculture mats containing seeds ("seed tapes"); garbage/trash bags; lawn waste bags; adhesive tape substrates; bags; bag closures; bed sheets; bottles; cartons; dust bags; fabric softener sheets; garment bags; industrial bags; waste bin liners; compost bags; labels; tags; pillow cases; bed liners; bedpan liners; bandages; boxes; handkerchiefs; pouches; wipes; protective clothing; surgical gowns; surgical sheets; surgical sponges; temporary enclosures; temporary siding; and toys.

A particularly preferred use of the films comprising the sulfonated aromatic copolyetheresters of the present invention include, but are not limited to food packaging, especially fast food packaging. Specific examples of food packaging uses include, but are not limited to, fast food wrappers; stretch wrap films; hermetic seals; food bags; snack bags; grocery bags; cups; trays; cartons; boxes; bottles; crates; food packaging films; blister pack wrappers; and skin packaging.

Another particularly preferred use of the films of the present invention includes, but is not limited to wraps. Wraps may be used to enclose meats and other perishable items, as well as, fast food items, such as sandwiches, burgers, and dessert items. Preferably, when the films of the present invention are used as wraps, the films have a good balance of physical properties, including paper-like stiffness combined with sufficient toughness so as not to tear when used to wrap, for example, a sandwich; good deadfold characteristics, so that once folded, wrapped or otherwise manipulated into the desired shape, the wraps maintain their shape and do not spontaneously unfold or unwrap; good grease resistance, where desired; and a good moisture barrier balance, wherein moisture does not condense on, for example, a sandwich. The wraps may have a smooth surface or a textured surface, such as is produced by, for example, embossing, crimping, and/or quilting. The wraps can include fillers, such as, for example, inorganic particles; organic particles, such as starch; and combinations thereof.

The films of the present invention may be further processed to produce additional desirable articles, such as containers. For example, the films may be thermoformed as disclosed, for example, in U.S. Pat. No. 3,303,628, U.S. Pat. No. 3,674,626, and U.S. Pat. No. 5,011,735. The films may also be used in vacuum skin packaging techniques to package foods, such as meats, as disclosed, for example, in U.S. Pat. No. 3,835,618, U.S. Pat. No. 3,950,919, US Re 30,009, and U.S. Pat. No. 5,011,735. The films can also be laminated onto substrates, as further described below.

A further preferred aspect of the present invention relates to applying a coating comprising the sulfonated aromatic copolyetheresters of the present invention to a substrate, the process for producing such a coating, and articles derived therefrom. The substrate can be coated, for example, with a polymer solution, a dispersion, a latex, or an emulsion of the sulfonated aromatic copolyetheresters of the present invention via, for example, a rolling, spreading, spraying, brushing, or pouring coating process that is followed by drying; by coextruding the copolyether esters of the present invention with other materials; by powder coating the copolyetheresters of the present invention onto the preformed substrate; or by melt/extrusion coating a preformed substrate with the copolyetheresters of the present invention. The substrate can be coated either on one side with the polymeric compositions of the present invention, or on both sides. The polymeric coated substrates have a variety of uses, such as in packaging, especially of foodstuffs, and as disposable cups, plates, bowls and cutlery. For many of these uses, the heat resistance of the coating is an important factor. Therefore, a higher melting point, $T_g$, and crystallinity level are desirable to provide better heat resistance, along with a rapid biodegradation rate. Further, it is desired that these coatings provide good barrier properties for moisture, grease, oxygen, and carbon dioxide, and have good tensile strength and high elongation at break.

The copolyetherester coating of the present invention can be made in accordance with any process known in the art. For example, thin coatings can be formed through dipcoating, as disclosed, for example, in U.S. Pat. No. 4,372,311 and U.S. Pat. No. 4,503,098; extrusion onto substrates, as disclosed, for example, in U.S. Pat. No. 5,294,483, U.S. Pat. No. 5,475,080, U.S. Pat. No. 5,611,859, U.S. Pat. No. 5,795,320, U.S. Pat. No. 6,183,814, and U.S. Pat. No. 6,197,380; blade; puddle; air-knife; printing; Dahlgren; gravure; powder coating; and spraying. The coatings of the present invention can have any thickness, but preferably the coating thickness is less than or equal to 0.25 mm (10 mils), and more preferably is between about 0.025 mm and about 0.15 mm (1 mil and 6 mils). The coatings can, however, be as thick as up to about 0.50 mm (20 mils) or greater.

Various substrates can be directly coated with the film. The coating of the present invention is preferably applied via solution, dispersion, latex, and emulsion casting; powder coating; or extrusion onto a preformed substrate.

Solution casting the coating produces a more consistently uniform gauged coating than is produced by melt extrusion. Solution casting involves the dissolution of polymeric granules, powder or the like in a suitable solvent with any desired formulant, such as a plasticizer, filler, blendable polymeric material, or colorant. The solution is then filtered to remove dirt or large particles and cast from a slot die onto a moving preformed substrate, dried, whereon the coating cools. An extruded coating is five to ten times thicker than a coating that is solution cast. A solution cast coating can be finished in a like manner to an extruded coating. Similarly, polymeric dispersions and emulsions can be coated onto substrates through equivalent processes. The coatings can be applied to, for example, textiles; nonwovens; foil; paper; paperboard; and other sheet materials via a continuously operating spread-coating machine. A coating knife, such as a "doctor knife", ensures uniform spreading of the coating materials (in the form of solution, emulsions, or dispersions in water or an organic medium) on the supporting material, which is moved along by rollers. The coating is then dried. Alternatively, the polymeric solution, emulsion, or dispersion can be sprayed, brushed, rolled or poured onto the substrate.

Potts, for example, discloses in U.S. Pat. No. 4,372,311 and U.S. Pat. No. 4,503,098 that water-soluble substrates can be coated with solutions of water-insoluble materials. U.S. Pat. No. 3,378,424 further discloses processes for coating a fibrous substrate with an aqueous polymeric emulsion.

The polymers of the present invention can also be applied to a substrate through a powder coating process. In a powder coating process, the polymers are applied to the substrate in the form of a powder having fine particle sizes. The substrate to be coated is heated to a temperature above the fusion temperature of the polymer, wherein the heated substrate is subsequently dipped into a bed of polymer powder fluidized by the passage of air through a porous plate. The fluidized bed is typically not heated. A layer of the polymer adheres to the hot substrate surface and melts to provide the coating. Coating thicknesses can range from about 0.005 inch to about 0.080 inch (0.13 to 2.00 mm). Other powder coating processes include spray coating, wherein the substrate is not heated until after it is coated, and electrostatic coating. For example, U.S. Pat. No. 4,117,971; U.S. Pat. No. 4,168,676; U.S. Pat. No. 4,180,844; U.S. Pat. No. 4,211,339; and U.S. Pat. No. 4,283,189 discloses that paperboard containers can be electrostatically spray-coated with a thermoplastic polymer powder, wherein the containers are heated to melt the powder and form a laminated coating.

The whirl sintering process can be used to coat metal articles of complex shapes with the polymeric films of the present invention. The articles are heated to a temperature above the melting point of the polymer, and then introduced into a fluidized bed of polymer powder where the polymer particles that are held in suspension by a rising stream of air are deposited as a coating onto the article by sintering.

Coatings of the present invention can also be applied by spraying the molten atomized polymeric composition onto a substrate, such as paperboard. U.S. Pat. No. 5,078,313; U.S. Pat. No. 5,281,446; and U.S. Pat. No. 5,456,754, for example, disclose such a process for wax coatings.

In this manner, films of different widths and thicknesses can be produced. After extrusion, the polymeric film is taken up on rollers, cooled, and then taken off by means of a suitable device designed to prevent subsequent deformation of the film.

The coatings of the present invention are preferably formed through melt or extrusion coating processes. Extrusion is particularly preferred for formation of "endless" products, such as coated paper and paperboard, which emerge as a continuous length. In extrusion, the polymeric material, whether provided as a molten polymer or as plastic pellets or granules, is fluidized and homogenized. Additives, as already described hereinabove, can also be added. The mixture is then forced through a suitably shaped die to produce the desired cross-sectional film shape. The extruding force can be exerted by either a piston or ram (ram extrusion), or a rotating screw (screw extrusion), which operates within a cylinder in which the material is heated and plasticized. Single screw, twin screw, and multi-screw extruders known in the art can be used. Different kinds of die are used to produce different products. Typically slot dies, such as T-shaped or "coat hanger" dies, are used for extrusion coatings. In this manner, films of different widths and thicknesses can be produced, and can be extruded directly onto the object to be coated. For example, the thin molten nascent film exits the die and is pulled down onto the substrate and into a nip between a chill roll and a pressure roll situated directly below the die. Typically, the nip rolls are a pair of cooperating axially parallel rolls, one being a pressure roll having a rubber surface and the other being a chill roll. Typically, the uncoated side of the substrate contacts the pressure roll while the polymer-coated side of the substrate contacts the chill roll. The pressure between the two rolls forces the film onto the substrate. At the same time, the substrate is moving at a speed faster than the extruded film, and therefore is able to draw the film down to the required thickness. In extrusion coating, the pressure roll presses the extruded polymeric melt onto the substrate thereby enabling the polymer to impregnate the substrate for maximum adhesion. The molten film is then cooled by the water-cooled chromium-plated chill rolls. The coated substrate can be passed through a slitter to trim the edges, and is then removed by a device that is designed to prevent deformation of the coated substrate.

Extrusion coating a polyester onto paperboard is disclosed, for example, in U.S. Pat. No. 3,924,013; U.S. Pat. No. 4,147,836; U.S. Pat. No. 4,391,833; U.S. Pat. No. 4,595,611; U.S. Pat. No. 4,957,578; and U.S. Pat. No. 5,942,295. Kane, for example, discloses in U.S. Pat. No. 3,924,013 that ovenable trays can be mechanically formed from paperboard previously laminated with polyester. Chaffey et. al., for example, discloses in U.S. Pat. No. 4,836,400 that cups can be formed from paper stock that has been coated with a polymer on both sides. Beavers et. al., for example, discloses in U.S. Pat. No. 5,294,483 that certain polyesters can be extrusion coated onto paper substrates.

As a further example of extrusion coating, wires and cable may be sheathed directly with polymeric films extruded from oblique heads.

Calendering processes can also be used to apply polymeric laminates to a substrate. Calenders can consist of two, three, four, or five hollow rolls arranged for steam heating or water cooling. Typically, the polymer to be calendered is softened, for example, in ribbon blenders, such as a Banbury mixer. Other components, such as plasticizers, can also be added to the polymer. The softened polymeric composition is then fed to the roller arrangement and squeezed into the form of a film. If desired, thick sections can be formed by applying one layer of polymer onto a previous layer (double plying). A substrate, such as textile and nonwoven fabrics and paper, is fed through the last two rolls of the calender where the resin film is pressed onto the substrate. The thickness of the laminate is determined by the gap between the last two rolls of the calender. The surface can be made glossy, matte, or embossed. The laminate is subsequently cooled and wound up on rolls.

Production processes are well known, for example, as disclosed in U.S. Pat. No. 3,748,962; U.S. Pat. No. 4,522,203; U.S. Pat. No. 4,734,324; U.S. Pat. No. 5,261,899; and U.S. Pat. No. 6,309,736. For example, El-Afandi et. al. in U.S. Pat. No. 5,849,374; U.S. Pat. No. 5,849,401; and U.S. Pat. No. 6,312,823 disclose compostable multilayer films with a core poly(lactide) layer with inner and outer layers of blocking reducing layers composed of, for example, aliphatic polyesters.

Multilayer films having bilayer, trilayer, and multilayer structures can also be produced. Specific properties of a multilayer film can be advantageously tailored to solve critical use needs while allowing the more costly ingredients to be relegated to the outer layers where they provide the most benefit. Multilayer films can be formed through, for example, coextrusion; dipcoating; solution coating; blade; puddle; air-knife; printing; Dahlgren; gravure; powder coating; and spraying. Generally, the multilayer films are produced through extrusion casting processes. For example, the resin materials are heated in a uniform manner. The molten materials are conveyed to a coextrusion adapter that combines the molten materials to form a multilayer coextruded structure. The layered polymeric material is transferred through an extrusion die opened to a predetermined gap, commonly in the range of between about 0.05 inch (0.13 cm) and 0.012 inch (0.03 cm). The material is then pulled down onto a substrate and into a nip between a chill roll and a pressure roll situated directly below the die. The material is drawn down to the desired thickness based on the speed of the substrate. The primary chill or casting roll is maintained typically at a temperature in the range of about 150 to 55° C. Typically, the draw down ratio ranges from about 5:1 to about 40:1. The additional layers can serve as, for example, barrier layers; adhesive layers; and/or antiblocking layers. Furthermore, for example, the inner layers can be filled and the outer layers can be unfilled, as is disclosed in U.S. Pat. No. 4,842,741 and U.S. Pat. No. 6,309,736. Production processes are well known, for example, as disclosed in U.S. Pat. No. 3,748,962; U.S. Pat. No. 4,522,203; U.S. Pat. No. 4,734,324; U.S. Pat. No. 5,261,899; and U.S. Pat. No. 6,309,736. El-Afandi et. al. disclose in, for example, U.S. Pat. No. 5,849,374; U.S. Pat. No. 5,849,401; and U.S. Pat. No. 6,312,823 compostable multilayer films with a core poly(lactide) layer with inner and outer layers of blocking reducing layers composed of, for example, aliphatic polyesters. Kuusipalo et. al. disclose in, for example, WO 00/01530 paper and paperboard that is coated with poly (lactide) and biodegradable adhesive layers, such as aliphatic-aromatic polyesters.

The additional layers can be comprised of either the sulfonated aromatic copolyetheresters of the present invention, or materials that are either biodegradable or non-biodegradable, wherein a non-limiting list of at least some examples of acceptable biodegradable and non-biodegradable materials is already set forth hereinabove. The materials can be naturally derived; modified naturally derived; or synthetic, wherein a non-limiting list of at least some examples of natural polymeric materials is already set forth hereinabove.

Generally, a coating having a thickness of from about 0.2 to about 15 mils, and more generally from about 0.5 to about 2 mils is applied to the substrate. The thickness of the substrate can vary widely, but commonly ranges from about 0.5 to more than about 24 mils thick.

Suitable substrates for the present invention include, but are not limited to, articles composed of paper; paperboard; cardboard; fiberboard; cellulose, such as Cellophane®; starch; plastic; polystyrene foam; glass; metal, for example, aluminum or tin cans; metal foils; polymeric foams; organic foams; inorganic foams; organic-inorganic foams; and polymeric films.

Preferably, biodegradable substrates, such as paper, paperboard, cardboard, cellulose, and starch; and biobenign substrates, such as inorganic and inorganic-organic foams are used.

Preferably, the polymeric films are comprised of either the sulfonated aromatic copolyetheresters of the present invention, or of materials that are either biodegradable, or non-biodegradable. The materials may be naturally derived; modified naturally derived; or synthetic.

Biodegradable materials suitable as substrates include, but are not limited to, poly(hydroxy alkanoates); polycarbonates; poly(caprolactone); aliphatic polyesters; aliphatic-aromatic copolyesters; aliphatic-aromatic copolyetheresters; aliphatic-aromatic copolyamideesters; sulfonated aliphatic-aromatic copolyesters; sulfonated aliphatic-aromatic copolyetheresters; sulfonated aliphatic-aromatic copolyamideesters; and copolymers and mixtures thereof.

Specific examples of biodegradable materials suitable as substrates include, but are not limited to Biomax® sulfonated aliphatic-aromatic copolyesters of the DuPont Company; Eastar Bio® aliphatic-aromatic copolyesters of the Eastman Chemical Company; Ecoflex® aliphatic-aromatic copolyesters of the BASF Corporation; poly(1,4-butylene terephthalate-co-adipate (50:50 molar); EnPol® polyesters of the Ire Chemical Company; poly(1,4-butylene succinate); Bionolle® polyesters of the Showa High Polymer Company; poly(ethylene succinate); poly(1,4-butylene adipate-co-succinate); poly(1,4-butylene adipate); poly(amide esters); Bak® poly(amide esters) of the Bayer Company; poly(ethylene carbonate); poly(hydroxybutyrate); poly(hydroxyvalerate); poly(hydroxybutyrate-co-hydroxyvalerate); Biopol® poly(hydroxy alkanoates) of the Monsanto Company; poly(lactide-co-glycolide-co-caprolactone); Tone® poly(caprolactone) of the Union Carbide Company; EcoPLA® poly(lactide) of the Cargill Dow Company; and copolymers and mixtures thereof. This should not be taken as limiting. Essentially any biodegradable material can be used as a substrate.

The non-biodegradable polymeric materials suitable as substrates include, but are not limited to polyethylene; high density polyethylene; low density polyethylene; linear low density polyethylene; ultralow density polyethylene; polyolefins; poly(ethylene-co-g lycidylmethacrylate); poly(ethylene-co-methyl (meth)acrylate-co-glycidyl acrylate); poly(ethylene-co-n-butyl acrylate-co-glycidyl acrylate); poly(ethylene-co-methyl acrylate); poly(ethylene-co-ethyl acrylate); poly(ethylene-co-butyl acrylate); poly(ethylene-co-(meth)acrylic acid); metal salts of poly(ethylene-co-(meth)acrylic acid); poly((meth)acrylates), such as poly(methyl methacrylate), and poly(ethyl methacrylate); poly(ethylene-co-carbon monoxide); poly(vinyl acetate); poly(ethylene-co-vinyl acetate); poly(vinyl alcohol); poly(ethylene-co-vinyl alcohol); polypropylene; polybutylene; poly(cyclic olefins); polyesters; poly(ethylene terephthalate); poly(1,3-propylene terephthalate); poly(1,4-butylene terephthalate); PETG; poly(ethylene-co-1,4-cyclohexanedimethanol terephthalate); poly(vinyl chloride); poly(vinylidene chloride) (PVDC); polystyrene; syndiotactic polystyrene; poly(4-hydroxystyrene); novalacs; poly(cresols); polyamides; nylon; nylon 6; nylon 46; nylon 66; nylon 612; polycarbonates; poly(bisphenol A carbonate); polysulfides; poly(phenylene sulfide); polyethers; poly(2,6-dimethylphenylene oxide); polysulfones; and copolymers and mixtures thereof.

Natural polymeric materials suitable as substrates include, but are not limited to starch; starch derivatives; modified starch; thermoplastic starch; cationic starch; anionic starch; starch esters, such as starch acetate; starch hydroxyethyl ether; alkyl starches; dextrins; amine starches; phosphate starches; dialdehyde starches; cellulose; cellulose derivatives; modified cellulose; cellulose esters, such as cellulose acetate, cellulose diacetate, cellulose priopionate, cellulose butyrate, cellulose valerate, cellulose triacetate, cellulose tripropionate, and cellulose tributyrate, and cellulose mixed esters, such as cellulose acetate propionate and cellulose acetate butyrate; cellulose ethers, such as methylhydroxyethylcellulose, hydroxymethylethylcellulose, carboxymethylcellulose, methyl cellulose, ethylcellulose, hydroxyethylcellulose, and hydroxyethylpropylcellulose; polysaccharides; alginic acid; alginates; phycocolloids; agar; gum arabic; guar gum; acaia gum; carrageenan gum; furcellaran gum; ghatti gum; psyllium gum; quince gum; tamarind gum; locust bean gum; gum karaya; xantahn gum; gum tragacanth; proteins; Zein® (a prolamine derived from corn); collagen (extracted from animal connective tissue and bones) and derivatives thereof, such as gelatin and glue; casein (the principle protein in cow milk); sunflower protein; egg protein; soybean protein; vegetable gelatins; gluten; and mixtures thereof. Thermoplastic starch can be produced, for example, as disclosed in U.S. Pat. No. 5,362,777, wherein native or modified starch is mixed and heated with high boiling plasticizers, such as glycerin or sorbitol, in such a way that the starch has little or no crystallinity, a low $T_g$, and a low water content.

Organic foams, such as derived from expanded starches and grains, can also be used in the present invention. Organic foams are disclosed in, for example, U.S. Pat. No. 3,137,592; U.S. Pat. No. 4,673,438; U.S. Pat. No. 4,863,655; U.S. Pat. No. 5,035,930; U.S. Pat. No. 5,043,196; U.S. Pat. No. 5,095,054; U.S. Pat. No. 5,300,333; U.S. Pat. No. 5,413,855; U.S. Pat. No. 5,512,090; and U.S. Pat. No. 6,106,753. Specific organic foams include, but are not limited to EcoFoam®, a hydroxypropylated starch product of the National Starch Company of Bridgewater, N.J.; and EnviroFil®, a product of the EnPac Company (a DuPont-Con Agra Company).

Preferred organic-inorganic foams are cellular highly inorganically filled with, for example, calcium carbonate, clays, cement, or limestone; have a starch-based binder, such as, for example, potato starch, corn starch, waxy corn starch, rice starch, wheat starch, and tapioca; and have a small amount of fiber, as disclosed, for example, by Andersen et.

al. in U.S. Pat. No. 6,030,673. The organic-inorganic foams are produced by mixing ingredients, such as limestone, potato starch, fiber and water, together to form a batter. The batter is pressed between two heated molds to form the foamed product, wherein the water contained in the batter is turned to steam, thereby raising the pressure in the mold. Foam products produced through this process are commercially available from the EarthShell Packaging Company, and currently include 9-inch plates, 12-ounce bowls and hinged-lid sandwich and salad containers ("clam shells").

Further art disclosures for the organic; inorganic; and organic-inorganic foam substrates include, for example, U.S. Pat. No. 5,095,054; U.S. Pat. No. 5,108,677; U.S. Pat. No. 5,234,977; U.S. Pat. No. 5,258,430; U.S. Pat. No. 5,262,458; U.S. Pat. No. 5,292,782; U.S. Pat. No. 5,376,320; U.S. Pat. No. 5,382,611; U.S. Pat. No. 5,405,564; U.S. Pat. No. 5,412,005; U.S. Pat. No. 5,462,980; U.S. Pat. No. 5,462,982; U.S. Pat. No. 5,512,378; U.S. Pat. No. 5,514,430; U.S. Pat. No. 5,549,859; U.S. Pat. No. 5,569,514; U.S. Pat. No. 5,569,692; U.S. Pat. No. 5,576,049; U.S. Pat. No. 5,580,409; U.S. Pat. No. 5,580,624; U.S. Pat. No. 5,582,670; U.S. Pat. No. 5,614,307; U.S. Pat. No. 5,618,341; U.S. Pat. No. 5,626,954; U.S. Pat. No. 5,631,053; U.S. Pat. No. 5,658,603; U.S. Pat. No. 5,658,624; U.S. Pat. No. 5,660,900; U.S. Pat. No. 5,660,903; U.S. Pat. No. 5,660,904; U.S. Pat. No. 5,665,442; U.S. Pat. No. 5,679,145; U.S. Pat. No. 5,683,772; U.S. Pat. No. 5,705,238; U.S. Pat. No. 5,705,239; U.S. Pat. No. 5,709,827; U.S. Pat. No. 5,709,913; U.S. Pat. No. 5,753,308; U.S. Pat. No. 5,766,525; U.S. Pat. No. 5,770,137; U.S. Pat. No. 5,776,388; U.S. Pat. No. 5,783,126; U.S. Pat. No. 5,800,647; U.S. Pat. No. 5,810,961; U.S. Pat. No. 5,830,305; U.S. Pat. No. 5,830,548; U.S. Pat. No. 5,843,544; U.S. Pat. No. 5,849,155; U.S. Pat. No. 5,868,824; U.S. Pat. No. 5,879,722; U.S. Pat. No. 5,897,944; U.S. Pat. No. 5,910,350; U.S. Pat. No. 5,928,741; U.S. Pat. No. 5,976,235; U.S. Pat. No. 6,083,586; U.S. Pat. No. 6,090,195; U.S. Pat. No. 6,146,573; U.S. Pat. No. 6,168,857; U.S. Pat. No. 6,180,037; U.S. Pat. No. 6,200,404; U.S. Pat. No. 6,214,907; U.S. Pat. No. 6,231,970; U.S. Pat. No. 6,242,102; U.S. Pat. No. 6,347,934; U.S. Pat. No. 6,348,524; and U.S. Pat. No. 6,379,446. This should not be considered limiting. Essentially any material known can be used as a substrate in the present invention.

To enhance the coating process, the substrates can be treated by known conventional post forming operations, such as corona discharge; chemical treatments, such as primers; flame treatments; and adhesives. The substrate layer can be primed with, for example, an aqueous solution of polyethyleneimine (Adcote® 313) or a styrene-acrylic latex, or may be flame treated, as disclosed in U.S. Pat. No. 4,957,578 and U.S. Pat. No. 5,868,309.

The substrate can be coated with an adhesive, either through conventional coating technologies or through extrusion.

Adhesives that can be used in the present invention include, but are not limited to glue; gelatine; caesin; starch; cellulose esters; aliphatic polyesters; poly(alkanoates); aliphatic-aromatic polyesters; sulfonated aliphatic-aromatic polyesters; polyamide esters; rosin/polycaprolactone triblock copolymers; rosin/poly(ethylene adipate) triblock copolymers; rosin/poly(ethylene succinate) triblock copolymers; poly(vinyl acetates); poly(ethylene-co-vinyl acetate); poly(ethylene-co-ethyl acrylate); poly(ethylene-co-methyl acrylate); poly(ethylene-co-propylene); poly(ethylene-co-1-butene); poly(ethylene-co-1-pentene); poly(styrene); acrylics; Rhoplex® N-1031 (an acrylic latex from the Rohm & Haas Company); polyurethanes; AS 390 (an aqueous polyurethane adhesive base for Adhesion Systems, Inc.) with AS 316 (an adhesion catalyst from Adhesion Systems, Inc.); Airflex® 421 (a water-based vinyl acetate adhesive formulated with a crosslinking agent); sulfonated polyester urethane dispersions, such as, for example, are sold by the Bayer Corporation as Dispercoll® U-54, Dispercoll® U-53, and Dispercoll® KA-8756; nonsulfonated urethane dispersions, such as, for example, are sold by the Reichold Company as Aquathane® 97949 and Aquathane® 97959, the Air Products Company as Flexthane® 620 and Flexthane® 630, the BASF Corporation as Luphen® D DS 3418 and Luphen® D 200A, the Zeneca Resins Company as Neorez® 9617 and Neorez® 9437, the Merquinsa Company as Quilastic® DEP 170 and Quilastic® 172, the B. F. Goodrich Company as Sancure® 1601 and Sancure® 815; urethane-styrene polymer dispersions, such as, for example, are sold by the Air Products & Chemicals Company as Flexthane® 790 and Flexthane® 791; non-ionic polyester urethane dispersions, such as, for example, are sold by Zeneca Resins as Neorez® 9249; acrylic dispersions, such as, for example, are sold by the Jager Company as Jagotex® KEA-5050 and Jagotex® KEA 5040, B. F. Goodrich as Hycar® 26084, Hycar® 26091, Hycar® 26315, Hycar® 26447, Hycar® 26450, and Hycar® 26373, and the Rohm & Haas Company as Rhoplex® AC-264, Rhoplex® HA-16, Rhoplex® B-60A, Rhoplex® AC-234, Rhoplex® E-358, and Rhoplex® N-619; silanated anionic acrylate-styrene polymer dispersions, such as, for example, are sold by the BASF Corporation as Acronal® S-710 and Scott Bader, Inc. as Texigel® 13-057; anionic acrylate-styrene dispersions, such as, for example, are sold by the BASF Corporation as Acronal® 296D, Acronal® NX 4786, Acronal® S-305D, Acronal® S-400, Acronal® S-610, Acronal® S-702, Acronal® S-714, Acronal® S-728, and Acronal® S-760, B. F. Goodrich as Carboset® CR-760, Rohm & Haas as Rhoplex® P-376, Rhoplex® P-308, and Rhoplex® NW-1715K, Reichold Chemicals as Synthemul® 40402 and Synthemul® 40403, Scott Bader, Inc. as Texigel® 13-57, Texigel® 13-034, and Texigel® 13-031, and the Air Products & Chemicals Company as Vancryl® 954, Vancryl® 937 and Vancryl® 989; anionic acrylate-styrene-acrylonitrile dispersions, such as, for example, are sold by BASF Corporation as Acronal® S 886S, Acronal® S 504, and Acronal® DS 2285 X; acrylate-acrylonitrile dispersions, such as, for example, are sold by BASF Corporation as Acronal® 35D, Acronal® 81 D, Acronal® B 37D, Acronal® DS 3390, and Acronal® V275; vinyl chloride-ethylene emulsions, such as, for example, are sold by Air Products and Chemicals as Vancryl® 600, Vancryl® 605, Vancryl® 610, and Vancryl® 635; vinylpyrrolidone/styrene copolymer emulsions, such as, for example, are sold by ISP Chemicals as Polectron® 430; carboxylated and noncarboxylated vinyl acetate ethylene dispersions, such as, for example, are sold by Air Products and Chemicals as Airflex® 420, Airflex® 421, Airflex® 426, Airflex® 7200, and Airflex® A-7216, and ICI as Dur-o-set® E150 and Dur-o-set® E-230; vinyl acetate homopolymer dispersions, such as, for example, are sold by ICI as Resyn® 68-5799 and Resyn® 25-2828; polyvinyl chloride emulsions, such as, for example, are sold by B. F. Goodrich as Vycar® 460x24, Vycar® 460x6 and Vycar® 460x58; polyvinylidene fluoride dispersions, such as, for example, are sold by Elf Atochem as Kynar® 32; ethylene acrylic acid dispersions, such as, for example, are sold by Morton International as Adcote® 50T4990 and Adcote® 50T4983; polyamide dispersions, such as, for example, are sold by the Union Camp Corporation as Micromid® 121 RC, Micromid® 141 L, Micromid® 142LTL, Micromid®

143LTL, Micromid® 144LTL, Micromid® 321 RC, and Micromid® 632HPL; anionic carboxylated or noncarboxylated acrylonitrile-butadiene-styrene emulsions and acrylonitrile emulsions, such as, for example, are sold by B. F. Goodrich as Hycar® 1552, Hycar® 1562x107, Hycar® 1562x117 and Hycar® 1572x64; resin dispersions derived from styrene, such as, for example are sold by Hercules as Tacolyn® 5001 and Piccotex® LC-55WK; resin dispersions derived from aliphatic and/or aromatic hydrocarbons, such as, for example are sold by Exxon as Escorez® 9191, Escorez® 9241, and Escorez® 9271; styrene-maleic anhydrides, such as, for example, are sold by AtoChem as SMA® 1440H and SMA® 1000; and mixtures thereof. This should not be considered limiting. Essentially any adhesive known can be used.

Preferably, the substrate is coated with a biodegradable adhesive binder layer, such as, for example, glue; gelatine; casein; and/or starch. The adhesives can be applied through either a melt process, or a solution, emulsion, dispersion, or coating process.

U.S. Pat. No. 4,343,858, for example, discloses a coating process wherein a paperboard is coated with a polyester top film that is coextruded with an intermediate layer of an ester of acrylic acid, methacrylic acid, or ethacrylic acid. U.S. Pat. No. 4,455,184, for example, further discloses a process wherein a polyester layer is coextruded with a polymeric adhesive layer onto a paperboard substrate. Fujita et. al., for example, discloses in U.S. Pat. No. 4,543,280 that an adhesive can be used in the extrusion coating of a polyester onto ovenable paperboard. Huffman et. al., for example, discloses in U.S. Pat. No. 4,957,578 that a polyester layer can be extruded onto a polyethylene coated paperboard. The polyethylene layer can be corona discharge or flame treated to promote adhesion. Furthermore, a process comprising the coextrusion of a polyethylene and polyester layer, wherein the polyethylene layer is extruded onto a paperboard substrate and the polyester layer is extruded onto the polyethylene layer, further wherein a tie layer of Bynel® is contained between the polyethylene layer and the polyester layer is disclosed.

A person of ordinary skill in the art can readily determine the process conditions and parameters needed to coat a substrate with any given polymeric composition, including the sulfonated copolyetheresters of the present invention, by using any method known in the art, as well as, how to choose an appropriate coating for any application.

The properties of the coating will depend on a combination of factors, as already set forth hereinabove, including, but not limited to, the polymeric composition; the method of forming the polymer; the method of forming the coating; and whether the coating is oriented during manufacturing. These factors affect many properties of the coating, such as, for example, shrinkage; tensile strength; elongation at break; impact strength; dielectric strength and constant; tensile modulus; chemical resistance; melting point; and heat deflection temperature.

The coating properties can be further adjusted by adding certain additives and fillers to the polymeric composition, wherein a non-limiting list of at least some examples of additives and fillers is already set forth hereinabove. Alternatively, the sulfonated aromatic copolyetheresters of the present invention can be blended with at least one other polymeric material to improve certain characteristics, wherein a non-limiting list of at least some examples of polymeric materials is already set forth hereinabove.

A substrate can be formed into a desired article either prior to being coated, or after being coated. For example, containers can be produced from flat coated paperboard by being press formed; vacuum formed; or folded and adhered to form the desired shape. Flat coated paperboard stock can be, for example, either formed into trays through the application of heat and pressure as U.S. Pat. No. 4,900,594 discloses, or vacuum formed into containers for foods and beverages as U.S. Pat. No. 5,294,483 discloses. The desired articles include, but are not limited to cutlery; flower pots; mailing tubes; light fixtures; ash trays; game boards; food containers; fast food containers; cartons; boxes; milk cartons; fruitjuice containers; carriers for beverage containers; ice cream cartons; cups; disposable drinking cups; two-piece cups; one-piece pleated cups; cone cups; coffee cups; lidding; lids; straws; cup tops; french fry containers; fast food carry out boxes; packaging; support boxes; confectionery boxes; cosmetic boxes; plates; bowls; vending plates; pie plates; trays; baking trays; breakfast plates; microwavable dinner trays; "TV" dinner trays; egg cartons; meat packaging platters; disposable single use liners that can be utilized with containers, such as cups or food containers; substantially spherical objects; bottles; jars; crates; dishes; medicine vials; and interior packaging, such as partitions, liners, anchor pads, corner braces, corner protectors, clearance pads, hinged sheets, trays, funnels, cushioning materials, and other objects used in packaging, storing, shipping, portioning, serving, or dispensing an object within a container.

Water-resistant polymer coated paper and paperboard are commonly used as packaging material for foodstuffs and disposable containers. Coating polymers and multilamellar coating structures applied to such water-resistant polymer coated paper and paperboard have been developed that give a package good oxygen, water vapor, and aroma tightness, thereby enabling the package to provide the packaged product with good preservation.

The coatings comprised of the sulfonated aromatic copolyetheresters of the present invention can be used in a wide variety of areas. For example, the coatings can be used as a component of personal sanitary items, such as disposable diapers; incontinence briefs; feminine pads; sanitary napkins; tampons; tampon applicators; motion sickness bags; baby pants; and personal absorbent products. The coatings of the present invention combine excellent water barrier properties, to avoid leak through, with excellent toughness to easily conform to the body and stretch with body movements during use. Additionally, a soiled sanitary item that is properly discarded can biocompost rapidly.

The coatings of the present invention can also be used in, for example, protective agriculture films, such as mulch films, seed coverings, and agriculture mats containing seeds ("seed tapes"); garbage/trash bags; lawn waste bags; adhesive tape substrates; bags; bag closures; bed sheets; bottles; cartons; dust bags; fabric softener sheets; garment bags; industrial bags; waste bin liners; compost bags; labels; tags; pillow cases; bed liners; bedpan liners; bandages; boxes; handkerchiefs; pouches; wipes; protective clothing; surgical gowns; surgical sheets; surgical sponges; temporary enclosures; temporary siding; and toys.

The coatings of the present invention are preferably used in food packaging, especially fast food packaging. Specific examples of food packaging are already set forth in a non-limiting list hereinabove.

The coatings of the present invention are also preferably used in wraps. Such wraps can take the form of a polymeric coated paper. Examples of specific ways in which wraps can be used are set forth hereinabove in a non-limiting list. Preferably, the coatings used in the wraps have a good balance of physical properties, such as paper-like stiffness that enable the wrap to be tough enough to avoid tearing when used to wrap, for example, a sandwich; have good deadfold characteristics, so that once folded, wrapped or otherwise manipulated into the desired shape, the wrap does not spontaneously unfold or unwrap; have good grease resistance, where desired; and have a good moisture barrier balance that does not allow moisture to condense on, for example, the sandwich. The wraps can have either a smooth surface; or a textured surface, such as is formed by embossing, crimping, and/or quilting. The wraps can be filled with, for example, inorganic particles; organic particles, such as starch; and/or combinations thereof.

A further preferred aspect of the present invention includes laminating the sulfonated aromatic copolyetheresters of the present invention onto substrates; the process for producing such laminates; and the articles derived therefrom. The films comprising the sulfonated aromatic copolyetheresters of the present invention, prepared as described hereinabove, can be laminated onto a wide variety of substrates through any known prior art process including, for example, thermoforming; vacuum thermoforming; vacuum lamination; pressure lamination; mechanical lamination; skin packaging; and adhesion lamination. A laminate is differentiated from a coating in that a laminate involves attaching a preformed film to a substrate. The substrate can either be in the final use shape, such as in the form of a plate, cup, bowl, or tray, or be in an intermediate shape, such as a sheet or film. The film can be attached to the substrate through the application of heat and/or pressure, as with, for example heated bonding rolls. Generally speaking, the laminate bond and/or peel strength can be enhanced by using higher temperatures and/or pressures. When adhesives are used, the adhesive can be a hot melt or solvent based adhesive. To enhance the lamination process, the films of the present invention and/or the substrates can be treated by known conventional post forming operations, examples of which have already been described hereinabove. U.S. Pat. No. 4,147,836, for example, discloses that laminating a paperboard substrate with a poly(ethylene terephthalate) film can be enhanced by subjecting the paperboard to a corona discharge. Quick et. al., for example, discloses in U.S. Pat. No. 4,900,594 that corona treatment can aide in the lamination of a polyester film to a paperstock with adhesives. Schirmer, for example, discloses in U.S. Pat. No. 5,011,735 that corona treatments can be used to aid in the adhesion between various blown films. U.S. Pat. No. 5,679,201 and U.S. Pat. No. 6,071,577, for example, disclose that flame treatments can be used as adhesion aids in polymeric lamination processes. Sandstrom et. al., for example, discloses in U.S. Pat. No. 5,868,309 that a paperboard substrate primer consisting of certain styrene-acrylic materials can be used to improve the adhesion with polymeric laminates.

Processes for producing polymeric coated or laminated paper and paperboard substrates for use as containers and cartons is well known, for example, as disclosed in U.S. Pat. No. 3,863,832; U.S. Pat. No. 3,866,816; U.S. Pat. No. 4,337,116; U.S. Pat. No. 4,456,164; U.S. Pat. No. 4,698,246; U.S. Pat. No. 4,701,360; U.S. Pat. No. 4,789,575; U.S. Pat. No. 4,806,399; U.S. Pat. No. 4,888,222; and U.S. Pat. No. 5,002,833. Kane, for example, discloses in U.S. Pat. No. 3,924,013 that ovenable trays can be mechanically formed from paperboard previously laminated with polyester. Schmidt, for example, discloses in U.S. Pat. No. 4,130,234 the polymeric film lamination of paper cups. The lamination of films onto nonwoven fabrics is, for example, disclosed in U.S. Pat. No. 6,045,900 and U.S. Pat. No. 6,309,736.

Depending on the intended use of the polyester laminated substrate, the substrate can be laminated on either one side, or both sides.

In laminating the films of the present invention onto flat substrates, the films can be passed through heating and pressure/nip rolls. More commonly, the films of the present invention are laminated onto a substrate via a process derived from thermoforming. As such, the films may be laminated onto substrates through, for example, vacuum, pressure, blow, and/or mechanical lamination. When the films of the present invention are heated, they soften and may be stretched onto a substrate of any given shape. Processes for adhering a polymeric film to a preformed substrate are disclosed, for example, in U.S. Pat. No. 2,590,221.

In vacuum lamination, the film of the present invention can be clamped or simply held against the substrate. The film is laminated to the substrate by being heated until becoming soft and then applying a vacuum, typically through pores or designed-in holes in the substrate, that enables the softened film to mold into the contours of the substrate. The as formed laminate is then cooled. The vacuum can, but does not have to be maintained during the cooling process.

For substrate shapes requiring a deep draw, such as, for example, cups, deep bowls, boxes, and cartons a plug assist can be utilized. In such substrate shapes, the softened film tends to thin out significantly before it reaches the base or bottom of the substrate shape, and therefore tends to leave a thin and weak laminate on the bottom of the substrate. A plug assist is any type of mechanical helper that carries more film stock to an area of the substrate where the lamination would otherwise be too thin. Plug assist techniques may be adapted to vacuum and pressure lamination processes.

Vacuum laminating processes are disclosed, for example, in U.S. Pat. No. 4,611,456 and U.S. Pat. No. 4,862,671. Knoell, for example, discloses in U.S. Pat. No. 3,932,105 a process for vacuum laminating a film onto a folded paperboard carton. Lee et. al., for example, discloses in U.S. Pat. No. 3,957,558 a process for vacuum laminating a thermoplastic film onto a molded pulp product, such as a plate. Foster et. al., for example, discloses in U.S. Pat. No. 4,337,116 a process for laminating a poly(ethylene terephthalate) film onto a preformed molded pulp container by preheating the pulp container and the film, pressing the film into contact with the substrate and applying vacuum through the molded pulp container substrate. Plug assisted vacuum lamination processes are also disclosed. Wommelsdorf et. al., for example, discloses in U.S. Pat. No. 4,124,434 a plug assisted vacuum lamination process for deep drawn laminates, such as coated cups. Faller, for example, discloses in U.S. Pat. No. 4,200,481 and U.S. Pat. No. 4,257,530 a plug assisted vacuum lamination process for producing lined trays.

Pressure lamination is the opposite of vacuum lamination. The film of the present invention can be clamped, heated until it softens, and then forced into the contours of the substrate to be laminated by applying air pressure to the side of the film that does not face the substrate. Exhaust holes may be present to allow the trapped air to escape, or in the more common situation, the substrate is porous to air, thereby allowing the air to simply escape through the substrate. The air pressure can be released once the laminated substrate cools and the film solidifies. Pressure lamination tends to allow a faster production cycle, improved part definition and greater dimensional control over vacuum lamination.

Pressure lamination of films onto preformed substrates is disclosed, for example, in U.S. Pat. No. 3,657,044 and U.S. Pat. No. 4,862,671. Wommelsdorf, for example, discloses in U.S. Pat. No. 4,092,201, a process for lining an air-permeable container, such as a paper cup, with a thermoplastic foil through use of a warm pressurized stream of gas.

Mechanical lamination includes any lamination method that does not use vacuum or air pressure. In this method, the film of the present invention is heated and then mechanically applied to the substrate. Examples of the mechanical application may include molds or pressure rolls.

Suitable laminating substrates include articles composed of, for example, paper; paperboard; cardboard; fiberboard; cellulose, such as Cellophane®; starch; plastic; polystyrene foam; glass; metal, such as, for example, aluminum or tin cans; metal foils; polymeric foams; organic foams; inorganic foams; organic-inorganic foams; and polymeric films.

Preferably biodegradable substrates, such as, for example, paper, paperboard, cardboard, cellulose, and starch; and biobenign substrates, such as, for example, inorganic and inorganic-organic foams are used.

Suitable biodegradable, non-biodegradable, and/or natural polymeric film materials are set forth hereinabove in non-limiting lists.

Suitable organic foams are described hereinabove. In fact, specific organic and organic-inorganic foams are set forth hereinabove in separate non-limiting lists.

A non-limiting list of prior art disclosing organic, inorganic and organic-inorganic foam substrates has also been set forth hereinabove.

The substrates can be formed into their final shape prior to lamination. Any conventional substrate forming process can be used. For example, a "precision molding", "die-drying", and/or "close-drying" process can be used to mold pulp substrates. The processes include molding fibrous pulp from an aqueous slurry against a screen-covered open-face suction mold to the substantially finished contoured shape, followed by drying the damp pre-form under a strong pressure applied by a mated pair of heated dies. Such processes are disclosed, for example, in U.S. Pat. No. 2,183,869, U.S. Pat. No. 4,337,116, and U.S. Pat. No. 4,456,164. Precision molded pulp articles tend to be dense, hard and boardy, with an extremely smooth, hot-ironed surface finish. Disposable paper plates produced by such processes have been sold under the "Chinet" tradename by the Huhtamaki Company.

Molded pulp substrates can also be produced through the commonly known "free-dried" or "open-dried" processes. In the free-dried process, an aqueous slurry of fibrous pulp is molded via a screen-covered open-faced suction mold to essentially the final molded shape. The damp molded pulp pre-form is then dried in a free space by, for example, placing the pre-form on a conveyor and moving it slowly through a heated drying oven. Molded pulp substrates tend to be characterized by a non-compacted consistency, resilient softness, and irregular fibrous feel and appearance. Molded pulp substrates can also be produced by being "after pressed" after forming through a free-dried process, for example, as disclosed in U.S. Pat. No. 2,704,493. Molded pulp substrates can also produced through other conventional art process, such as disclosed, for example, in U.S. Pat. No. 3,185,370.

The laminated substrates can be converted to the final shape through well known processes, such as press forming or folding up. Such processes are disclosed, for example in U.S. Pat. No. 3,924,013, U.S. Pat. No. 4,026,458, and U.S. Pat. No. 4,456,164. Quick et. al., for example, discloses in U.S. Pat. No. 4,900,594 that pressure and heat can be used to produce trays from flat polyester laminated paperstock.

As indicated above, adhesives can be applied to the film of the present invention, to the substrate, or to the film and the substrate to enhance the bond strength of the laminate. Adhesive lamination of films onto preformed substrates is disclosed, for example, in U.S. Pat. No. 2,434,106; U.S. Pat. No. 2,510,908; U.S. Pat. No. 2,628,180; U.S. Pat. No. 2,917,217; U.S. Pat. No. 2,975,093; U.S. Pat. No. 3,112,235; U.S. Pat. No. 3,135,648; U.S. Pat. No. 3,616,197; U.S. Pat. No. 3,697,369; U.S. Pat. No. 4,257,530; U.S. Pat. No. 4,016,327; U.S. Pat. No. 4,352,925; U.S. Pat. No. 5,037,700; U.S. Pat. No. 5,132,391; and U.S. Pat. No. 5,942,295. Schmidt, for example, discloses in U.S. Pat. No. 4,130,234 that hot melt adhesives can be used in laminating polymeric films to paper cups. Dropsy, for example, discloses in U.S. Pat. No. 4,722,474 that adhesives can be used for plastic laminated cardboard packaging articles. Quick et. al., for example, discloses in U.S. Pat. No. 4,900,594 that pressure and heat can be used to form paperboard trays from a flat polyester laminated paperboard stock adhered with a crosslinkable adhesive system. Martini et. al., for example, discloses in U.S. Pat. No. 5,110,390 that adhesives can be used to laminate coextruded bilayer films to water soluble substrates. Gardiner, for example, discloses in U.S. Pat. No. 5,679,201 and U.S. Pat. No. 6,071,577 that adhesives can be used to improve the bond strength between polyester coated paperboard and polyethylene coated paperboard used in producing, for example, juice containers.

The film can be coated with an adhesive, either through conventional coating technologies or through coextrusion; the substrate can be coated with adhesives; or both the film and the substrate can be coated with adhesives.

A non-limiting list of useful adhesives is already set forth hereinabove in a nonlimiting list.

The laminates comprised of the sulfonated aromatic copolyetheresters of the present invention can be used in a wide variety of areas. A non-limiting list of the wide variety of areas in which such laminates can be used is already set forth hereinabove.

Preferably, the laminates of the present invention are used in food packaging, especially fast food packaging. Specific examples of food packaging uses are already set forth hereinabove in a non-limiting list. In cups intended for hot drinks, it is preferable to have the water tight polyester coating only on the inner surface. On the other hand, for cups intended for cold drinks, it is preferable to have the polyester coating on both the inner and outer surface of the cup to prevent water from condensing on the outer surface of the cup. For heat-sealed cartons, it is preferable that the sealable polyester coating be on both the inner and outer surface of the container.

Preferably, the laminates of the present invention are used in wraps. Such wraps can take the form of a polymeric laminated paper. Wraps can be used to enclose, for example, meats; other perishable items; and fast food items, such as sandwiches, burgers, and dessert items. The wraps preferably combine a good balance of physical properties, including paper-like stiffness with sufficient toughness so as not to tear when used to wrap, for example, a sandwich; good deadfold characteristics, so that once folded, wrapped or otherwise manipulated into the desired shape, the wrap does not spontaneously unfold or unwrap; good grease resistance, where desired; and a good moisture barrier balance so as to prevent moisture from condensing on, for example, a sandwich. The wraps can have either a smooth surface, or a textured surface, such as by embossing, crimping, and/or quilting. The wraps can include fillers, for example, inorganic particles; organic particles, such as starch; and combinations thereof.

The sulfonated aromatic copolyetheresters of the present invention can also be made into sheets. Any process known in the art can be used to make the sheets, such as, for example, extrusion, solution casting or injection molding. The parameters for each of these processes can be easily determined by one of ordinary skill in the art depending upon viscosity characteristics of the copolyester and the desired thickness of the sheet.

The difference between a sheet and a film is the thickness, but there is no set industry standard as to when a film becomes a sheet. For purposes of this invention, a sheet is greater than about 0.25 mm (10 mils) thick, preferably between about 0.25 mm and 25 mm, more preferably from about 2 mm to about 15 mm, and even more preferably from about 3 mm to about 10 mm. In a preferred embodiment, the sheets of the present invention have a thickness sufficient to cause the sheet to be rigid, which generally occurs at about 0.50 mm and greater. However, sheets greater than 25 mm, and thinner than 0.25 mm can be formed.

Polymeric sheets have a variety of uses, such as, for example, in signage, glazings, thermoforming articles, displays and display substrates. For many of these uses, the heat resistance of the sheet is an important factor. Therefore, a higher melting point, $T_g$, and crystallinity level are desirable to provide better heat resistance and greater stability. Further, it is desired that the sheets have ultraviolet (UV) and scratch resistance; good tensile strength; high optical clarity; and a good impact strength, particularly at low temperatures.

Various polymeric compositions have been used in an attempt to meet all of the above criteria. In particular, poly(ethylene terephthalate) (PET) has been used to form low-cost sheets for many years. However, PET sheets have poor low temperature impact strength; low $T_g$; and high rate of crystallization. Thus, PET sheets cannot be used at low temperatures because of the danger of breakage, and cannot be used at high temperatures because the polymer crystallizes diminishing optical clarity.

Polycarbonate sheets can be used in applications where a low temperature impact strength is needed, or a high service temperature is required. In this regard, polycarbonate sheets have high impact strengths at low temperatures, as well as, a high $T_g$ that allows them to be used in high temperature applications. However, polycarbonate has poor solvent resistance, thereby limiting its use in certain applications, and is prone to stress induced cracking. Polycarbonate sheets also provide a greater impact strength than is needed for certain applications, making them costly and inefficient for use.

The sulfonated aromatic copolyetheresters of the present invention can be formed into sheets by any one of the above methods; any other method known in the art; or directly from the polymerization melt. In the alternative, the copolyester can be formed into an easily handled shape (such as pellets) from the melt, wherein the shape can be used to form a sheet. The sheets of the present invention can be used in, for example, forming signs; glazings, such as in bus stop shelters, sky lights and recreational vehicles; displays; automobile lights; and in thermoforming articles.

However, the sheets of the present invention are preferably formed by either solution casting, or extrusion. Extrusion is particularly preferred for formation of "endless" products, such as films and sheets, which emerge as a continuous length. For example, WO 96/38282 and WO 97/00284 disclose crystallizable sheets formed via melt extrusion.

In extrusion, the polymeric material, whether provided as a molten polymer or as plastic pellets or granules, is fluidized and homogenized. The mixture is then forced through a suitably shaped die to produce the desired cross-sectional sheet shape. The extruding force can be exerted by either a piston or ram (ram extrusion), or a rotating screw (screw extrusion) that operates in the cylinder in which the material is heated and plasticized. Single screw, twin screw, and multi-screw extruders known in the art can be used. Different kinds of die are used to produce different products, such as sheets and strips (slot dies) and hollow and solid sections (circular dies). In this manner, sheets of differing widths and thicknesses can be produced. After extrusion, the polymeric sheet is taken up on rollers, cooled and taken off by a suitable device that is designed to prevent any subsequent deformation of the sheet.

Using extruders known in the art, a sheet can be produced by extruding a thin layer of polymer over chilled rolls, and then further drawing down the sheet to size (>0.25 mm) by tension rolls. Preferably, the finished sheet is greater than 0.25 mm thick.

A sheeting calender can be employed in manufacturing large quantities of sheets. A calender is a machine comprising a number of heatable parallel cylindrical rollers that rotate in opposite directions and spread out the polymer and stretch it to the required thickness. The rough sheet is fed into the gap of the calender, wherein the last roller smoothes the sheet being produced. If the sheet is required to have a textured surface, the last roller is provided with an appropriate embossing pattern. Alternatively, the sheet can be reheated and passed through an embossing calender. The calender is followed by one or more cooling drums. Finally, the finished sheet is reeled up.

The above extrusion process can be combined with a variety of post-extruding operations for expanded versatility. Such post-forming operations are known to those skilled in the art, and include, for example, altering round to oval shapes; stretching the sheets to different dimensions; machining and punching; and biaxial stretching.

The polymeric sheet of the invention can also be combined with other polymeric materials during extrusion and/or finishing to form laminates or multilayer sheets with improved characteristics, such as water vapor resistance. A multilayer or laminate sheet can be made by any method known in the art, and can have as many as five or more separate layers joined together by heat, adhesive and/or tie layer, as known in the art.

The sheet can also be made by solution casting, which produces a more consistently uniform gauged sheet than melt extrusion. Solution casting involves the dissolution of polymeric granules, powder or the like in a suitable solvent with any desired formulant, such as a plasticizer or colorant. The solution is filtered to remove dirt or large particles and cast from a slot die onto a moving belt, preferably of stainless steel, dried, whereon the sheet cools. An extrudate is five to ten times thicker than a finished sheet. The sheet can then be finished in a manner similar to that of an extruded sheet.

Further, sheets and sheet-like articles, such as discs, can be formed via any injection molding method known in the art.

One of ordinary skill in the art will be able to identify appropriate process parameters based on the polymeric composition and process used in forming the sheet.

Regardless of how the sheet is formed, it can be biaxially oriented by stretching the sheet that is formed in both the machine and transverse direction. The sheet can be stretched in the machine direction simply by being rolled out and taken up. This inherently stretches the sheet in the direction of takeup, and thereby orients at least some of the fibers. Although this strengthens the sheet in the machine direction, it allows the sheet to tear easily in the direction at right angles because all of the fibers are oriented in one direction.

Therefore, biaxially stretched sheets are preferred for certain uses where uniform sheeting is desired. Biaxially stretched sheets have superior tensile strength; flexibility; toughness; and shrinkability, for example, in comparison to non-oriented sheets. It is desirable to stretch the sheet along two axes at right angles to each other. This increases tensile strength and elastic modulus in the directions of stretch. It is most desirable for the amount of stretch in each direction to be roughly equivalent, thereby providing similar properties or behavior within the sheet when tested from any direction.

Biaxial orientation can be obtained via any process known in the art. However, tentering is preferred. Tentering is a process wherein material that is being heated is stretched in the transverse direction either subsequent to, or while simultaneously being stretched in the machine direction.

Shrinkage can be controlled by holding the sheet in a stretched position and heating for a few seconds before quenching. The heat stabilizes the oriented sheet, which then can be forced to shrink only at temperatures above the heat stabilization temperature.

The above process conditions and parameters for sheet making by any method in the art are easily determined by a skilled artisan for any given polymeric composition and desired application.

The properties exhibited by a sheet will depend on several factors as indicated hereinabove, including, but not limited to the polymeric composition; the method of forming the polymer; the method of forming the sheet; and whether the sheet was treated for stretch or biaxially oriented. These factors affect many properties of the sheet, such as, for example, shrinkage; tensile strength; elongation at break; impact strength; dielectric strength and constant; tensile modulus; chemical resistance; melting point; and heat deflection temperature.

The sheet properties can be further adjusted by adding certain additives and fillers to the polymeric composition, wherein a non-limiting list of such fillers and additives is already set forth hereinabove. Alternatively, the copolyetheresters of the present invention can be blended with at least one other polymer, such as, for example, starch, to improve/change certain characteristics, such as, for example, air permeability; optical clarity; strength; and/or elasticity.

The sheets of the present invention can be thermoformed via any known method into any desirable shape, such as, for example, a cover; skylight; shaped greenhouse glazings; display; and food tray. The thermoforming is accomplished by heating the sheet to a sufficient temperature and for a sufficient time to soften the copolyester so that the sheet can be easily molded into the desired shape. In this regard, one of ordinary skill in the art can easily determine the optimal thermoforming parameters depending upon the viscosity and crystallization characteristics of the polyester sheet.

The copolyetheresters of the present invention can also be used as plastic containers. Plastic containers are widely used for foods and beverages, and also for non-food materials. PET is used to make many of these containers because of its appearance (optical clarity); ease of blow molding; chemical and thermal stability; and price. PET is generally fabricated into bottles by blow molding processes, and generally by stretch blow molding.

In stretch blow molding, PET is first shaped by injection molding into a thick-walled preformed parison (a "preform") that is typically in the shape of a tube with a threaded opening at the top. The parison can be cooled and either used later in a subsequent step, or the blow molding process can be carried out in one machine with cooling just to the stretch blow molding temperature. In the stretch blow molding step, the parison is heated in the mold to a high enough temperature to allow shaping, but not so high that the parison crystallizes or melts (i.e., just above the $T_g$). The parison is expanded to fill the mold by rapidly being stretched via mechanical means in the axial direction (e.g., by using a mandrel) while simultaneously being radially expanded by having air forced under pressure into the heated parison. The PET used in blow molding is typically modified with a small amount of comonomer, usually 1,4-cyclohexanedimethanol or isophthalic acid, to increase the temperature at which the PET can be successfully blow molded to about 9° C. The comonomer is necessary because of the need for a wider PET blow molding temperature window, and also to decrease the rate of stress induced crystallization. At the same time, the comonomer can have the undesirable effect of lowering the $T_g$ and reducing the crystallinity of PET. Stretch blow molding of PET, and blow molding processes in general, are well known in the art. Reviews are widely available, as for example, "Blow Molding" by C. Irwin in Encyclopedia of Polymer Science And Engineering, Second Edition, Vol. 2, John Wiley and Sons, New York, 1985, pp. 447–478.

The technology is widely used, but there are still improvements that need to be made. Containers that are biodegradable would be an improvement.

The containers described herein can be made by any method known in the art, such as, for example, extrusion; injection molding; injection blow molding; rotational molding; thermoforming of a sheet; and stretch-blow molding.

In the present invention, the preferred method for molding a container is stretch-blow molding, which is generally used in the production of PET containers, such as bottles. In this case, use may be made of any of the cold parison methods, in which a preformed parison (generally made by injection molding) is taken out of the mold and then subjected to stretch blow molding in a separate step. The hot parison method as known in the art can also be used, wherein the hot parison is immediately subjected to stretch blow molding in the same equipment without complete cooling after injection molding to make the parison. The parison temperature will vary based on the exact composition of the polymer to be used. Generally, parison temperatures in the range of from about 90 to about 160° C. are useful. The stretch blow molding temperature will also vary depending on the exact material composition used, but a mold temperature of about 80 to about 150° C. is generally useful.

Containers of the invention can take any shape, but particularly include narrow-mouth bottles and wide-mouth bottles having threaded tops and a volume of about 400 mL to about 3 liters, although smaller and larger containers can be formed.

The containers can be used in standard cold fill applications. For some of the compositions of the present invention, hot fill applications may also be used.

The containers of the invention are suitable for foods and beverages, and other solids and liquids. The containers are normally clear and transparent, but can be modified to have color or to be opaque, rather than transparent, if desired, by adding colorants or dyes, or by causing crystallization of the polymer, which results in opaqueness.

The sulfonated aromatic copolyetheresters can further find utility in the form of fibers. Polyester fibers are produced in large quantities for use in a variety of applications. In particular, these fibers are desirable for use in textiles, particularly in combination with natural fibers, such as cotton and wool. Clothing, rugs, and other items can be fashioned from these fibers. Further, polyester fibers are desirable for use in industrial applications due to their elasticity and strength. In particular, they are used to make articles, such as tire cords and ropes.

The term "fibers" as used herein is meant to include continuous monofilaments; non-twisted or entangled multifilament yarns; staple yarns; spun yarns; and non-woven materials. Such fibers can be used to form uneven fabrics; knitted fabrics; fabric webs; or any other fiber-containing structures, such as tire cords.

Synthetic fibers, such as nylon, acrylic, polyesters, and others, are made by spinning and drawing the polymer into a filament that is then formed into a yarn by winding many filaments together. These fibers are often treated mechanically and/or chemically to impart desirable characteristics, such as, for example, strength; elasticity; heat resistance; and hand (feel of fabric).

The monomer composition of the sulfonated aromatic copolyetherester of the present invention is preferably chosen so as to result in a partially crystalline polymer. The crystallinity is desirable for the formation of fibers, providing strength and elasticity. As first produced, the polyester is mostly amorphous in structure. In preferred embodiments, the polyester polymer readily crystallizes on reheating and/or extension of the polymer.

In the process of the invention, fibers are made from the polymer by any process known in the art. Generally, however, melt spinning is preferred for polyester fibers.

Melt spinning, which is most commonly used for polyesters, such as PET, comprises heating the polymer to form a molten liquid, or melting the polymer against a heated surface. The molten polymer is forced through a spinneret with a plurality of fine holes. Upon contact with air or a non-reactive gas stream after passing through the spinneret, the polymer solution from each spinneret solidifies into filaments. The filaments are gathered together downstream from the spinneret by a convergence guide, and may be taken up by a roller or a plurality of rollers. This process allows filaments of various sizes and cross sections to be formed, including filaments having, for example, a round, elliptical, square, rectangular, lobed or dog-boned cross section.

Following the extrusion and uptake of the fiber, the fiber is usually drawn, thereby increasing the crystallization and maximizing desirable properties such as orientation along the longitudinal axis, which increases elasticity, and strength. The drawing may be done in combination with takeup by using a series of rollers, some of which are generally heated, as known in the art, or may be done as a separate stage in the process of fiber formation.

The polymer can be spun at speeds of from about 600 to 6000 meters/minute or higher, depending on the desired fiber size. For textile applications, a fiber with a denier per filament of from about 0.1 to about 100 is desired, preferably the denier is from about 0.5 to about 20, and more preferably from about 0.7 to about 10. However, for industrial applications the fiber should be from about 0.5 to about 100 denier/filament, preferably from about 1.0 to about 10.0, most preferably from about 3.0 to about 5.0. The required size and strength of a fiber for any given application can be readily determined by one of ordinary skill in the art.

The resulting filamentary material is amenable to further processing through the use of additional processing equipment, or it may be used directly in applications requiring a continuous filament textile yarn. If desired, the filamentary material subsequently may be converted from a flat yarn to a textured yarn through known false twist texturing conditions or other processes known in the art. In particular, it is desirable to increase the surface area of the fiber to provide a softer feel and to enhance the ability of the fibers to breathe, thereby providing better insulation and water retention in the case of textiles, for example. The fibers may therefore be crimped or twisted by the false twist method, air jet, edge crimp, gear crimp, or stuffer box, for example. Alternatively, the fibers may be cut into shorter lengths, called staple, which may be processed into yarn. A skilled artisan can determine the best method of crimping or twisting based on the desired application and the composition of the fiber.

After formation, the fibers are finished by any method appropriate to the desired final use. In the case of textiles, this can include dyeing, sizing, or addition of chemical agents, such as, for example, antistatic agents; flame retardants; UV light stabilizers; antioxidants; pigments; dyes; stain resistants; and antimicrobial agents. For industrial applications, the fibers may be treated to impart additional desired characteristics such as strength, elasticity or shrinkage, for example.

The continuous filament fiber of the invention can be used either as produced, or texturized for use in a variety of applications, such as textile fabrics for apparel and home furnishings, for example. High tenacity fiber can be used in industrial applications, such as, for example, high strength fabrics; tarpaulins; sailcloth; sewing threads; and rubber reinforcement for tires and V-belts.

The staple fiber of the invention can be used to form a blend with natural fibers, especially cotton and wool. In particular, polyester is a chemically resistant fiber that is generally resistant to mold, mildew, and other problems inherent to natural fibers. The polyester fiber further provides strength and abrasion resistance and lowers the cost of material. Therefore, it is ideal for use in textiles and other commercial applications, such as for use in fabrics for apparel; home furnishings; and carpets.

Further, the sulfonated aromatic copolyetherester polymers of the invention can be used with another synthetic or natural polymers to form a heterogeneous fiber or bicomponent fiber, thereby providing a fiber with improved properties. The heterogeneous fiber can be formed in any suitable manner known in the art, such as, for example, side-by-side; sheath-core; and matrix designs.

The sulfonated aromatic copolyetheresters of the invention can be used to make shaped foamed articles. Thermoplastic polymeric materials are foamed to provide low density articles, such as, for example, films; cups; food trays; decorative ribbons; and furniture parts. For example, polystyrene beads containing low boiling hydrocarbons, such as pentane, are formed into light weight foamed cups for hot drinks, such as, for example, coffee; tea; and hot chocolate. Polypropylene can be extruded in the presence of blowing agents, such as nitrogen or carbon dioxide gas to provide decorative films and ribbons for package wrappings. Also, polypropylene can be injection molded in the presence of blowing agents to form lightweight furniture parts, such as table legs, and lightweight chairs.

Polyesters, such as PET typically have a much higher density (e.g., 1.3 g/cc) than other polymers. Producing a foam polyester material is, therefore, desired to decrease the weight of, for example, molded parts; films; sheets; food trays; and thermoformed parts. Furthermore, a foamed article has better insulating properties than an unfoamed article.

In general, the polyester being foamed should have a high melt viscosity. A sufficient melt viscosity is needed to enable the foamed article being formed to hold its shape long enough for the polyester to solidify. A sufficient melt viscosity can be achieved by raising the IV of the polyester being produced through a post-polymerization process, such as the solid state polymerization method described hereinabove. Alternatively, the polyester includes a branching agent, such as disclosed in U.S. Pat. No. 4,132,707, U.S. Pat. No. 4,145,466, U.S. Pat. No. 4,999,388, U.S. Pat. No. 5,000,991, U.S. Pat. No. 5,110,844, U.S. Pat. No. 5,128,383, and U.S. Pat. No. 5,134,028. Branched polyesters can also be subjected to the solid state polymerization method described hereinabove to further enhance the melt viscosity. The material can further incorporate a chain extension agent, such as a dianhydride or a polyepoxide, that is typically added during the foaming process.

The polyesters of the present invention can be readily foamed through a wide variety of methods. Such methods include injecting an inert gas, such as nitrogen or carbon dioxide into the melt during the extrusion or molding operations. Alternatively, inert hydrocarbon gases, such as methane, ethane, propane, butane, and pentane; or chlorofluorocarbons, hydrochlorofluorocarbons, and hydrofluorocarbons can be used. Another method involves dry blending the polyester with chemical blowing agents, wherein the blend is then extruded or molded to form the foamed article. During the extrusion or molding operation, an inert gas, such as nitrogen is released from the blowing agent, thereby providing the foaming action. Typical blowing agents include, but are not limited to azodicaronamide; hydrazocarbonamide; dinitrosopentamethylenetetramine; p-toluenesulfonyl hydrazodicarboxylate; 5-phenyl-3,6-dihydro-1,3,4-oxa-diazin-2-one; sodium borohydride; sodium bicarbonate; 5-phenyltetrazole; and p,p'-oxybis(benzenesulfonylhydrazide). Still another method involves blending one polyester pellet portion with sodium carbonate or sodium bicarbonate, and then blending another polyester pellet portion with an organic acid, such as citric acid, wherein the two polyester pellet portions are subsequently blended together at elevated temperatures via an extrusion or molding process. Carbon dioxide gas is released from the interaction of the sodium carbonate and citric acid to provide the desired foaming action in the polymeric melt.

Preferably, the foamable polyester compositions incorporate nucleation agents to create sites for bubble initiation; influence the cell size of the foamed sheet or object; and hasten the solidification of the foamed article being formed. Nucleation agents include, for example, sodium acetate; talc; titanium dioxide; and polyolefin materials, such as polyethylene and polypropylene.

Polymeric foaming equipment and processes are generally known. See, for example, U.S. Pat. No. 5,116,881; U.S. Pat. No. 5,134,028; U.S. Pat. No. 4,626,183; U.S. Pat. No. 5,128,383; U.S. Pat. No. 4,746,478; U.S. Pat. No. 5,110,844; U.S. Pat. No. 5,000,844; and U.S. Pat. No. 4,761,256. Additional foaming technology information can be found in *Kirk-Othmer Encyclopedia of Chemical Technology*, Third Edition, Volume 11, pp. 82–145 (1980), John Wiley and Sons, Inc., New York, N.Y.; and the *Encyclopedia of Polymer Science and Engineering*, Second Edition, Volume 2, pp. 434–446 (1985), John Wiley and Sons, Inc., New York, N.Y.

The foamable polyester compositions can also include a wide variety of additives, fillers, or be blended with other materials, wherein a non-limiting list of such fillers. Additives and other blendable materials have already been set forth hereinabove. For biodegradable foams, the addition of cellulose; cellulose derivatives, such as chemically modified cellulose; starch; and starch derivatives, such as chemically modified starch and thermoplastic starch, are especially preferred.

EXAMPLES

Test Methods

Differential Scanning Calorimetry (DSC) is performed on a TA Instruments Model Number 2920 machine. Samples are heated under a nitrogen atmosphere to 300° C. at a rate of 20° C./minute, programmed cooled back to room temperature at a rate of 20° C./minute and then reheated to 300° C. at a rate of 20° C./minute. The observed sample glass transition temperature ($T_g$) and crystalline melting temperature ($T_m$), noted below, were from the second heat.

Inherent Viscosity (IV) is defined in "Preparative Methods of Polymer Chemistry", W. R. Sorenson and T. W. Campbell, 1961, p. 35. It is determined at a concentration of 0.5 g/100 mL of a 50:50 weight percent trifluoroacetic acid:dichloromethane acid solvent system at room temperature by a Goodyear R-103B method.

Laboratory Relative Viscosity (LRV) is the ratio of the viscosity of a solution of 0.6 gram of the polyester sample dissolved in 10 mL of hexafluoroisopropanol (HFIP) containing 80 ppm sulfuric acid to the viscosity of the sulfuric acid-containing HFIP itself, both measured at 25° C. in a capillary viscometer. The LRV may be numerically related to IV. Where this relationship is utilized, the term "calculated IV" is noted.

Biodegradation was performed according to the ISO 14855 method: "Determination of the ultimate aerobic biodegradability and disintegration of plastic materials under controlled composting conditions—Method by analysis of evolved carbon". This test involved injecting an inoculum consisting of a stabilized and mature compost derived from the organic fraction of municipal solid waste with ground powder of the polymer to be tested on a vermiculite matrix, composting under standard conditions at an incubation temperature controlled at 58° C.+/−2° C. The test was conducted with one polymer sample. The carbon dioxide evolved is used to determine the extent of biodegradation.

Prior to testing the film properties, the film samples are conditioned for 40 hrs at 22.22° C. (72° F.) and 50% humidity. Elmendorf Tear is determined as per ASTM 1922. Graves Tear is determined as per ASTM D1004. Tensile Strength at break, tensile modulus and percent elongation at break is determined as per ASTM D882.

Comparative Example CE 1

To a 250 mL glass flask was added bis(2-hydroxyethyl) terephthalate, (149.49 gm), poly(caprolactone), (avg. MW of 65,000, 22.04 gm), dimethyl 5-sulfoisophthalate, sodium salt, (3.55 gm), sodium acetate, (0.22 gm), poly(ethylene glycol), avg. MW of 1000, (18.95 gm), manganese(II) acetate tetrahydrate, (0.0702 gm), and antimony(III) oxide, (0.0565 gm). The reaction mixture was stirred and heated to 180° C. under a slow nitrogen purge. After achieving 180° C., the reaction mixture was stirred at 180° C. for 0.7 hrs under a slow nitrogen purge. The reaction mixture was then heated to 240° C. over 1.0 hr with stirring. After achieving 240° C., the reaction mixture was stirred at 240° C. for 0.5 hrs under a slow nitrogen purge. The reaction mixture was then heated to 255° C. over 0.4 hrs with stirring under a slight nitrogen purge. The reaction mixture was stirred at 255° C. for 0.7 hrs under a slight nitrogen purge. 7.1 gm of a colorless distillate was collected over this heating cycle. The reaction mixture was then staged to full vacuum with stirring at 255° C. The resulting reaction mixture was stirred for 2.5 hrs under full vacuum (pressure less than 100 mtorr). The vacuum was then released with nitrogen and the reaction mass allowed to cool to room temperature. An additional 33.1 gm of distillate was recovered and 121.3 gm of a solid product was recovered. The sample was measured for LRV, as described above, and was found to have a LRV of 24.99. The sample was calculated to have an IV of 0.70 dL/g. The sample underwent DSC analysis. A broad crystalline $T_m$ was observed at 194.4° C. (19.5 J/g).

Example 1

To a 250 mL glass flask was added bis(2-hydroxyethyl) terephthalate, (149.49 gm), glycolic acid, (14.69 gm), dimethyl 5-sulfoisophthalate, sodium salt, (3.55 gm), sodium acetate, (0.22 gm), poly(ethylene glycol), avg. MW of 1000, (18.95 gm), manganese(II) acetate tetrahydrate, (0.0711 gm), and antimony(III) oxide, (0.0559 gm). The reaction mixture was stirred and heated to 180° C. under a slow nitrogen purge. After achieving 180° C., the reaction mixture was stirred at 180° C. for 0.7 hrs under a slow nitrogen purge. The reaction mixture was then heated to 240° C. over 0.4 hrs with stirring. After achieving 240° C., the reaction mixture was stirred at 240° C. for 0.7 hrs under a slow nitrogen purge. The reaction mixture was then heated to 255° C. over 0.2 hrs with stirring under a slight nitrogen purge. The reaction mixture was stirred at 255° C. for 1.2 hrs under a slight nitrogen purge. 5.3 gm of a colorless distillate was collected over this heating cycle. The reaction mixture was then staged to full vacuum with stirring at 255° C. The resulting reaction mixture was stirred for 2.5 hrs under full vacuum (pressure less than 100 mtorr). The vacuum was then released with nitrogen and the reaction mass allowed to cool to room temperature. An additional 35.2 gm of distillate was recovered and 122.2 gm of a solid product was recovered. The sample was measured for LRV, as described above, and was found to have a LRV of 22.57. The sample was calculated to have an IV of 0.66 dL/g. The sample underwent DSC analysis. A crystalline $T_m$ was observed at 229.6° C. (27.9 J/g).

Example 2

To a 250 mL glass flask was added bis(2-hydroxyethyl) terephthalate, (150.26 gm), glycolic acid, (18.46 grams), dimethyl 5-sulfoisophthalate, sodium salt, (2.67 gm), poly (ethylene glycol), (avg. MW of 3400, 12.73 gm), sodium acetate, (0.19 gm), manganese(II) acetate tetrahydrate, (0.0605 gm), and antimony(III) trioxide, (0.0487 gm). The reaction mixture was stirred and heated to 180° C. under a slow nitrogen purge. After achieving 180° C., the reaction mixture was stirred at 180° C. for 0.6 hrs under a slight nitrogen purge. The reaction mixture was then heated to 240° C. over 0.7 hrs with stirring. After achieving 240° C., the reaction mixture was stirred at 240° C. for 0.6 hrs under a slow nitrogen purge. The reaction mixture was then heated to 255° C. over 0.3 hrs with stirring. After achieving 255° C., the reaction mixture was stirred at 255° C. for 0.7 hrs under a slow nitrogen purge. 9.1 gm of a colorless distillate was collected over this heating cycle. The reaction mixture was then staged to full vacuum with stirring at 255° C. The resulting reaction mixture was stirred for 4.0 hrs under full vacuum (pressure less than 100 mtorr). The vacuum was then released with nitrogen and the reaction mass allowed to cool to room temperature. An additional 34.7 gm of distillate was recovered and 127.1 gm of a solid product was recovered. The sample was measured for LRV, as described above, and was found to have a LRV of 13.08. This sample was calculated to have an IV of 0.48 dL/g. The sample underwent DSC analysis. A crystallization exotherm ($T_{cryst}$) was observed at 126.0° C. (17.9 J/g). A crystalline $T_m$ was observed at a temperature of 215.2° C., (32.2 J/g).

Example 3

To a 250 mL glass flask was added bis(2-hydroxyethyl) terephthalate, (150.26 gm), polylactide (from Cargill Dow, 14.00 gm), dimethyl 5-sulfoisophthalate, sodium salt, (2.67 gm), sodium acetate, (0.19 gm), poly(ethylene glycol), avg. MW of 1500, (12.73 gm), manganese(II) acetate tetrahydrate, (0.0608 gm), antimony(III) oxide, (0.0487 gm), and 1,3,5-trimethyl-2,4,6-tris(3,5-di-tert-butyl-4-hydroxybenzyl)benzene, (0.068 gm). The reaction mixture was stirred and heated to 180° C. under a slow nitrogen purge. After achieving 180° C., the reaction mixture was stirred at 180° C. for 0.7 hr under a slow nitrogen purge. The reaction mixture was then heated to 240° C. over 0.5 hrs with stirring. After achieving 240° C., the reaction mixture was stirred at 240° C. for 0.9 hrs under a slow nitrogen purge. The reaction mixture was then heated to 255° C. over 0.2 hrs with stirring under a slight nitrogen purge. The reaction mixture was stirred at 255° C. for 1.1 hrs under a slight nitrogen purge. 2.5 gm of a colorless distillate was collected over this heating cycle. The reaction mixture was then staged to full vacuum with stirring at 255° C. The resulting reaction mixture was stirred for 2.8 hrs under full vacuum (pressure less than 100 mtorr). The vacuum was then released with nitrogen and the reaction mass allowed to cool to room temperature. An additional 38.7 gm of distillate was recovered and 132.0 gm of a solid product was recovered. The sample was measured for LRV, as described above, and was found to have a LRV of 19.43. The sample was calculated to have an IV of 0.60 dL/g. The sample underwent DSC analysis. A crystalline $T_m$ was observed at 229.5° C. (30.1 J/g).

Comparative Example CE 2

To a 1.0 liter glass flask was added bis(2-hydroxyethyl) terephthalate, (475.89 gm), dimethyl glutarate, (102.67 gm), dimethyl 5-sulfoisophthalate, sodium salt, (15.19 gm), tris (2-hydroxyethyl)trimellitate, (2.21 gm), polyethylene glycol, (avg. MW of 1450, 42.16 gm), sodium acetate, (0.75 gm), manganese(II) acetate tetrahydrate, (0.2351 gm), and antimony(III) trioxide, (0.1893 gm). The reaction mixture was stirred and heated to 180° C. under a slow nitrogen purge. After achieving 180° C., the reaction mixture was heated to 200° C. over 0.2 hrs with stirring under a slow nitrogen purge. The resulting reaction mixture was stirred at 200° C. under a slight nitrogen purge for 1 hr. The reaction mixture was then heated to 275° C. over 1.3 hrs with stirring under a slight nitrogen purge. The resulting reaction mixture was stirred at 275° C. for 1 hr while under a slight nitrogen purge. 72.5 gm of a colorless distillate was collected over this heating cycle. The reaction mixture was then staged to full vacuum with stirring at 275° C. The resulting reaction mixture was stirred for 3.3 hrs under full vacuum (pressure less than 100 mtorr). The vacuum was then released with nitrogen and the reaction mass allowed to cool to room temperature. An additional 56.4 gm of distillate was recovered and 413.7 gm of a solid product was recovered. The sample was measured for LRV, as described above, and was found to have a LRV of 24.35. The sample was calculated to have an IV of 0.69 dL/g. The sample underwent DSC analysis. A $T_g$ was found with an onset temperature of 31.1° C., a midpoint temperature of 32.7° C., and an endpoint temperature of 34.2° C. A broad crystalline $T_m$ was observed at 196.0° C. (17.7 J/g).

Comparative Example CE 3

To a 250 mL glass flask was added bis(2-hydroxyethyl) terephthalate, (164.4 gm), lactic acid, (85 wt. % aqueous solution, 23.3 gm), dimethyl 5-sulfoisophthalate, sodium salt, (3.91 gm), sodium acetate, (0.24 gm), ethylene glycol, (27.31 gm), tris(2-hydroxyethyl)trimellitate, (0.23 gm), manganese(II) acetate tetrahydrate, (0.0730 gm), and antimony(III) trioxide, (0.0592 gm). The reaction mixture was stirred and heated to 180° C. under a slow nitrogen purge. After achieving 180° C., the reaction mixture was stirred at 180° C. for 1.2 hrs under a slow nitrogen purge. The reaction mixture was then heated to 240° C. over 0.5 hrs with stirring. After achieving 240° C., the reaction mixture was stirred at 240° C. for 0.8 hrs under a slow nitrogen purge. The reaction mixture was then heated to 255° C. over 0.3 hrs with stirring under a slight nitrogen purge. The reaction mixture was stirred at 255° C. for 1.0 hr under a slight nitrogen purge. 38.4 gm of a colorless distillate was collected over this heating cycle. The reaction mixture was then staged to full vacuum with stirring at 255° C. The resulting reaction mixture was stirred for 2.4 hrs under full vacuum, (pressure less than 100 mtorr). The vacuum was then released with nitrogen and the reaction mass allowed to cool to room temperature. An additional 42.7 gm of distillate was recovered and 117.0 gm of a solid product was recovered. The sample was measured for LRV, as described above, and was found to have a LRV of 13.93. The sample was calculated to have an IV 0.50 dL/g. The sample underwent DSC analysis. A $T_g$ was observed with an onset of 32.2° C., a midpoint of 34.7° C., and an endpoint of 37.2° C. A crystalline $T_m$ was observed at 183.9° C. (4.5 J/g).

The sample was ground into powder and tested for biodegradation, as described above. This sample was found to biodegrade 0.7% within 13.6 days under these test conditions.

Example 4

To a 250 mL glass flask was added bis(2-hydroxyethyl) terephthalate, (149.49 gm), lactic acid, (85 wt. % aqueous solution, 21.20 gm), dimethyl 5-sulfoisophthalate, sodium salt, (3.55 gm), sodium acetate, (0.22 gm), tris(2-hydroxyethyl)trimellitate, (0.21 gm), ethylene glycol, (24.83 gm), poly(ethylene glycol), avg. MW of 1000, (9.00 gm), manganese(II) acetate tetrahydrate, (0.0664 gm), and antimony (III) oxide, (0.0534 gm). The reaction mixture was stirred and heated to 180° C. under a slow nitrogen purge. After achieving 180° C., the reaction mixture was stirred at 180° C. for 1.0 hr under a slow nitrogen purge. The reaction mixture was then heated to 240° C. over 0.9 hrs with stirring. After achieving 240° C., the reaction mixture was stirred at 240° C. for 0.5 hrs under a slow nitrogen purge. The reaction mixture was then heated to 255° C. over 0.3 hrs with stirring under a slight nitrogen purge. The reaction mixture was stirred at 255° C. for 0.6 hrs under a slight nitrogen purge. 38.1 gm of a colorless distillate was collected over this heating cycle. The reaction mixture was then staged to full vacuum with stirring at 255° C. The resulting reaction mixture was stirred for 2.7 hrs under full vacuum, (pressure less than 100 mtorr). The vacuum was then released with nitrogen and the reaction mass allowed to cool to room temperature. An additional 38.8 gm of distillate was recovered and 112.4 gm of a solid product was recovered. The sample was measured for LRV, as described above, and was found to have a LRV of 18.69. The sample was calculated to have an IV of 0.58 dL/g. The sample underwent DSC analysis. A crystalline $T_m$ was observed at 232.1° C. (31.4 J/g).

The sample was ground into powder and tested for biodegradation, as described above. This sample was found to biodegrade 4.7% within 13.6 days under these test conditions.

Pressed films were produced from the material prepared above on a Sargent hydraulic melt press, (W. H. Sargent & Company, Chicago, USA). Approximately 0.5 gm of the material prepared above was placed between two sheets of Armalon® cloth with a 0.001 inch thick brass shim. This construct was placed between the hydraulic melt press platens heated to a temperature of 250° C.+/−5° C. The platens were closed without pressure for 10–15 seconds and then the pressure was slowly raised to 3000–4000 psi. The pressure was held there for 15 seconds and then the pressure was released, the sample removed from the hydraulic press and the film was quenched in cold water. The films were found to be clear and flexible.

Comparative Example CE 4

To a 1.0 liter glass flask was added bis(2-hydroxyethyl) terephthalate, (443.27 gm), dimethyl glutarate, (123.20 gm), dimethyl 5-sulfoisophthalate, sodium salt, (15.19 gm), tris (2-hydroxyethyl)trimellitate, (1.52 gm), polyethylene glycol, (avg. MW of 1450, 41.94 gm), sodium acetate, (0.75 gm), manganese(II) acetate tetrahydrate, (0.2339 gm), and antimony(III) trioxide, (0.1883 gm). The reaction mixture was stirred and heated to 180° C. under a slow nitrogen purge. After achieving 180° C., the reaction mixture was heated to 200° C. over 0.2 hrs with stirring under a slow nitrogen purge. The resulting reaction mixture was stirred at 200° C. under a slight nitrogen purge for 1 hr. The reaction mixture was then heated to 275° C. over 1.2 hrs with stirring under a slight nitrogen purge. The resulting reaction mixture was stirred at 275° C. for 1 hr while under a slight nitrogen purge. 71.8 gm of a colorless distillate was collected over this heating cycle. The reaction mixture was then staged to full vacuum with stirring at 275° C. The resulting reaction mixture was stirred for 4.1 hrs under full vacuum (pressure less than 100 mtorr). The vacuum was then released with nitrogen and the reaction mass allowed to cool to room temperature. An additional 55.7 gm of distillate was recovered and 445.6 gm of a solid product was recovered. The sample was measured for LRV, as described above, and was found to have a LRV of 19.91. The sample was calculated to have an IV of 0.61 dL/g. The sample underwent DSC analysis. A $T_g$ was found with an onset temperature of 27.2°

C., a midpoint temperature of 28.2° C., and an endpoint temperature of 28.3° C. A broad crystalline $T_m$ was observed at 187.5° C. (16.1 J/g).

Comparative Example CE 5

To a 250 mL glass flask was added bis(2-hydroxyethyl) terephthalate, (149.49 gm), lactic acid, (85 wt. % aqueous solution, 27.34 gm), dimethyl 5-sulfoisophthalate, sodium salt, (3.55 gm), sodium acetate, (0.23 gm), ethylene glycol, (24.83 gm), tris(2-hydroxyethyl)trimellitate, (0.21 gm), manganese(II) acetate tetrahydrate, (0.0664 gm), and antimony(III) trioxide, (0.0534 gm). The reaction mixture was stirred and heated to 180° C. under a slow nitrogen purge. After achieving 180° C., the reaction mixture was stirred at 180° C. for 1.1 hrs under a slow nitrogen purge. The reaction mixture was then heated to 240° C. over 0.4 hours with stirring. After achieving 240° C., the reaction mixture was stirred at 240° C. for 0.3 hrs under a slow nitrogen purge. The reaction mixture was then heated to 255° C. over 0.1 hrs with stirring under a slight nitrogen purge. The reaction mixture was stirred at 255° C. for 0.9 hrs under a slight nitrogen purge. 30.1 gm of a colorless distillate was collected over this heating cycle. The reaction mixture was then staged to full vacuum with stirring at 255° C. The resulting reaction mixture was stirred for 3.5 hrs under full vacuum (pressure less than 100 mtorr). The vacuum was then released with nitrogen and the reaction mass allowed to cool to room temperature. An additional 46.3 gm of distillate was recovered and 104.0 gm of a solid product was recovered. The sample was measured for LRV, as described above, and was found to have a LRV of 13.62. The sample was calculated to have an IV of 0.49 dL/g. The sample underwent DSC analysis. A $T_g$ was observed with an onset of 71.7° C., a midpoint of 75.4° C., and an endpoint of 78.9° C. A crystalline $T_m$ was observed at 230.0° C. (28.1 J/g).

The sample was ground into powder and tested for biodegradation, as described above. This sample was found to biodegrade 0.9% within 13.6 days under these test conditions.

Example 5

To a 250 mL glass flask was added bis(2-hydroxyethyl) terephthalate, (149.49 gm), lactic acid, (85 wt. % aqueous solution, 27.34 gm), dimethyl 5-sulfoisophthalate, sodium salt, (3.55 gm), sodium acetate, (0.22 gm), tris(2-hydroxyethyl)trimellitate, (0.21 gm), ethylene glycol, (24.83 gm), poly(ethylene glycol), avg. MW of 1000, (9.00 gm), manganese(II) acetate tetrahydrate, (0.0664 gm), and antimony (III) oxide, (0.0534 gm). The reaction mixture was stirred and heated to 180° C. under a slow nitrogen purge. After achieving 180° C., the reaction mixture was stirred at 180° C. for 1.0 hr under a slow nitrogen purge. The reaction mixture was then heated to 240° C. over 0.8 hrs with stirring. After achieving 240° C., the reaction mixture was stirred at 240° C. for 0.5 hrs under a slow nitrogen purge. The reaction mixture was then heated to 255° C. over 0.3 hrs with stirring under a slight nitrogen purge. The reaction mixture was stirred at 255° C. for 0.8 hrs under a slight nitrogen purge. 40.5 gm of a colorless distillate was collected over this heating cycle. The reaction mixture was then staged to full vacuum with stirring at 255° C. The resulting reaction mixture was stirred for 2.1 hrs under full vacuum (pressure less than 100 mtorr). The vacuum was then released with nitrogen and the reaction mass allowed to cool to room temperature. An additional 43.5 gm of distillate was recovered and 108.5 gm of a solid product was recovered. The sample was measured for LRV, as described above, and was found to have a LRV of 17.80. The sample was calculated to have an IV of 0.57 dL/g. The sample underwent DSC analysis. A $T_g$ was observed with an onset of 56.2° C., a midpoint of 58.9° C., and an endpoint of 61.5° C. A crystalline $T_m$ was observed at 227.4° C. (29.0 J/g).

The sample was ground into powder and tested for biodegradation, as described above. This sample was found to biodegrade 5.9% within 13.6 days under these test conditions.

Pressed films were produced from the material prepared above on a Sargent hydraulic melt press, (W. H. Sargent & Company, Chicago, USA). Approximately 0.5 gm of the material prepared above was placed between two sheets of Armalon® cloth with a 0.001 inch thick brass shim. This construct was placed between the hydraulic melt press platens heated to a temperature of 250° C.+/−5° C. The platens were closed without pressure for 10–15 seconds and then the pressure was slowly raised to 3000–4000 psi. The pressure was held there for 15 seconds and then the pressure was released, the sample removed from the hydraulic press and the film was quenched in cold water. The films were found to be clear and flexible.

Comparative Example CE 6

To a 250 mL glass flask was added bis(2-hydroxyethyl) terephthalate, (152.54 gm), lactic acid, (85 wt. % aqueous solution, 34.34 gm), ethylene glycol, (24.83 gm), tris(2-hydroxyethyl)trimellitate, (0.21 gm), manganese(II) acetate tetrahydrate, (0.0701 gm), and antimony(III) trioxide, (0.0534 gm). The reaction mixture was stirred and heated to 180° C. under a slow nitrogen purge. After achieving 180° C., the reaction mixture was stirred at 180° C. for 1.0 hr under a slow nitrogen purge. The reaction mixture was then heated to 240° C. over 0.4 hrs with stirring. After achieving 240° C., the reaction mixture was stirred at 240° C. for 0.8 hrs under a slow nitrogen purge. The reaction mixture was then heated to 255° C. over 0.3 hrs with stirring under a slight nitrogen purge. The reaction mixture was stirred at 255° C. for 0.7 hrs under a slight nitrogen purge. 36.3 gm of a colorless distillate was collected over this heating cycle. The reaction mixture was then staged to full vacuum with stirring at 255° C. The resulting reaction mixture was stirred for 2.8 hrs under full vacuum (pressure less than 100 mtorr). The vacuum was then released with nitrogen and the reaction mass allowed to cool to room temperature. An additional 50.1 gm of distillate was recovered and 95.9 gm of a solid product was recovered. The sample was measured for LRV, as described above, and was found to have a LRV of 21.30. The sample was calculated to have an IV of 0.63 dL/g. The sample underwent DSC analysis. A $T_g$ was observed with an onset of 72.1° C., a midpoint of 75.5° C., and an endpoint of 78.8° C. A crystalline $T_m$ was observed at 228.6° C. (28.9 J/g).

The sample was ground into powder and tested for biodegradation, as described above. This sample was found to biodegrade 0.2% within 13.6 days under these test conditions.

Comparative Example CE 7

To a 250 mL glass flask was added bis(2-hydroxyethyl) terephthalate, (149.49 gm), lactic acid, (85 wt. % aqueous solution, 35.00 gm), dimethyl 5-sulfoisophthalate, sodium salt, (3.55 gm), sodium acetate, (0.21 gm), ethylene glycol, (24.83 gm), tris(2-hydroxyethyl)trimellitate, (0.21 gm), manganese(II) acetate tetrahydrate, (0.0664 gm), and antimony(III) trioxide, (0.0615 gm). The reaction mixture was stirred and heated to 180° C. under a slow nitrogen purge. After achieving 180° C., the reaction mixture was stirred at 180° C. for 0.9 hrs under a slow nitrogen purge. The reaction mixture was then heated to 240° C. over 0.3 hrs with stirring. After achieving 240° C., the reaction mixture was stirred at 240° C. for 0.6 hrs under a slow nitrogen purge. The reaction mixture was then heated to 255° C. over 0.1 hrs with stirring under a slight nitrogen purge. The reaction mixture was stirred at 255° C. for 0.7 hrs under a slight nitrogen purge. 31.4 gm of a colorless distillate was collected over this heating cycle. The reaction mixture was then staged to full vacuum with stirring at 255° C. The resulting reaction mixture was stirred for 2.7 hrs under full vacuum (pressure less than 100 mtorr). The vacuum was then released with nitrogen and the reaction mass allowed to cool to room temperature. An additional 51.3 gm of distillate was recovered and 96.0 gm of a solid product was recovered. The sample was measured for LRV, as described above, and was found to have a LRV of 15.41. The sample was calculated to have an IV of 0.52 dL/g. The sample underwent DSC analysis. A $T_g$ was observed with an onset of 71.2° C., a midpoint of 73.3° C., and an endpoint of 75.6° C. A crystalline $T_m$ was observed at 220.9° C. (24.3 J/g).

The sample was ground into powder and tested for biodegradation, as described above. This sample was found to biodegrade 6.2% within 13.6 days under these test conditions.

Example 6

To a 250 mL glass flask was added bis(2-hydroxyethyl) terephthalate, (149.49 gm), lactic acid, (85 wt. % aqueous solution, 34.34 gm), dimethyl 5-sulfoisophthalate, sodium salt, (3.55 gm), sodium acetate, (0.22 gm), tris(2-hydroxyethyl)trimellitate, (0.21 gm), ethylene glycol, (24.83 gm), poly(ethylene glycol), average molecular weight of 1000, (9.00 gm), manganese(II) acetate tetrahydrate, (0.0664 gm), and antimony(III) oxide, (0.0534 gm). The reaction mixture was stirred and heated to 180° C. under a slow nitrogen purge. After achieving 180° C., the reaction mixture was stirred at 180° C. for 0.9 hrs under a slow nitrogen purge. The reaction mixture was then heated to 240° C. over 0.9 hrs with stirring. After achieving 240° C., the reaction mixture was stirred at 240° C. for 0.5 hrs under a slow nitrogen purge. The reaction mixture was then heated to 255° C. over 0.3 hrs with stirring under a slight nitrogen purge. The reaction mixture was stirred at 255° C. for 0.7 hrs under a slight nitrogen purge. 40.1 gm of a colorless distillate was collected over this heating cycle. The reaction mixture was then staged to full vacuum with stirring at 255° C. The resulting reaction mixture was stirred for 2.6 hrs under full vacuum (pressure less than 100 mtorr). The vacuum was then released with nitrogen and the reaction mass allowed to cool to room temperature. An additional 47.8 gm of distillate was recovered and 122.5 gm of a solid product was recovered. The sample was measured for LRV, as described above, and was found to have a LRV of 19.03. The sample was calculated to have an IV of 0.59 dL/g. The sample underwent DSC analysis. A $T_g$ was observed with an onset of 59.1° C., a midpoint of 60.8° C., and an endpoint of 62.2° C. A crystalline $T_m$ was observed at 221.2° C. (25.9 J/g).

The sample was ground into powder and tested for biodegradation, as described above. This sample was found to biodegrade 8.8% within 13.6 days under these test conditions.

Pressed films were produced from the material prepared above on a Sargent hydraulic melt press, (W. H. Sargent & Company, Chicago, USA). Approximately 0.5 gm of the material prepared above was placed between two sheets of Armalon® cloth with a 0.001 inch thick brass shim. This construct was placed between the hydraulic melt press platens heated to a temperature of 250 C+/−5 C. The platens were closed without pressure for 10–15 seconds and then the pressure was slowly raised to 3000–4000 psi. The pressure was held there for 15 seconds and then the pressure was released, the sample removed from the hydraulic press and the film was quenched in cold water. The films were found to be clear and flexible.

Example 7

To a 250 mL glass flask was added bis(2-hydroxyethyl) terephthalate, (149.49 gm), lactic acid, (85 wt. % aqueous solution, 34.34 gm), dimethyl 5-sulfoisophthalate, sodium salt, (3.55 gm), sodium acetate, (0.22 gm), tris(2-hydroxyethyl)trimellitate, (0.21 gm), ethylene glycol, (24.83 gm), poly(ethylene glycol), avg. MW of 1000, (18.00 gm), manganese(II) acetate tetrahydrate, (0.0664 gm), and antimony (III) oxide, (0.0534 gm). The reaction mixture was stirred and heated to 180° C. under a slow nitrogen purge. After achieving 180° C., the reaction mixture was stirred at 180° C. for 1.2 hrs under a slow nitrogen purge. The reaction mixture was then heated to 240° C. over 0.9 hrs with stirring. After achieving 240° C., the reaction mixture was stirred at 240° C. for 0.5 hrs under a slow nitrogen purge. The reaction mixture was then heated to 255° C. over 0.2 hours with stirring under a slight nitrogen purge. The reaction mixture was stirred at 255° C. for 0.6 hrs under a slight nitrogen purge. 40.6 gm of a colorless distillate was collected over this heating cycle. The reaction mixture was then staged to full vacuum with stirring at 255° C. The resulting reaction mixture was stirred for 3.3 hrs under full vacuum (pressure less than 100 mtorr). The vacuum was then released with nitrogen and the reaction mass allowed to cool to room temperature. An additional 48.8 gm of distillate was recovered and 119.8 gm of a solid product was recovered. The sample was measured for LRV, as described above, and was found to have a LRV of 14.49. The sample was calculated to have an IV of 0.51 dL/g. The sample underwent DSC analysis. A crystalline $T_m$ was observed at 219.7° C. (25.9 J/g).

The sample was ground into powder and tested for biodegradation, as described above. This sample was found to biodegrade 12.0% within 13.6 days under these test conditions.

Pressed films were produced from the material prepared above on a Sargent hydraulic melt press, (W. H. Sargent & Company, Chicago, USA). Approximately 0.5 gm of the material prepared above was placed between two sheets of Armalon® cloth with a 0.001 inch thick brass shim. This construct was placed between the hydraulic melt press platens heated to a temperature of 250° C.+/−5° C. The platens were closed without pressure for 10–15 seconds and then the pressure was slowly raised to 3000–4000 psi. The pressure was held there for 15 seconds and then the pressure was released, the sample removed from the hydraulic press and the film was quenched in cold water. The films were found to be clear and flexible.

Example 8

To a 250 mL glass flask was added bis(2-hydroxyethyl) terephthalate, (149.49 gm), lactic acid, (85 wt. % aqueous solution, 34.34 gm), dimethyl 5-sulfoisophthalate, sodium salt, (3.55 gm), sodium acetate, (0.21 gm), tris(2-hydroxyethyl)trimellitate, (0.21 gm), ethylene glycol, (20.11 gm), poly(ethylene glycol), avg. MW of 1000, (8.92 gm), manganese(II) acetate tetrahydrate, (0.0663 gm), antimony(III) oxide, (0.0534 gm), and sodium hypophosphite hydrate, (0.0238 gm). The reaction mixture was stirred and heated to 180° C. under a slow nitrogen purge. After achieving 180° C., the reaction mixture was stirred at 180° C. for 1.0 hour under a slow nitrogen purge. The reaction mixture was then heated to 240° C. over 0.6 hrs with stirring. After achieving 240° C., the reaction mixture was stirred at 240° C. for 0.5 hrs under a slow nitrogen purge. The reaction mixture was then heated to 255° C. over 0.2 hrs with stirring under a slight nitrogen purge. The reaction mixture was stirred at 255° C. for 0.5 hrs under a slight nitrogen purge. 32.7 gm of a colorless distillate was collected over this heating cycle. The reaction mixture was then staged to full vacuum with stirring at 255° C. The resulting reaction mixture was stirred for 3.0 hrs under full vacuum, (pressure less than 100 mtorr). The vacuum was then released with nitrogen and the reaction mass allowed to cool to room temperature. An additional 49.5 gm of distillate was recovered and 117.2 gm of a solid product was recovered. The sample was measured for LRV, as described above, and was found to have a LRV of 17.90. The sample was calculated to have an IV of 0.57 dL/g. The sample underwent DSC analysis. A $T_g$ was observed with an onset of 50.1° C., a midpoint of 55.3° C., and an endpoint of 60.4° C. A crystalline $T_m$ was observed at 223.6° C. (33.4 J/g).

Example 9

To a 250 mL glass flask was added bis(2-hydroxyethyl) terephthalate, (149.49 gm), lactic acid, (85 wt. % aqueous solution, 34.34 gm), dimethyl 5-sulfoisophthalate, sodium salt, (3.55 gm), sodium acetate, (0.21 gm), tris(2-hydroxyethyl)trimellitate, (0.21 gm), ethylene glycol, (20.11 gm), poly(ethylene glycol), avg. MW of 1000, (8.92 gm), manganese(II) acetate tetrahydrate, (0.0663 gm), antimony(III) oxide, (0.0534 gm) and tin(II) 2-ethylhexanoate, (0.1015 gm). The reaction mixture was stirred and heated to 180° C. under a slow nitrogen purge. After achieving 180° C., the reaction mixture was stirred at 180° C. for 1.0 hr under a slow nitrogen purge. The reaction mixture was then heated to 240° C. over 0.8 hrs with stirring. After achieving 240° C., the reaction mixture was stirred at 240° C. for 0.6 hrs under a slow nitrogen purge. The reaction mixture was then heated to 255° C. over 0.3 hrs with stirring under a slight nitrogen purge. The reaction mixture was stirred at 255° C. for 0.7 hrs under a slight nitrogen purge. 32.4 gm of a colorless distillate was collected over this heating cycle. The reaction mixture was then staged to full vacuum with stirring at 255° C. The resulting reaction mixture was stirred for 2.8 hrs under full vacuum (pressure less than 100 mtorr). The vacuum was then released with nitrogen and the reaction mass allowed to cool to room temperature. An additional 49.2 gm of distillate was recovered and 118.1 gm of a solid product was recovered. The sample was measured for LRV, as described above, and was found to have a LRV of 18.10. This sample was calculated to have an IV of 0.57 dL/g. The sample underwent DSC analysis. A $T_g$ was observed with an onset of 60.3° C., a midpoint of 61.1° C., and an endpoint of 61.8° C. A crystalline $T_m$ was observed at 220.0° C. (26.2 J/g).

Example 10

To a 250 mL glass flask was added bis(2-hydroxyethyl) terephthalate, (149.49 gm), lactic acid, (85 wt. % aqueous solution, 34.34 gm), dimethyl 5-sulfoisophthalate, sodium salt, (3.55 gm), sodium acetate, (0.21 gm), tris(2-hydroxyethyl)trimellitate, (0.21 gm), ethylene glycol, (20.11 gm), poly(ethylene glycol), avg. MW of 1000, (8.92 gm), manganese(II) acetate tetrahydrate, (0.0663 gm), antimony(III) oxide, (0.0534 gm), tin(II) 2-ethylhexanoate, (0.1015 gm), and sodium hypophosphite hydrate, (0.0238 gm). The reaction mixture was stirred and heated to 180° C. under a slow nitrogen purge. After achieving 180° C., the reaction mixture was stirred at 180° C. for 1.0 hr under a slow nitrogen purge. The reaction mixture was then heated to 240° C. over 0.6 hrs with stirring. After achieving 240° C., the reaction mixture was stirred at 240° C. for 0.6 hrs under a slow nitrogen purge. The reaction mixture was then heated to 255° C. over 0.2 hrs with stirring under a slight nitrogen purge. The reaction mixture was stirred at 255° C. for 0.6 hrs under a slight nitrogen purge. 31.8 gms of a colorless distillate was collected over this heating cycle. The reaction mixture was then staged to full vacuum with stirring at 255° C. The resulting reaction mixture was stirred for 2.5 hrs under full vacuum (pressure less than 100 mtorr). The vacuum was then released with nitrogen and the reaction mass allowed to cool to room temperature. An additional 52.9 gm of distillate was recovered and 104.6 gm of a solid product was recovered. The sample was measured for LRV, as described above, and was found to have a LRV of 17.79. This sample was calculated to have an IV of 0.57 dL/g. The sample underwent DSC analysis. A $T_g$ was observed with an onset of 53.2° C., a midpoint of 56.7° C., and an endpoint of 60.5° C. A crystalline $T_m$ was observed at 220.7° C. (26.7 J/g).

Comparative Example CE 8

To a 1.0 liter glass flask was added bis(2-hydroxyethyl) terephthalate, (378.09 gm), dimethyl glutarate, (164.27 gm), dimethyl 5-sulfoisophthalate, sodium salt, (15.19 gm), tris (2-hydroxyethyl)trimellitate, (0.67 gm), ethylene glycol, (70.03 gm), polyethylene glycol, (avg. MW of 1450, 41.94 gm), sodium acetate, (0.75 gm), manganese(II) acetate tetrahydrate, (0.2339 gm), and antimony(III) trioxide, (0.1883 gm). The reaction mixture was stirred and heated to 180° C. under a slow nitrogen purge. After achieving 180° C., the reaction mixture was heated to 200° C. over 0.3 hrs with stirring under a slow nitrogen purge. The resulting reaction mixture was stirred at 200° C. under a slight nitrogen purge for 0.9 hrs. The reaction mixture was then heated to 275° C. over 1.8 hrs with stirring under a slight nitrogen purge. The resulting reaction mixture was stirred at 275° C. for 1.0 hr while under a slight nitrogen purge. 104.5 gm of a colorless distillate was collected over this heating cycle. The reaction mixture was then staged to full vacuum with stirring at 275° C. The resulting reaction mixture was stirred for 5.6 hrs under full vacuum (pressure less than 100 mtorr). The vacuum was then released with nitrogen and the reaction mass allowed to cool to room temperature. An additional 74.8 gm of distillate was recovered and 454.0 gm of a solid product was recovered. The sample was measured for LRV, as described above, and was found to have a LRV of 21.82. This sample was calculated to have an IV of 0.64 dL/g. The sample underwent DSC analysis. A broad crystalline $T_m$ was observed at 157.6° C. (0.3 J/g).

Comparative Example CE 9

To a 250 mL glass flask was added bis(2-hydroxyethyl) terephthalate, (149.49 gm), lactic acid, (85 wt. % aqueous solution, 42.39 gm), dimethyl 5-sulfoisophthalate, sodium salt, (3.58 gm), sodium acetate, (0.22 gm), ethylene glycol, (24.83 gm), tris(2-hydroxyethyl)trimellitate, (0.21 gm), manganese(II) acetate tetrahydrate, (0.0686 gm), and antimony(III) trioxide, (0.0555 gm). The reaction mixture was stirred and heated to 180° C. under a slow nitrogen purge. After achieving 180° C., the reaction mixture was stirred at 180° C. for 1.0 hr under a slow nitrogen purge. The reaction mixture was then heated to 240° C. over 0.4 hrs with stirring. After achieving 240° C., the reaction mixture was stirred at 240° C. for 0.5 hrs under a slow nitrogen purge. The reaction mixture was then heated to 255° C. over 0.1 hr with stirring under a slight nitrogen purge. The reaction mixture was stirred at 255° C. for 0.9 hrs under a slight nitrogen purge. 32.3 gm of a colorless distillate was collected over this heating cycle. The reaction mixture was then staged to full vacuum with stirring at 255° C. The resulting reaction mixture was stirred for 3.4 hrs under full vacuum (pressure less than 100 mtorr). The vacuum was then released with nitrogen and the reaction mass allowed to cool to room temperature. An additional 53.8 gm of distillate was recovered and 112.6 gm of a solid product was recovered. The sample was measured for LRV, as described above, and was found to have a LRV of 14.28. The sample was calculated to have an IV of 0.50 dL/g. The sample underwent DSC analysis. A Tg was observed with an onset of 70.6° C., a midpoint of 72.8° C., and an endpoint of 75.1° C. A crystalline $T_m$ was observed at 207.3° C., (17.5 J/g).

The sample was ground into powder and tested for biodegradation, as described above. This sample was found to biodegrade 4.6% within 13.6 days under these test conditions.

Example 11

To a 250 mL glass flask was added bis(2-hydroxyethyl) terephthalate, (149.49 gm), lactic acid, (85 wt. % aqueous solution, 42.39 gm), dimethyl 5-sulfoisophthalate, sodium salt, (3.55 gm), sodium acetate, (0.22 gm), tris(2-hydroxyethyl)trimellitate, (0.21 gm), ethylene glycol, (24.83 gm), poly(ethylene glycol), avg. MW of 1000, (9.00 gm), manganese(II) acetate tetrahydrate, (0.0689 gm), and antimony (III) oxide, (0.0555 gm). The reaction mixture was stirred and heated to 180° C. under a slow nitrogen purge. After achieving 180° C., the reaction mixture was stirred at 180° C. for 1.0 hr under a slow nitrogen purge. The reaction mixture was then heated to 240° C. over 0.8 hrs with stirring. After achieving 240° C., the reaction mixture was stirred at 240° C. for 0.4 hrs under a slow nitrogen purge. The reaction mixture was then heated to 255° C. over 0.3 hrs with stirring under a slight nitrogen purge. The reaction mixture was stirred at 255° C. for 0.6 hrs under a slight nitrogen purge. 35.6 gm of a colorless distillate was collected over this heating cycle. The reaction mixture was then staged to full vacuum with stirring at 255° C. The resulting reaction mixture was stirred for 2.6 hrs under full vacuum (pressure less than 100 mtorr). The vacuum was then released with nitrogen and the reaction mass allowed to cool to room temperature. An additional 63.9 gm of distillate was recovered and 100.0 gm of a solid product was recovered. The sample was measured for LRV, as described above, and was found to have a LRV of 17.63. The sample was calculated to have an IV of 0.56 dL/g. The sample underwent DSC analysis. A $T_g$ was observed with an onset of 62.7° C., a midpoint of 63.7° C., and an endpoint of 64.3° C. A crystalline $T_m$ was observed at 222.2° C. (6.3 J/g).

The sample was ground into powder and tested for biodegradation, as described above. This sample was found to biodegrade 7.5% within 13.6 days under these test conditions.

Pressed films were produced from the material prepared above on a Sargent hydraulic melt press (W. H. Sargent & Company, Chicago, USA). Approximately, 0.5 gm of the material prepared above was placed between two sheets of Armalon® cloth with a 0.001 inch thick brass shim. This construct was placed between the hydraulic melt press platens heated to a temperature of 250° C.+/−5° C. The platens were closed without pressure for 10–15 seconds and then the pressure was slowly raised to 3000–4000 psi. The pressure was held there for 15 seconds and then the pressure was released, the sample removed from the hydraulic press and the film was quenched in cold water. The films were found to be clear and flexible.

Example 12

To a 250 mL glass flask was added bis(2-hydroxyethyl) terephthalate, (149.49 gm), lactic acid, (85 wt. % aqueous solution, 42.39 gm), dimethyl 5-sulfoisophthalate, sodium salt, (3.55 gm), sodium acetate, (0.22 gm), tris(2-hydroxyethyl)trimellitate, (0.21 gm), ethylene glycol, (24.83 gm), poly(ethylene glycol), avg. MW of 1000, (9.00 gm), manganese(II) acetate tetrahydrate, (0.0689 gm), and antimony (III) oxide, (0.0555 gm). The reaction mixture was stirred and heated to 180° C. under a slow nitrogen purge. After achieving 180° C., the reaction mixture was stirred at 180° C. for 1.0 hr under a slow nitrogen purge. The reaction mixture was then heated to 240° C. over 0.7 hrs with stirring. After achieving 240° C., the reaction mixture was stirred at 240° C. for 0.6 hrs under a slow nitrogen purge. The reaction mixture was then heated to 255° C. over 0.3 hrs with stirring under a slight nitrogen purge. The reaction mixture was stirred at 255° C. for 0.7 hrs under a slight nitrogen purge. 30.5 gm of a colorless distillate was collected over this heating cycle. The reaction mixture was then staged to full vacuum with stirring at 255° C. The resulting reaction mixture was stirred for 2.1 hrs under full vacuum (pressure less than 100 mtorr). The vacuum was then released with nitrogen and the reaction mass allowed to cool to room temperature. An additional 68.6 gm of distillate was recovered and 86.7 gm of a solid product was recovered. The sample was measured for LRV, as described above, and was found to have a LRV of 18.39. The sample was calculated to have an IV of 0.58 dL/g. The sample underwent DSC analysis. A $T_g$ was observed with an onset of 55.3° C., a midpoint of 58.7° C., and an endpoint of 62.1° C. A crystalline $T_m$ was observed at 222.1° C. (26.2 J/g).

Example 13

To a 250 mL glass flask was added bis(2-hydroxyethyl) terephthalate, (149.49 gm), lactic acid, (85 wt. % aqueous solution, 42.39 gm), dimethyl 5-sulfoisophthalate, sodium salt, (3.55 gm), sodium acetate, (0.22 gm), tris(2-hydroxyethyl)trimellitate, (0.62 gm), ethylene glycol, (24.83 gm), poly(ethylene glycol), avg. MW of 1000, (9.00 gm), and Tyzor® PEL-G, (8.2 wt. % titanium, 0.0596 gm). The reaction mixture was stirred and heated to 180° C. under a slow nitrogen purge. After achieving 180° C., the reaction mixture was stirred at 180° C. for 1.1 hrs under a slow nitrogen purge. The reaction mixture was then heated to 225° C. over 0.7 hrs with stirring. After achieving 225° C., the reaction mixture was stirred at 225° C. for 0.7 hrs under a slow nitrogen purge. The reaction mixture was then heated to 250° C. over 0.5 hrs with stirring under a slight nitrogen purge. The reaction mixture was stirred at 250° C. for 0.8 hrs under a slight nitrogen purge. 32.3 gm of a colorless distillate was collected over this heating cycle. The reaction mixture was then staged to full vacuum with stirring at 250° C. The resulting reaction mixture was stirred for 4.0 hrs under full vacuum (pressure less than 100 mtorr). The vacuum was then released with nitrogen and the reaction mass allowed to cool to room temperature. An additional 60.9 gm of distillate was recovered and 114.8 gm of a solid product was recovered. The sample was measured for LRV, as described above, and was found to have a LRV of 17.58. The sample was calculated to have an IV of 0.56 dL/g. The sample underwent DSC analysis. A $T_g$ was observed with an onset of 56.5° C., a midpoint of 58.8° C., and an endpoint of 61.1° C. A crystalline $T_m$ was observed at 214.7° C. (23.7 J/g).

Example 14

To a 250 mL glass flask was added bis(2-hydroxyethyl) terephthalate, (149.49 gm), lactic acid, (85 wt. % aqueous solution, 42.39 gm), dimethyl 5-sulfoisophthalate, sodium salt, (3.55 gm), sodium acetate, (0.22 gm), tris(2-hydroxyethyl)trimellitate, (0.62 gm), ethylene glycol, (24.83 gm), poly(ethylene glycol), avg. MW of 1000, (18.00 gm), and Tyzor® PEL-G, (8.2 wt. % titanium, 0.0470 gm). The reaction mixture was stirred and heated to 180° C. under a slow nitrogen purge. After achieving 180° C., the reaction mixture was stirred at 180° C. for 1.0 hr under a slow nitrogen purge. The reaction mixture was then heated to 225° C. over 0.7 hrs with stirring. After achieving 225° C., the reaction mixture was stirred at 225° C. for 0.6 hrs under a slow nitrogen purge. The reaction mixture was then heated to 250° C. over 0.6 hrs with stirring under a slight nitrogen purge. The reaction mixture was stirred at 250° C. for 0.6 hrs under a slight nitrogen purge. 24.7 gm of a colorless distillate was collected over this heating cycle. The reaction mixture was then staged to full vacuum with stirring at 250° C. The resulting reaction mixture was stirred for 4.2 hrs under full vacuum (pressure less than 100 mtorr). The vacuum was then released with nitrogen and the reaction mass allowed to cool to room temperature. An additional 66.0 gm of distillate was recovered and 107.5 gm of a solid product was recovered. The sample was measured for LRV, as described above, and was found to have a LRV of 19.75. This sample was calculated to have an IV of 0.60 dL/g. The sample underwent DSC analysis. A $T_g$ was observed with an onset of 44.3° C., a midpoint of 46.5° C., and an endpoint of 48.1° C. A $T_{cryst}$ was observed at 121.5° C. (21.9 J/g). A crystalline $T_m$ was observed at 212.3° C. (27.3 J/g).

Example 15

To a 250 mL glass flask was added bis(2-hydroxyethyl) terephthalate, (149.49 gm), lactic acid, (85 wt. % aqueous solution, 42.39 gm), dimethyl 5-sulfoisophthalate, sodium salt, (3.55 gm), sodium acetate, (0.22 gm), tris(2-hydroxyethyl)trimellitate, (0.62 gm), ethylene glycol, (24.83 gm), poly(ethylene glycol), avg. MW of 3400, (9.00 gm), and Tyzor® PEL-G, (8.2 wt. % titanium, 0.0592 gm). The reaction mixture was stirred and heated to 180° C. under a slow nitrogen purge. After achieving 180° C., the reaction mixture was stirred at 180° C. for 1.0 hr under a slow nitrogen purge. The reaction mixture was then heated to 225° C. over 0.5 hrs with stirring. After achieving 225° C., the reaction mixture was stirred at 225° C. for 0.6 hrs under a slow nitrogen purge. The reaction mixture was then heated to 250° C. over 0.7 hrs with stirring under a slight nitrogen purge. The reaction mixture was stirred at 250° C. for 0.6 hrs under a slight nitrogen purge. 27.1 gm of a colorless distillate was collected over this heating cycle. The reaction mixture was then staged to full vacuum with stirring at 250° C. The resulting reaction mixture was stirred for 4.4 hrs under full vacuum (pressure less than 100 mtorr). The vacuum was then released with nitrogen and the reaction mass allowed to cool to room temperature. An additional 64.9 gm of distillate was recovered and 98.7 gm of a solid product was recovered. The sample was measured for LRV, as described above, and was found to have a LRV of 19.08. This sample was calculated to have an IV of 0.59 dL/g. The sample underwent DSC analysis. A $T_g$ was observed with an onset of 60.3° C., a midpoint of 61.5° C., and an endpoint of 62.6° C. A crystalline $T_m$ was observed at 220.8° C. (27.0 J/g).

Example 16

To a 250 mL glass flask was added bis(2-hydroxyethyl) terephthalate, (149.49 gm), lactic acid, (85 wt. % aqueous solution, 42.39 gm), dimethyl 5-sulfoisophthalate, sodium salt, (3.55 gm), sodium acetate, (0.22 gm), tris(2-hydroxyethyl)trimellitate, (0.62 gm), ethylene glycol, (24.83 gm), poly(ethylene glycol), avg. MW of 3400, (18.00 gm), and Tyzor® PEL-G, (8.2 wt. % titanium, 0.0450 gm). The reaction mixture was stirred and heated to 180° C. under a slow nitrogen purge. After achieving 180° C., the reaction mixture was stirred at 180° C. for 1.1 hrs under a slow nitrogen purge. The reaction mixture was then heated to 225° C. over 0.6 hrs with stirring. After achieving 225° C., the reaction mixture was stirred at 225° C. for 0.7 hours under a slow nitrogen purge. The reaction mixture was then heated to 250° C. over 0.6 hrs with stirring under a slight nitrogen purge. The reaction mixture was stirred at 250° C. for 0.5 hrs under a slight nitrogen purge. 32.6 gm of a colorless distillate was collected over this heating cycle. The reaction mixture was then staged to full vacuum with stirring at 250° C. The resulting reaction mixture was stirred for 4.4 hrs under full vacuum (pressure less than 100 mtorr). The vacuum was then released with nitrogen and the reaction mass allowed to cool to room temperature. An additional 60.4 gm of distillate was recovered and 123.3 gm of a solid product was recovered. The sample was measured for LRV, as described above, and was found to have a LRV of 20.64. This sample was calculated to have an IV of 0.62 dL/g. The sample underwent DSC analysis. A crystalline $T_m$ was observed at 217.9° C. (27.2 J/g).

Example 17

To a 250 mL glass flask was added bis(2-hydroxyethyl) terephthalate, (149.49 gm), lactic acid, (85 wt. % aqueous solution, 42.39 gm), dimethyl 5-sulfoisophthalate, sodium salt, (3.55 gm), sodium acetate, (0.22 gm), tris(2-hydroxyethyl)trimellitate, (0.21 gm), ethylene glycol, (24.83 gm), poly(ethylene glycol), avg. MW of 1000, (9.00 gm), manganese(II) acetate tetrahydrate, (0.0689 gm), and antimony (III) oxide, (0.0555 gm). The reaction mixture was stirred and heated to 180° C. under a slow nitrogen purge. After achieving 180° C., the reaction mixture was stirred at 180° C. for 1.1 hours under a slow nitrogen purge. The reaction mixture was then heated to 240° C. over 1.0 hr with stirring. After achieving 240° C., the reaction mixture was stirred at 240° C. for 0.8 hrs under a slow nitrogen purge. 20.8 gm of a colorless distillate was collected over this heating cycle. The reaction mixture was then staged to full vacuum with stirring at 240° C. The resulting reaction mixture was stirred for 4.5 hrs under full vacuum (pressure less than 100 mtorr). The vacuum was then released with nitrogen and the reaction mass allowed to cool to room temperature. An additional 69.9 gm of distillate was recovered and 106.2 gm of a solid product was recovered. The sample was measured for LRV, as described above, and was found to have a LRV of 15.78. This sample was calculated to have an IV of 0.53 dL/g. The sample underwent DSC analysis. A $T_g$ was observed with an onset of 56.8° C., a midpoint of 59.3° C., and an endpoint of 61.8° C. A crystalline $T_m$ was observed at 212.6° C. (19.5 J/g).

Example 18

To a 250 mL glass flask was added bis(2-hydroxyethyl) terephthalate, (149.49 gm), lactic acid, (85 wt. % aqueous solution, 42.39 gm), dimethyl 5-sulfoisophthalate, sodium salt, (3.55 gm), sodium acetate, (0.22 gm), tris(2-hydroxyethyl)trimellitate, (0.21 gm), ethylene glycol, (24.83 gm), poly(ethylene glycol), avg. MW of 1000, (9.27 gm), manganese(II) acetate tetrahydrate, (0.0689 gm), antimony(III) oxide, (0.0555 gm), tin(II) 2-ethylhexanoate, (0.1055 gm), and sodium hypophosphite hydrate, (0.0247 gm). The reaction mixture was stirred and heated to 180° C. under a slow nitrogen purge. After achieving 180° C., the reaction mixture was stirred at 180° C. for 1.0 hr under a slow nitrogen purge. The reaction mixture was then heated to 240° C. over 0.9 hrs with stirring. After achieving 240° C., the reaction mixture was stirred at 240° C. for 0.6 hrs under a slow nitrogen purge. The reaction mixture was then heated to 255° C. over 0.4 hrs with stirring under a slight nitrogen purge. The reaction mixture was stirred at 255° C. for 0.7 hrs under a slight nitrogen purge. 36.9 gm of a colorless distillate was collected over this heating cycle. The reaction mixture was then staged to full vacuum with stirring at 255° C. The resulting reaction mixture was stirred for 2.7 hrs under full vacuum (pressure less than 100 mtorr). The vacuum was then released with nitrogen and the reaction mass allowed to cool to room temperature. An additional 58.8 gm of distillate was recovered and 122.7 gm of a solid product was recovered. The sample was measured for LRV, as described above, and was found to have a LRV of 16.58. The sample was calculated to have an IV of 0.55 dL/g. The sample underwent DSC analysis. A $T_g$ was observed with an onset of 55.5° C., a midpoint of 58.7° C., and an endpoint of 61.9° C. A crystalline $T_m$ was observed at 216.9° C. (22.7 J/g).

Preparative Example PE 1

To a 1 liter glass flask was added lactic acid, (85 wt. % aqueous solution, 423.91 gm), and ethylene glycol, (248.28 gm). The reaction mixture was heated to 180° C. with stirring while under a slight nitrogen purge. After achieving 180° C., the resulting reaction mixture was allowed to stir at 180° C. under the slight nitrogen purge for 1.0 hr. The reaction mixture was then heated to 200° C. over 0.8 hrs with stirring with a slight nitrogen purge. After achieving 200° C., the resulting reaction mixture was allowed to stir at 200° C. for 2.0 hrs with a slight nitrogen purge. Heating was then discontinued and the reaction mixture allowed to cool to room temperature. A total of 130.1 gm distillate was collected and 514.7 gm of a colorless clear product was provided.

Example 19

To a 250 mL glass flask was added bis(2-hydroxyethyl) terephthalate, (144.15 gm), product from Preparative Example PE 1, (4.02 gm), dimethyl 5-sulfoisophthalate, sodium salt, (0.89 gm), sodium acetate, (0.16 gm), poly(ethylene glycol), (avg. MW of 1000, 5.00 gm), manganese (II) acetate tetrahydrate, (0.0504 gm), antimony(III) oxide, (0.0413 gm), and a 50 wt. % calcium carbonate slurry in ethylene glycol, (100.21 gm slurry). The reaction mixture was stirred and heated to 180° C. under a slow nitrogen purge. After achieving 180° C., the reaction mixture was stirred at 180° C. for 0.5 hrs under a slow nitrogen purge. The reaction mixture was then heated to 260° C. over 0.5 hrs with stirring. After achieving 260° C., the reaction mixture was stirred at 260° C. for 0.7 hrs under a slow nitrogen purge. 88.3 gm of a colorless distillate was collected over this heating cycle. The reaction mixture was then staged to full vacuum with stirring at 260° C. The resulting reaction mixture was stirred for 0.8 hrs under full vacuum (pressure less than 100 mtorr). The vacuum was then released with nitrogen and the reaction mass allowed to cool to room temperature. An additional 22.5 gm of distillate was recovered and 130.7 gm of a solid product was recovered. The sample was measured for LRV, as described above, and was found to have a LRV of 19.40. This sample was calculated to have an IV of 0.60 dL/g. The sample underwent DSC analysis. A crystalline $T_m$ was observed at 241.7° C. (29.1 J/g).

Example 20

To a 250 mL glass flask was added dimethyl terephthalate, (110.11 gm), glycolic acid, (2.28 gm), dimethyl 5-sulfoisophthalate, sodium salt, (0.89 gm), 1,3-propanediol, (73.06 gm), poly(tetramethylene glycol), (avg. MW of 1000, 13.27 gm), titanium(IV) isopropoxide, (0.1316 gm), and Gelwhite® MAS, (14.75 gm). The reaction mixture was heated to 180° C. under a slight nitrogen purge. After achieving 180° C., the reaction mixture was stirred at 180° C. under a slight nitrogen purge for 0.7 hrs. The reaction mixture was then heated to 190° C. with stirring under a slight nitrogen purge over 0.1 hrs. After achieving 190° C., the reaction mixture was stirred at 190° C. with stirring under a slight nitrogen purge for 0.4 hrs. The reaction mixture was then heated with stirring to 200° C. under a slight nitrogen purge over 0.1 hrs. After achieving 200° C., the resulting reaction mixture was stirred at 200° C. under a slight nitrogen purge for 0.5 hrs. The reaction mixture was then stirred and heated to 255° C. under a slow nitrogen purge over 0.5 hrs. After achieving 255° C., the resulting reaction mixture was stirred at 255° C. for 0.7 hrs under a slow nitrogen purge. 33.2 gm of a colorless distillate was collected over this heating cycle. The reaction mixture was then staged to full vacuum with stirring at 255° C. The resulting reaction mixture was stirred for 1.8 hrs under full vacuum (pressure less than 100 mtorr). The vacuum was then released with nitrogen and the reaction mass allowed to cool to room temperature. An additional 216.6 gm of distillate was recovered and 99.8 gm of a solid product was

Example 21

To a 250 mL glass flask was added bis(2-hydroxyethyl) terephthalate, (135.76 gm), lactic acid, (85 wt. % aqueous solution, 3.18 gm), glycolic acid, (2.28 gm), dimethyl 5-sulfoisophthalate, sodium salt, (1.78 gm), poly(ethylene glycol), (avg. MW of 3400, 5.66 gm), sodium acetate, (0.17 gm), manganese(II) acetate tetrahydrate, (0.0514 gm), antimony(III) trioxide, (0.0414 gm), and Claytone® 2000, (3.50 grams). The reaction mixture was stirred and heated to 180° C. under a slow nitrogen purge. After achieving 180° C., the reaction mixture was stirred at 180° C. for 0.6 hrs under a slight nitrogen purge. The reaction mixture was then heated to 255° C. over 1.9 hrs with stirring. After achieving 255° C., the reaction mixture was stirred at 255° C. for 0.7 hrs under a slow nitrogen purge. 9.8 gm of a colorless distillate was collected over this heating cycle. The reaction mixture was then staged to full vacuum with stirring at 255° C. The resulting reaction mixture was stirred for 3.3 hrs under full vacuum (pressure less than 100 mtorr). The vacuum was then released with nitrogen and the reaction mass allowed to cool to room temperature. An additional 22.9 gm of distillate was recovered and 87.3 gm of a solid product was recovered. The sample was measured for LRV, as described above, and was found to have a LRV of 12.63. The sample was calculated to have an IV of 0.47 dL/g. The sample underwent DSC analysis. A crystalline $T_m$ was observed at a temperature of 242.7° C. (37.6 J/g).

Example 22

To a 250 mL glass flask was added bis(2-hydroxyethyl) terephthalate, (129.66 gm), isophthalic acid, (8.97 gm), glycolic acid, (2.28 gm), dimethyl 5-sulfoisophthalate, sodium salt, (1.78 gm), poly(ethylene glycol), (avg. MW of 1500, 5.85 grams), sodium acetate, (0.16 gm), manganese (II) acetate tetrahydrate, (0.0563 gm), antimony(III) trioxide, (0.0484 gm), and a 50 wt. % calcium carbonate slurry in ethylene glycol, (58.52 gm). The reaction mixture was stirred and heated to 180° C. under a slow nitrogen purge. After achieving 180° C., the reaction mixture was stirred at 180° C. for 0.5 hrs under a slight nitrogen purge. The reaction mixture was then heated to 260° C. over 0.5 hrs with stirring. After achieving 260° C., the reaction mixture was stirred at 260° C. for 0.5 hrs under a slow nitrogen purge. 42.1 gm of a colorless distillate was collected over this heating cycle. The reaction mixture was then staged to full vacuum with stirring at 260° C. The resulting reaction mixture was stirred for 1.6 hrs under full vacuum (pressure less than 100 mtorr). The vacuum was then released with nitrogen and the reaction mass allowed to cool to room temperature. An additional 21.8 gm of distillate was recovered and 124.9 gm of a solid product was recovered. The sample was measured for LRV, as described above, and was found to have a LRV of 19.43. This sample was calculated to have an IV of 0.60 dL/g. The sample underwent DSC analysis. A crystalline $T_m$ was observed at a temperature of 241.7° C. (25.5 J/g).

recovered. The sample was measured for LRV, as described above, and was found to have a LRV of 37.80. This sample was calculated to have an IV of 0.93 dL/g. The sample underwent DSC analysis. A crystalline $T_m$ was observed at 218.0° C. (40.3 J/g).

Example 23

To a 250 mL glass flask was added dimethyl terephthalate, (102.53 gm), ethyl (S)-(−)-lactate, (7.09 gm), dimethyl 5-sulfoisophthalate, sodium salt, (3.55 gm), 1,3-propanediol, (73.06 gm), poly(ethylene glycol)-block-poly(propylene glycol)-block-polyethylene glycol), (avg. MW of 1100, ca. 10 wt. % ethylene glycol, 38.93 gm), sodium acetate, (0.17 gm), and titanium(IV) isopropoxide, (0.1387 gm). The reaction mixture was stirred and heated to 180° C. under a slow nitrogen purge. After achieving 180° C., the reaction mixture was stirred at 180° C. for 0.6 hrs under a slow nitrogen purge. The reaction mixture was then heated to 190° C. over 0.3 hrs with stirring. After achieving 190° C., the reaction mixture was stirred at 190° C. for 0.6 hrs under a slow nitrogen purge. The reaction mixture was then heated to 200° C. over 0.2 hrs with stirring under a slight nitrogen purge. The reaction mixture was stirred at 200° C. for 0.4 hrs under a slight nitrogen purge. The reaction mixture was then heated to 255° C. over 1.1 hrs with stirring under a slight nitrogen purge. The reaction mixture was stirred at 255° C. for 0.6 hours under a slight nitrogen purge. 33.8 gm of a colorless distillate was collected over this heating cycle. The reaction mixture was then staged to full vacuum with stirring at 255° C. The resulting reaction mixture was stirred for 3.4 hrs under full vacuum (pressure less than 100 mtorr). The vacuum was then released with nitrogen and the reaction mass allowed to cool to room temperature. An additional 34.3 gm of distillate was recovered and 123.9 gm of a solid product was recovered. The sample was measured for LRV, as described above, and was found to have a LRV of 24.67. The sample was calculated to have an IV of 0.69 dL/g. The sample underwent DSC analysis. A $T_g$ was not observed. A broad crystalline $T_m$ was observed at 214.9° C. (42.4 J/g).

Example 24

To a 250 mL glass flask was added dimethyl terephthalate, (87.27 gm), lactic acid, (85 wt. % aqueous solution, 16.90 gm), dimethyl 5-sulfoisophthalate, sodium salt, (0.18 gm), 1,3-propanediol, (51.36 gm), poly(ethylene glycol)-block-poly(propylene glycol)-block-polyethylene glycol), (avg. MW of 2000, ca. 10 wt. % ethylene glycol, 1.20 grams), pentaerythritol, (0.0518 grams), sodium acetate, (0.17 gm), titanium(IV) isopropoxide, (0.0600 gm), and kaolin, (12.78 gm). The reaction mixture was stirred and heated to 180° C. under a slow nitrogen purge. After achieving 180° C., the reaction mixture was stirred at 180° C. for 0.5 hrs under a slow nitrogen purge. The reaction mixture was then heated to 190° C. over 0.3 hrs with stirring. After achieving 190° C., the reaction mixture was stirred at 190° C. for 0.5 hrs under a slow nitrogen purge. The reaction mixture was then heated to 200° C. over 0.3 hrs with stirring under a slight nitrogen purge. The reaction mixture was stirred at 200° C. for 0.5 hrs under a slight nitrogen purge. The reaction mixture was then heated to 255° C. over 1.1 hrs with stirring under a slight nitrogen purge. The reaction mixture was stirred at 255° C. for 0.6 hrs under a slight nitrogen purge. 32.7 gm of a colorless distillate was collected over this heating cycle. The reaction mixture was then staged to full vacuum with stirring at 255° C. The resulting reaction mixture was stirred for 4.1 hrs under full vacuum (pressure less than 100 mtorr). The vacuum was then released with nitrogen and the reaction mass allowed to cool to room temperature. An additional 17.2 gm of distillate was recovered and 96.3 gm of a solid product was recovered. The sample was measured for LRV, as described above, and was found to have a LRV of 25.99.

This sample was calculated to have an IV of 0.72 dL/g. The sample underwent DSC analysis. A $T_g$ was not observed. A broad crystalline $T_m$ was observed at 220.2° C. (42.1 J/g).

Example 25

To a 250 mL glass flask was added dimethyl terephthalate, (83.89 gm), lactic acid, (85 wt. % aqueous solution, 15.90 gm), dimethyl 5-sulfoisophthalate, sodium salt, (5.33 gm), 1,3-propanediol, (51.36 gm), poly(ethylene glycol)-block-poly(propylene glycol)-block-polyethylene glycol), (avg MW of 2000, ca. 10 wt. % ethylene glycol, 19.90 gm), pentaerythritol, (0.0518 gm), sodium acetate, (0.15 gm), titanium(IV) isopropoxide, (0.0615 gm), and kaolin, (12.78 gm). The reaction mixture was stirred and heated to 180° C. under a slow nitrogen purge. After achieving 180° C., the reaction mixture was stirred at 180° C. for 0.5 hrs under a slow nitrogen purge. The reaction mixture was then heated to 190° C. over 0.2 hrs with stirring. After achieving 190° C., the reaction mixture was stirred at 190° C. for 0.6 hrs under a slow nitrogen purge. The reaction mixture was then heated to 200° C. over 0.2 hrs with stirring under a slight nitrogen purge. The reaction mixture was stirred at 200° C. for 0.5 hrs under a slight nitrogen purge. The reaction mixture was then heated to 255° C. over 1.2 hrs with stirring under a slight nitrogen purge. The reaction mixture was stirred at 255° C. for 0.7 hrs under a slight nitrogen purge. 33.4 gm of a colorless distillate was collected over this heating cycle. The reaction mixture was then staged to full vacuum with stirring at 255° C. The resulting reaction mixture was stirred for 3.5 hrs under full vacuum (pressure less than 100 mtorr). The vacuum was then released with nitrogen and the reaction mass allowed to cool to room temperature. An additional 18.6 gm of distillate was recovered and 121.0 gm of a solid product was recovered. The sample was measured for LRV, as described above, and was found to have a LRV of 17.26. The sample was calculated to have an IV of 0.56 dL/g. The sample underwent DSC analysis. A $T_g$ was not observed. A broad crystalline $T_m$ was observed at 211.5° C. (35.1 J/g).

Example 26

To a 250 mL glass flask was added dimethyl terephthalate, (83.89 gm), glycolic acid, (11.41 gm), dimethyl 5-sulfoisophthalate, sodium salt, (5.33 gm), 1,3-propanediol, (51.36 gm), poly(ethylene glycol), (avg. MW of 3400, 10.57 gm), pentaerythritol, (0.0518 gm), sodium acetate, (0.20 gm), titanium(IV) isopropoxide, (0.1110 gm), and Laponite® RDS, 26.42 gm). The reaction mixture was heated to 180° C. under a slight nitrogen purge. After achieving 180° C., the reaction mixture was stirred at 180° C. under a slight nitrogen purge for 0.5 hours. The reaction mixture was then heated to 190° C. with stirring under a slight nitrogen purge over 0.4 hrs. After achieving 190° C., the reaction mixture was stirred at 190° C. with stirring under a slight nitrogen purge for 0.6 hrs. The reaction mixture was then stirred and heated to 255° C. under a slow nitrogen purge over 1.3 hrs. After achieving 255° C., the resulting reaction mixture was stirred at 255° C. for 0.7 hrs under a slow nitrogen purge. 29.6 gm of a colorless distillate was collected over this heating cycle. The reaction mixture was then staged to full vacuum with stirring at 255° C. The resulting reaction mixture was stirred for 4.1 hrs under full vacuum (pressure less than 100 mtorr). The vacuum was then released with nitrogen and the reaction mass allowed to cool to room temperature. An additional 6.2 gm of distillate was recovered and 122.2 gm of a solid product was recovered. The sample was measured for LRV, as described above, and was found to have a LRV of 11.21. The sample was calculated to have an IV of 0.45 dL/g. The sample underwent DSC analysis. A broad crystalline $T_m$ was observed at 217.6° C. (37.1 J/g).

Example 27

To a 250 mL glass flask was added poly(trimethylene terephthalate), (59.74 gm), dimethyl 5-sulfoisophthalate, sodium salt, (2.96 gm), 1,3-propanediol, (3.81 gm), and poly(ethylene glycol)-block-poly(propylene glycol)-block-poly(ethylene glycol), (avg. MW of 1100, 77.12 gm). The reaction mixture was stirred and heated to 255° C. under a slow nitrogen purge. After achieving 255° C., poly(lactide) (from Cargill-Dow, 14.42 gm) was added to the homogeneous reaction mixture and the resulting mixture was stirred at 255° C. for 1.3 hrs under a slow nitrogen purge. 2.5 gm of a colorless distillate was collected over this heating cycle. The homogeneous reaction mixture was then staged to full vacuum with stirring at 255° C. The resulting reaction mixture was stirred for 2.2 hrs under full vacuum (pressure less than 100 mtorr). The vacuum was then released with nitrogen and the reaction mass allowed to cool to room temperature. An additional 12.2 gm of distillate was recovered and 131.1 gm of a solid product was recovered. The sample was measured for LRV, as described above, and was found to have a LRV of 9.37. The sample was calculated to have an IV of 0.42 dL/g. The sample underwent DSC analysis. A broad crystalline $T_m$ was observed at 124.5° C. (11.5 J/g).

Example 28

To a 250 mL glass flask was added dimethyl terephthalate, (87.39 gm), isophthalic acid, (6.65 gm), lactic acid, (85 wt. % aqueous solution, 52.99 gm), dimethyl 5-sulfoisophthalate, sodium salt, (2.96 gm), 1,3-propanediol, (60.88 gm), poly(1,3-trimethylene glycol), (7.32 gm), sodium acetate, (0.20 gm), titanium(IV) isopropoxide, (0.0895 gm), and silica, (1.48 gm). The reaction mixture was stirred and heated to 180° C. under a slow nitrogen purge. After achieving 180° C., the reaction mixture was stirred at 180° C. for 0.6 hrs under a slow nitrogen purge. The reaction mixture was then heated to 190° C. over 0.3 hrs with stirring. After achieving 190° C., the reaction mixture was stirred at 190° C. for 0.5 hrs under a slow nitrogen purge. The reaction mixture was then heated to 200° C. over 0.2 hrs with stirring under a slight nitrogen purge. The reaction mixture was stirred at 200° C. for 0.5 hrs under a slight nitrogen purge. The reaction mixture was then heated to 255° C. over 1.0 hr with stirring under a slight nitrogen purge. The reaction mixture was stirred at 255° C. for 0.6 hrs under a slight nitrogen purge. 46.9 gm of a colorless distillate was collected over this heating cycle. The reaction mixture was then staged to full vacuum with stirring at 255° C. The resulting reaction mixture was stirred for 3.6 hrs under full vacuum (pressure less than 100 mtorr). The vacuum was then released with nitrogen and the reaction mass allowed to cool to room temperature. An additional 37.7 gm of distillate was recovered and 106.9 gm of a solid product was recovered. The sample was measured for LRV, as described above, and was found to have a LRV of 15.07. This sample was calculated to have an IV of 0.52 dL/g. The sample underwent DSC analysis. A $T_g$ was not observed. A $T_{cryst}$ was observed at 79.1° C. (29.1). A broad crystalline $T_m$ was observed at 177.7° C. (31.5 J/g).

Example 29

To a 250 mL glass flask was added poly(1,4-butylene terephthalate), (63.80 gm), dimethyl 5-sulfoisophthalate, sodium salt, (2.96 gm), 1,4-butanediol, (4.51 gm), and poly(tetramethylene glycol), (avg. MW of 2000, 76.20 gm). The reaction mixture was stirred and heated to 255° C. under a slow nitrogen purge. After achieving 255° C., poly(lactide) (from Cargill-Dow, 14.42 gm) was added to the homogeneous reaction mixture and the resulting mixture was stirred at 255° C. for 1.4 hrs under a slow nitrogen purge. 0.1 gm of a colorless distillate was collected over this heating cycle. The homogeneous reaction mixture was then staged to full vacuum with stirring at 255° C. The resulting reaction mixture was stirred for 4.2 hrs under full vacuum (pressure less than 100 mtorr). The vacuum was then released with nitrogen and the reaction mass allowed to cool to room temperature. An additional 1.1 gm of distillate was recovered and 117.2 gm of a solid product was recovered. The sample was measured for LRV, as described above, and was found to have a LRV of 20.28. The sample was calculated to have an IV of 0.62 dL/g. The sample underwent DSC analysis. A broad crystalline $T_m$ was observed at 181.2° C. (13.8 J/g).

Example 30

To a 250 mL glass flask was added dimethyl terephthalate, (90.88 gm), lactic acid, (85 wt. % aqueous solution, 6.36 gm), glycolic acid, (4.56 gm), dimethyl 5-sulfoisophthalate, sodium salt, (3.55 gm), 1,4-butanediol, (86.52 gm), poly(tetramethylene glycol), (avg. MW of 2000, 21.2 gm), and titanium(IV) isopropoxide, (0.1390 gm). The reaction mixture was heated to 180° C. under a slight nitrogen purge. After achieving 180° C., the reaction mixture was stirred at 180° C. under a slight nitrogen purge for 0.6 hrs. The reaction mixture was then heated to 190° C. with stirring under a slight nitrogen purge over 0.3 hrs. After achieving 190° C., the reaction mixture was stirred at 190° C. with stirring under a slight nitrogen purge for 0.6 hrs. The reaction mixture was then heated to 200° C. with stirring under a slight nitrogen purge over 0.2 hrs. The resulting reaction mixture was then stirred at 200° C. under a slight nitrogen purge for 0.5 hrs. The reaction mixture was then stirred and heated to 255° C. under a slow nitrogen purge over 1.1 hrs. After achieving 255° C., the resulting reaction mixture was stirred at 255° C. for 0.5 hrs under a slow nitrogen purge. 58.2 gm of a colorless distillate was collected over this heating cycle. The reaction mixture was then staged to full vacuum with stirring at 255° C. The resulting reaction mixture was stirred for 1.7 hrs under full vacuum (pressure less than 100 mtorr). The vacuum was then released with nitrogen and the reaction mass allowed to cool to room temperature. An additional 4.6 gm of distillate was recovered and 104.4 gm of a solid product was recovered. The sample was measured for LRV as described above and was found to have a LRV of 19.97. This sample was calculated to have an IV of 0.61 dL/g. The sample underwent DSC analysis. A broad crystalline $T_m$ was observed at 195.4° C. (39.2 J/g).

Example 31

To a 250 mL glass flask was added dimethyl terephthalate, (53.60 gm), methyl (S)-(–)-lactate, (31.23 gm), dimethyl 5-sulfoisophthalate, sodium salt, (7.11 gm), 1,4-butanediol, (86.52 gm), poly(tetramethylene glycol), (avg. MW of 1000, 30.02 grams), pentaerythritol, (0.045 gm), sodium acetate, (0.13 gm), and titanium(IV) isopropoxide, (0.1110 gm). The reaction mixture was heated to 180° C. under a slight nitrogen purge. After achieving 180° C., the reaction mixture was stirred at 180° C. under a slight nitrogen purge for 0.5 hrs. The reaction mixture was then heated to 190° C. with stirring under a slight nitrogen purge over 0.4 hrs. After achieving 190° C., the reaction mixture was stirred at 190° C. with stirring under a slight nitrogen purge for 0.6 hrs. The reaction mixture was then heated to 200° C. with stirring under a slight nitrogen purge over 0.2 hrs. The resulting reaction mixture was then stirred at 200° C. under a slight nitrogen purge for 0.5 hrs. The reaction mixture was then stirred and heated to 255° C. under a slow nitrogen purge over 1.5 hrs. After achieving 255° C., the resulting reaction mixture was stirred at 255° C. for 0.6 hrs under a slow nitrogen purge. 58.6 gm of a colorless distillate was collected over this heating cycle. The reaction mixture was then staged to full vacuum with stirring at 255° C. The resulting reaction mixture was stirred for 3.4 hrs under full vacuum (pressure less than 100 mtorr). The vacuum was then released with nitrogen and the reaction mass allowed to cool to room temperature. An additional 8.3 gm of distillate was recovered and 79.4 gm of a solid product was recovered. The sample was measured for LRV, as described above, and was found to have a LRV of 5.48. The sample was calculated to have an IV of 0.34 dL/g. The sample underwent DSC analysis. A broad crystalline $T_m$ was observed at 125.2° C. (18.9 J/g).

Example 32

The material that is produced similarly to the Example 17 material, except at a larger scale, is dried in a hopper dryer for 8 hrs at 70° C. to a –40° C. dew point. The material is then fed at a rate of 20 lbs/hr into the feed section of a 1½-inch diameter single screw Davis Standard extruder (screw L/D of 24:1, Model No. DS-15H). The extruder conditions and temperature profile are noted below. The molten polymer is then fed into a Killion 3 roll stack sheet line with the conditions and temperature profile noted below.

Extruder Zone 1 temperature, (feed section): 410° F.
Extruder Zone 2 temperature: 430° F.
Extruder Zone 3 temperature: 460° F.
Extruder Zone 4 (front) temperature: 460° F.
Flange: 460° F.
Pipe: 460° F.
Flange: 460° F.
Die temperature: 460° F.
Die Lips: 460° F.
Melt Temperature: 460° F.
Extruder Amps: 5
Extruder RPM: 50
Chill Roll Top temperature: 70° F.
Chill Roll Middle temperature: 70° F.
Chill Roll Bottom temperature: 70° F.
Film Take Off Speed: 235 inches/minute A film 8 inches wide with a thickness of 0.003 inches (3 mils) is produced.

The film is tested as a fast food sandwich wrap packaging and would be found to have excellent deadfold performance.

Example 33

2 inch squares of the film that is produced in Example 32 is preheated to 80° C. for 4 minutes, (being careful not to allow the hot air to impinge directly onto the film so as to avoid hot spots), and biaxially oriented on a tenter frame T. M. Long Biaxial stretcher. The draw ratio of the stretcher is set at 3×3 and the stretching rate is 5 inches/second (12.7 cm/second). The biaxially stretched film is found to have at least a 10% greater tensile strength in both the machine direction (MD) and transverse direction (TD) than is found for the undrawn film.

The biaxially stretched film is tested as a fast food sandwich wrap packaging and would be found to have excellent deadfold performance.

Examples 34–56 and Comparative Example CE 10

The polymers that are prepared similarly to the Example and Comparative Example polymers noted below in Table 1, except at a larger scale, are dried in a hopper dryer for 8 hrs at 60° C. to a −40° C. dew point. The materials are placed in the hopper of a single screw volumetric feeder (K-tron Model No. 7) and free fall to the inlet of a 28 mm Werner and Pfleider twin screw extruder with a vacuum port that is maintained at house vacuum and is attached to a 10 inch wide film die with about a 0.010 inch gap. A dry nitrogen purge is maintained in the feed hopper and the feed throat of the extruder. The extruder is operated at a 150 RPM screw speed with the heater profile noted in Table 1.

The films of Examples 34–56 are tested for physical properties and would be found to have an excellent combination of toughness, as measured by Elmendorf Tear, Graves Tear; and percent elongation at break and strength, as measured by tensile strength at break and tensile modulus.

10 inch×16 inch rectangles are cut out of the film of Examples 34–56, and Comparative Example CE 10 and the size accurately measured. The film rectangles are placed in a Fisher Scientific Isotemp Incubator, Model No. 625D, and heated to 60° C. for 1 hr. The film rectangles are then accurately remeasured. Example 40 would be found to have at least 10% less shrinkage than would be found for Comparative Example CE 10.

Pieces of the films of Examples 34–56 (8-inch×8-inch squares) are placed in a rotary composter with about 0.5 cubic yards squared of mixed municipal solid waste (from which glass, cans, and much of the light plastic and paper is removed) and sewage sludge in the ratio of about 2:1. The composter is rotated once a week and the temperature and moisture content is monitored. The films would be found to disintegrate.

TABLE 1

| | | Extruder Heater Profile | | | | | | |
|---|---|---|---|---|---|---|---|---|
| Example | Polymer Example | Zone 1 (° C.) | Zone 2 (° C.) | Zone 3 (° C.) | Zone 4 (° C.) | Zone 5 (° C.) | Die (° C.) | Melt (° C.) |
| 34 | 1 | 220 | 240 | 250 | 250 | 250 | 255 | 250 |
| 35 | 2 | 210 | 225 | 240 | 240 | 240 | 245 | 240 |
| 36 | 3 | 225 | 235 | 245 | 245 | 245 | 250 | 245 |
| 37 | 5 | 220 | 235 | 250 | 250 | 250 | 255 | 250 |
| 38 | 6 | 210 | 235 | 240 | 240 | 240 | 245 | 240 |
| 39 | 7 | 210 | 240 | 240 | 240 | 240 | 245 | 240 |
| CE 10 | CE 8 | 150 | 170 | 180 | 180 | 180 | 185 | 180 |
| 40 | 11 | 210 | 230 | 235 | 235 | 235 | 240 | 235 |
| 41 | 14 | 200 | 220 | 235 | 235 | 235 | 240 | 235 |
| 42 | 15 | 210 | 230 | 240 | 240 | 240 | 245 | 240 |
| 43 | 16 | 210 | 230 | 240 | 240 | 240 | 245 | 240 |
| 44 | 19 | 230 | 245 | 255 | 255 | 255 | 260 | 250 |
| 45 | 20 | 210 | 225 | 235 | 235 | 235 | 240 | 240 |
| 46 | 21 | 230 | 245 | 260 | 260 | 260 | 265 | 260 |
| 47 | 22 | 230 | 250 | 255 | 255 | 255 | 260 | 255 |
| 48 | 23 | 205 | 225 | 230 | 230 | 230 | 235 | 230 |
| 49 | 24 | 210 | 225 | 235 | 235 | 235 | 240 | 235 |
| 50 | 25 | 200 | 215 | 230 | 230 | 230 | 235 | 230 |
| 51 | 26 | 210 | 225 | 240 | 240 | 240 | 245 | 240 |
| 52 | 27 | 115 | 135 | 145 | 145 | 145 | 150 | 145 |
| 53 | 28 | 170 | 185 | 200 | 200 | 200 | 205 | 200 |
| 54 | 29 | 170 | 190 | 200 | 200 | 200 | 205 | 200 |
| 55 | 30 | 185 | 200 | 215 | 215 | 215 | 220 | 215 |
| 56 | 31 | 115 | 130 | 140 | 140 | 140 | 145 | 140 |

The extruded polymer films are electrostatically pinned on a 12 inch diameter smooth quench drum maintained at a temperature of 26° C. with cold water and collected on release paper using a standard tension roll. The quench drum speed is adjusted from 5 to 15 ft/minute to obtain film samples with a thickness of about 8 mils to about 1.5 mils.

Comparative Example CE 10 would be found to have a lower yield of film than would be found for Example 40 due to film blocking.

The films of Examples 34–56 are tested as fast food sandwich wraps and would be found to have excellent deadfold performance.

Example 57

The polymer that is prepared similarly to the Example 18 polymer, except at a larger scale, is dried in a hopper dryer for 8 hrs at 80° C. to a −40° C. dew point. The polymer is placed in the hopper of a single screw volumetric feeder (K-tron Model No. 7) and free falls to the inlet of a 28 mm Werner and Pfleider twin screw extruder with a vacuum port that is maintained at house vacuum attached to a 10 inch wide film die with about a 0.010 inch gap. A dry nitrogen purge is maintained in the feed hopper and the feed throat of the extruder. The extruder is operated at a 150 RPM screw speed with a heater profile of

| Zone 1 (° C.) | Zone 2 (° C.) | Zone 3 (° C.) | Zone 4 (° C.) | Zone 5 (° C.) | Die (° C.) | Melt (° C.) |
|---|---|---|---|---|---|---|
| 205 | 220 | 235 | 235 | 235 | 240 | 235 |

The extruded polymer film is electrostatically pinned on a 12 inch diameter smooth quench drum maintained at a temperature of 26° C. with cold water and is collected on release paper using a standard tension roll. The quench drum speed is adjusted from 5 to 15 ft/minute to obtain film samples with a thickness of about 8 mils to about 1.5 mils.

The film is tested as fast food sandwich wraps and would be found to have excellent deadfold performance.

Examples 58–76 and Comparative Example CE 11

The films that are produced in the Examples listed below in Table 2 have a thickness of between about 1.5 mils to 8 mils, and are sent through a Machine Direction Orienter (MDO) Model No. 7200 from the Marshall and Williams Company of Providence, R.I. The MDO unit is preheated to the temperature listed in Table 2 below, and the film is stretched as noted below in Table 2 while at that temperature. For example, "Stretched 3X" means that a 1 meter long film is stretched to a resultant length of 3 meters.

TABLE 2

| Example | Cast Film Example | MDO Temperature (° C.) | MDO Stretch |
|---|---|---|---|
| 58 | 35 | 50 | 3X |
| 59 | 36 | 45 | 3X |
| 60 | 37 | 50 | 3X |
| 61 | 38 | 50 | 3X |
| 62 | 39 | 60 | 4X |
| CE 11 | CE 10 | 40 | 3X |
| 63 | 40 | 40 | 3X |
| 64 | 43 | 50 | 3.5X |
| 65 | 44 | 60 | 3X |
| 66 | 45 | 50 | 3X |
| 67 | 46 | 55 | 4X |
| 68 | 47 | 50 | 3.5X |
| 69 | 48 | 45 | 4.5X |
| 70 | 50 | 55 | 4X |
| 71 | 51 | 60 | 4X |
| 72 | 52 | 55 | 4X |
| 73 | 53 | 50 | 3.5X |
| 74 | 54 | 55 | 4X |
| 75 | 55 | 50 | 3.5X |
| 76 | 56 | 45 | 3.5X |

Comparative Example CE 11 would be found to have a lower yield of film than would be found for Example 63 due to film blocking.

The uniaxially stretched films of Examples 58–76 would have at least a 10% greater tensile strength in the machine direction (MD) than would be found for the corresponding undrawn films.

The uniaxially stretched films of Examples 58–76 are tested as a fast food sandwich wrap packaging and would be found to have excellent deadfold performance.

10 inch×16 inch rectangles are cut out of the film of Examples 58–76 and Comparative Examples CE 11 and the size accurately measured. The film rectangles are placed in a Fisher Scientific Isotemp Incubator, Model No. 625D and heated to 60° C. for 1 hr. The film rectangles are then accurately remeasured. Example 63 would be found to have at least 10% less shrinkage than would be found for Comparative Example CE 11.

Examples 77–84

2 inch squares of the films that are produced above and detailed in Table 3 below are preheated to the temperature noted in Table 3 below for 4 minutes, being careful not to allow the hot air to impinge directly on the film so as to avoid hot spots. The films are biaxially oriented on a tenter frame T. M. Long Biaxial stretcher. The draw ratio of the stretcher is set at 3×3 and the stretching rate is 5 inches/second (12.7 cm/second).

TABLE 3

| Example | Cast Film Example | Biaxial Stretch Temp. (° C.) |
|---|---|---|
| 77 | 36 | 60 |
| 78 | 40 | 65 |
| 79 | 46 | 55 |
| 80 | 47 | 70 |
| 81 | 49 | 60 |
| 82 | 51 | 50 |
| 83 | 54 | 50 |
| 84 | 55 | 55 |

The biaxially stretched films of Examples 77–84 would have at least a 10% greater tensile strength in both the MD and the transverse direction (TD) than would be found for the corresponding undrawn cast film.

The biaxially stretched films of Examples 77–84 are tested as a fast food sandwich wrap packaging and would be found to have excellent deadfold performance.

Examples 85–89

The polymer that is prepared similarly to the Example 8 polymer, except at a larger scale, is dried in a hopper dryer for 8 hours at 80° C. to a −40° C. dew point. The material is powder blended with 0.10 wt. % Irganox-1010 (a hindered phenolic antioxidant from the Ciba Company) based on polymer weight. The material is placed in the hopper of a single screw volumetric feeder (K-tron Model No. 7) and free falls to the inlet of a 28 mm Werner and Pfleider twin screw extruder with a vacuum port maintained at house vacuum attached to a 10 inch wide film die with about a 0.010 inch gap. A dry nitrogen purge is maintained in the feed hopper and the feed throat of the extruder. The extruder is operated at a 150 RPM screw speed with a heater profile of

| Zone 1 (° C.) | Zone 2 (° C.) | Zone 3 (° C.) | Zone 4 (° C.) | Zone 5 (° C.) | Die (° C.) |
|---|---|---|---|---|---|
| 200 | 230 | 240 | 240 | 240 | 245 |

A plasticizer, acetyl tri-n-butyl citrate from Morflex, Inc., is injected into zone 2 at a rate that provides the compositions listed below in Table 4 with an Accurate feeder. The plasticizer level shown in Table 4 is based on the weight of the total composition.

TABLE 4

| Example | Plasticizer Level (wt. %) |
|---|---|
| 85 | 0 |
| 86 | 5 |
| 87 | 10 |
| 88 | 15 |
| 89 | 20 |

The extruded polymer film is electrostatically pinned on a 12 inch diameter smooth quench drum that is maintained at a temperature of 26° C. with cold water, and is collected on release paper using a standard tension roll. The quench drum speed is adjusted from 5 to 15 ft/minute to obtain film samples with a thickness of about 8 mils to about 1.5 mils.

The films of Examples 85–89 are tested as fast food sandwich wrap packaging and would be found to have excellent deadfold performance.

Examples 90–95

The polymer that is prepared similarly to the Example 29 polymer, except at a larger scale, is dried overnight in a large tray dryer at 60° C. with hot dry air recirculation to a moisture content of less than 0.04%. Corn starch (Corn Products 3005 from CPC International, Inc.), and rice starch (Sigma Chemicals catalog number S7260) are dried in a large tray vacuum oven at 90° C. and less than 1 mm Hg vacuum to a moisture content of less than 1% and would be stored in sealed containers until they are used. Polyethylene adipate (Rucoflex® S-101-55, nominal MW of 2000, from the Ruco Polymer Corporation) is used directly as received without pretreatment.

Blends of the polymer and starch are made by manually tumbling the materials in plastic bags. The dry starch is added to the warm polymer from the dryer, and the still warm mixture would be fed to the extruder. When polyethylene adipate (Rucoflex®) is used, the Rucoflex® is melted and liquid injected into the second heater zone of the extruder through a metering pump. The final compositions listed in Table 5, below, are prepared.

TABLE 5

| Example | Polymer (wt. %) | Cornstarch (wt. %) | rice starch (wt. %) | Rucoflex® (wt. %) |
|---|---|---|---|---|
| 90 | 80 | 20 | | |
| 91 | 60 | 40 | | |
| 92 | 55 | 40 | | 5 |
| 93 | 45 | 35 | | 20 |
| 94 | 60 | | 40 | |
| 95 | 45 | | 35 | 20 |

The blends are placed in the feed hopper, (with a nitrogen purge), of a Ktron twin screw feeder (Model No. T-35 with 190 6300 controller), and are metered to a Werner and Pfleider ZSK 30 mm twin screw extruder. This extruder would have an L/D of 30/1 with a vacuum port and a mild mixing screw. The temperature of the extruder barrel is electrically heated from 170° C. at the feed end of the extruder to 200° C. at the discharge. The extruder is operated at 150 RPM, and the vacuum port is connected to house vacuum and permitted to fluctuate with process conditions. A single hole die, (⅛-inch diameter), is used for discharge. The resulting strand is quenched in a 6 foot long water trough, dewatered with an air knife and cut into pellets with a Conair cutter (Model No. 304). The specific operating conditions for the individual compositions would be as listed below in Table 6.

TABLE 6

| Example | Feed Rate (pph) | Screw Torque (% max.) | Die Pressure (psig) | Melt Temp. (° C.) | Vacuum (Inches Hg) |
|---|---|---|---|---|---|
| 90 | 34 | 58 | 800 | 190 | 13 |
| 91 | 32 | 60 | 800 | 210 | 13 |
| 92 | 31 | 50 | 750 | 205 | 12 |
| 93 | 32 | 35 | 600 | 185 | 12 |
| 94 | 33 | 60 | 800 | 210 | 13 |
| 95 | 32 | 35 | 600 | 185 | 13 |

Examples 96–101

The polymer-starch blends that are prepared in Examples 90–95 are dried in a hopper dryer for 8 hrs at 60° C. to a −40° C. dew point. The materials are placed in the hopper of a single screw volumetric feeder (K-tron Model No. 7) and free fall to the inlet of a 28 mm Werner and Pfleider twin screw extruder with a vacuum port maintained at house vacuum attached to a 10 inch wide film die with about a 0.010 inch gap. A dry nitrogen purge is maintained in the feed hopper and the feed throat of the extruder. The extruder is operated at a 150 RPM screw speed with a heater profile of

| Zone 1 (° C.) | Zone 2 (° C.) | Zone 3 (° C.) | Zone 4 (° C.) | Zone 5 (° C.) | Die (° C.) | Melt (° C.) |
|---|---|---|---|---|---|---|
| 165 | 175 | 195 | 195 | 195 | 200 | 200 |

The extruded polymer films are electrostatically pinned on a 12 inch diameter smooth quench drum that is maintained at a temperature of 26° C. with cold water, and are collected on release paper using a standard tension roll. The quench drum speed is adjusted from 5 to 15 ft/min. to obtain film samples with a thickness of about 8 mils to about 1.5 mils.

TABLE 7

| Example | Blend Example |
|---|---|
| 96 | 90 |
| 97 | 91 |
| 98 | 92 |
| 99 | 93 |
| 100 | 94 |
| 101 | 95 |

The films of Examples 96–101 are tested as fast food sandwich packaging and would be found to have excellent deadfold performance.

Examples 102–108

The polymer that is prepared similarly to the Example 4 polymer, except at a larger scale, is dried overnight in a large tray dryer at 60° C. with hot dry air recirculation to a moisture content of less than 0.04%. Talc (from Luzenac, located in Englewood, Colo., having a particle size of 3.8 microns), titanium dioxide, (supplied by Kerr-McGee Chemical, LLC, located in Oklahoma City, Okla., grade Tronox® 470, having a particle size of 0.17 micron), and calcium carbonate (from ECCA Calcium Products, Inc., of Sylacauga, Ala., ECC Supercoat® grade with an 1 micron average particle size) are dried in a large tray vacuum oven at 90° C. and less than 1 mm Hg vacuum to a moisture content of less than 1%, and would be stored in sealed containers until used.

Blends of the polymer and the inorganic fillers are made by manually tumbling the materials in plastic bags. The dry inorganic fillers are added to the warm polymer from the dryer, and the still warm mixture is fed to the extruder. The final compositions that are prepared are listed in Table 8 below.

TABLE 8

| Example | Polymer (wt. %) | Talc (wt. %) | Titanium dioxide (wt. %) | Calcium carbonate (wt. %) |
|---|---|---|---|---|
| 102 | 85 | 2.5 | 5 | 7.5 |
| 103 | 70 | 5 | 5 | 20 |
| 104 | 70 | 5 | 10 | 15 |
| 105 | 30 | 10 | 15 | 45 |
| 106 | 95 | 5 | | |
| 107 | 95 | | 5 | |
| 108 | 70 | | | 30 |

The blends are placed in the feed hopper (with a nitrogen purge) of a Ktron twin screw feeder (Model No. T-35 with 190 6300 controller), and are metered to a Werner and Pfleider ZSK 30 mm twin screw extruder. The extruder has an L/D of 30/1 with a vacuum port and a hard mixing screw. The temperature of the extruder barrel is electrically heated from 220° C. at the feed end of the extruder to 250° C. at the discharge. The extruder is operated at 150 RPM, and the vacuum port is connected to house vacuum and permitted to fluctuate with process conditions. A single hole die (⅛-inch diameter) is used for discharge. The resulting strand is quenched in a 6 ft. long water trough, dewatered with an air knife, and cut into pellets with a Conair cutter (Model No. 304). The specific operating conditions for the individual compositions would be as listed below in Table 9.

TABLE 9

| Example Number | Feed Rate (pph) | Screw Torque (% max.) | Die Pressure (psig) | Melt Temp. (° C.) | Vacuum (Inches Hg) |
|---|---|---|---|---|---|
| 102 | 34 | 58 | 800 | 235 | 13 |
| 103 | 30 | 70 | 800 | 245 | 13 |
| 104 | 31 | 70 | 800 | 245 | 12 |
| 105 | 32 | 80 | 800 | 255 | 12 |
| 106 | 33 | 50 | 600 | 235 | 13 |
| 107 | 32 | 50 | 600 | 235 | 13 |
| 108 | 30 | 70 | 800 | 245 | 12 |

Examples 109–115

The polymer-inorganic filler blends that are prepared above in Examples 102–108 and a polymer that is prepared similarly to the Example 4 polymer, except at a larger scale, are dried in a hopper dryer for 8 hrs at 60° C. to a −40° C. dew point. The materials are placed in the hopper of a single screw volumetric feeder (K-tron Model No. 7) and free fall to the inlet of a 28 mm Werner and Pfleider twin screw extruder with a vacuum port that is maintained at house vacuum and is attached to a 10 inch wide film die with about a 0.010 inch gap. Example 103 is composed of a tumbled blend of 50 wt. % Example 7 and 50 wt. % Example 96. A dry nitrogen purge is maintained in the feed hopper and the feed throat of the extruder. The extruder is operated at a 150 RPM screw speed with a heater profile of

| Zone 1 (° C.) | Zone 2 (° C.) | Zone 3 (° C.) | Zone 4 (° C.) | Zone 5 (° C.) | Die (° C.) | Melt (° C.) |
|---|---|---|---|---|---|---|
| 220 | 235 | 250 | 250 | 250 | 255 | 250 |

The extruded polymer films are electrostatically pinned on a 12 inch diameter smooth quench drum that is maintained at a temperature of 26° C. with cold water, and is collected on release paper using a standard tension roll. The quench drum speed is adjusted from 5 to 15 ft/minute to obtain film samples with a thickness of about 8 mils to about 1.5 mils.

TABLE 10

| Example | Blend Example |
|---|---|
| 109 | 102 |
| 110 | 103 |
| 111 | 104 |
| 112 | 50 wt. % Ex. 105, 50 wt. % Ex. 4 |
| 113 | 106 |
| 114 | 107 |
| 115 | 108 |

The films of Examples 109–115 are tested as fast food sandwich packaging and would be found to have excellent deadfold performance. The films would also be found to resemble paper, both in feel and appearance.

Examples 116–121

Polymers that are prepared similarly to the polymers of the Examples noted below in Table 11, except at a larger scale, are dried overnight at 60° C. in a dehumidified air dryer. The dried polymers are fed to a laboratory scale blown film line that consists of a Killion 1.25 inch diameter extruder with a 15:1 gear reducer. The extruder heater zones are set around the temperatures noted below in Table 11. The screw is a Maddock mixing type with a L/D of 24 to 1. The compression ratio for the mixing screw is 3.5:1. The screw speed is 25 to 30 RPM. A 1.21 inch diameter die with a 25 mil die gap is used. The air ring is a Killion single-lip No. 2 type. Blowing conditions are characterized by the blow up ratio (BUR), which is the ratio of the bubble diameter to die the die diameter, which gives an indication of hoop or TD stretch, or the draw-down ratio (DDR), which is an indication of the axial or MD stretch. The greater the level of stretch, the greater the level of orientation embued in the film.

TABLE 11

| Example Number | Polymer Example Number | Extruder Heater Zones (° C.) | Film Thickness (mils) | BUR | DDR |
|---|---|---|---|---|---|
| 116 | 11 | 240 | 2.5 | 3.2 | 3.9 |
| 117 | 19 | 265 | 2.0 | 2.6 | 4.6 |

TABLE 11-continued

| Example Number | Polymer Example Number | Extruder Heater Zones (° C.) | Film Thickness (mils) | BUR | DDR |
|---|---|---|---|---|---|
| 118 | 24 | 240 | 1.2 | 3.1 | 8.0 |
| 119 | 28 | 200 | 2.0 | 2.5 | 5.0 |
| 120 | 29 | 200 | 1.5 | 3.0 | 7.0 |
| 121 | 30 | 210 | 2.3 | 2.0 | 2.0 |

The tubular films are slit and tested as fast food sandwich packaging and would be found to have excellent deadfold performance.

Examples 122–124

Layer films are produced on a 10 inch two layer Streamlined Coextrusion Die (SCD) blown film die manufactured by Brampton Engineering. Layer configuration of the die is as follows from outside to inside layers of the die, A/B. Two 3½ inch David Standard extruders are fed the A and B layers. The process line further utilizes a Brampton Engineering rotating air ring for polymer cooling. Layer A contains a polymer that is prepared similarly to the Example 25 polymer, except at a larger scale. Layer B contains a polymer that is prepared similarly to the Example 29 polymer, except at a larger scale. Both polymers are dried in a dehumidified dryer at 60° C. The operation is tailored to provide films having layer ratios as noted below in Table 12. The thickness of the film is about 2.25 mil (0.00225 inch). The processing conditions for the films are provided in Table 13 below.

TABLE 12

| Example | Layer A (wt. %) | Layer B (wt. %) |
|---|---|---|
| 122 | 25 | 75 |
| 123 | 50 | 50 |
| 124 | 75 | 25 |

TABLE 13

| | Extruder A | Extruder B |
|---|---|---|
| Zone 1 | 195° C. | 170° C. |
| Zone 2 | 220° C. | 180° C. |
| Zone 3 | 230° C. | 195° C. |
| Zone 4 | 230° C. | 195° C. |
| Zone 5 | 235° C. | 200° C. |
| Screen Changer | 230° C. | 195° C. |
| Adapter 1 | 230° C. | 195° C. |
| Adapter 2 | 230° C. | 195° C. |
| Adapter 4 | 230° C. | 195° C. |
| Die 1 | 230° C. | 230° C. |
| Die 2 | 230° C. | 230° C. |
| Die 3 | 230° C. | 230° C. |
| Line Speed | 122 ft/minute | |
| Notes | 25 | 29 |

The multilayer films that are prepared are converted into bags using an inline bag machine manufactured by Battenfeld Gloucester Engineering Co., Inc. downstream from the extrusion line nips.

The slit films are tested as fast food sandwich wraps and would be found to have excellent deadfold performance.

Examples 125–127

Bilayer films are produced on a 10 inch two layer SCD blown film die manufactured by Brampton Engineering. Layer configuration of the die is as follows from outside to inside layers of the die, A/B. Two 3½ inch David Standard extruders are fed the A and B layers. The process line further utilizes a Brampton Engineering rotating air ring for polymer cooling. Layer A contains the plasticized starch filled polymer that is prepared similarly to the Example 93 polymer. Layer B contains a polymer that is prepared similarly to the Example 15 polymer, except at a larger scale. Both polymers are dried in a dehumidified dryer at 60° C. The operation is tailored to provide films having the layer ratios noted below in Table 14. The thickness of the film is about 2.25 mil (0.00225 inch). The processing conditions for the films are provided in Table 15 below.

TABLE 14

| Example | Layer A (wt. %) | Layer B (wt. %) |
|---|---|---|
| 125 | 25 | 75 |
| 126 | 50 | 50 |
| 127 | 75 | 25 |

TABLE 15

| | Extruder A | Extruder B |
|---|---|---|
| Zone 1 | 170° C. | 220° C. |
| Zone 2 | 190° C. | 230° C. |
| Zone 3 | 200° C. | 240° C. |
| Zone 4 | 200° C. | 240° C. |
| Zone 5 | 205° C. | 245° C. |
| Screen Changer | 200° C. | 240° C. |
| Adapter 1 | 200° C. | 240° C. |
| Adapter 2 | 200° C. | 240° C. |
| Adapter 4 | 200° C. | 240° C. |
| Die 1 | 240° C. | 240° C. |
| Die 2 | 240° C. | 240° C. |
| Die 3 | 240° C. | 240° C. |
| Line Speed | 122 ft/min. | |
| Notes | 93 | 15 |

The multilayer films that are prepared above are converted into bags using an inline bag machine manufactured by Battenfeld Gloucester Engineering Co., Inc. downstream from the extrusion line nips.

The slit films are tested as fast food sandwich wraps and would be found to have excellent deadfold performance.

Examples 128–130

Bilayer films are produced on a 10 inch two layer SCD blown film die manufactured by Brampton Engineering. Layer configuration of the die is as follows from outside to inside layers of the die, A/B. Two 3½ inch David Standard extruders are fed the A and B layers. The process line further utilizes a Brampton Engineering rotating air ring for polymer cooling. Layer A contains a polymer blend that is prepared similarly to the Example 21 polymer, except at a larger scale. Layer B contains Eastar® Bio, from the Eastman Chemical Company and as described above. Both polymers are dried in a dehumidified dryer at 60° C. The operation is tailored to provide films having layer ratios as noted below in Table 16. The thickness of the film is about 2.25 mil (0.00225 inch). The processing conditions for the films are provided in Table 17 below.

TABLE 16

| Example | Layer A (wt. %) | Layer B (wt. %) |
|---|---|---|
| 128 | 25 | 75 |
| 129 | 50 | 50 |
| 130 | 75 | 25 |

TABLE 17

| | Extruder A | Extruder B |
|---|---|---|
| Zone 1 | 230° C. | 100° C. |
| Zone 2 | 250° C. | 115° C. |
| Zone 3 | 260° C. | 130° C. |
| Zone 4 | 260° C. | 130° C. |
| Zone 5 | 265° C. | 135° C. |
| Screen Changer | 260° C. | 130° C. |
| Adapter 1 | 260° C. | 130° C. |
| Adapter 2 | 260° C. | 130° C. |
| Adapter 4 | 260° C. | 130° C. |
| Die 1 | 260° C. | 260° C. |
| Die 2 | 260° C. | 260° C. |
| Die 3 | 260° C. | 260° C. |
| Line Speed | 122 ft/min. | |
| Notes | 21 | Eastar ® Bio |

The multilayer films that are prepared above are converted into bags using an inline bag machine manufactured by Battenfeld Gloucester Engineering Co., Inc. downstream from the extrusion line nips.

The slit films are tested as fast food sandwich wraps and would be found to have excellent deadfold performance.

Examples 131–153 And Comparative Examples CE 12–CE 14

The polyester resins that are prepared similarly to the resins of the Examples and Comparative Example listed below in Table 18, except at a larger scale, are dried in a desiccant air dryer with a dew point of –40° C. overnight at a temperature of 60° C. The polyester resins are extrusion coated onto paperboard stock by feeding the dried pellets into a 2.5 inch commercial extruder having a barrel length to diameter ratio of 28:1. The five zones of the extruder are maintained at the temperature noted below in Table 18. A single flight screw having eight compression flights, four metering flights, a two flight mixing section and six metering flights is used in the extruder. The screw speed is maintained at 180 RPM. The molten polyester resins are passed through three 24×24 mesh screens. The polymers are passed through a center fed die with 0.75 inch lands having a die opening of 36 inches×0.02 inches. The extrusion feed rate is held constant at 460 lbs/hr. The resulting extrudates are passed through a 5 inch air gap into the nip that is formed by a rubber-covered pressure roll and a chill roll. At the same time the 32 inch wide paperboard stock noted below in Table 18 is fed into the nip with the roll in contact with the film. A nip pressure of 100 lbs/linear inch is applied. A 24 inch diameter mirror finished chill roll is maintained at a temperature of 19° C. during the extrusion trials. The coated paperboard is taken off the chill roll at a point 180° from the nip that is formed by the pressure roll and the chill roll. The chill roll is operated at linear speeds of 300 ft/min. At this coating speed, a polyester resin thickness of 1.25 mils would be obtained. The polyester resin thickness could be varied through operational modifications.

TABLE 18

| Example | Polymer Example | Extruder Temperature (° C.) | Paper/Paperboard Stock |
|---|---|---|---|
| 131 | 1 | 250 | 35 pound basis weight natural kraft paper |
| 132 | 8 | 245 | Parchment |
| CE 12 | CE 8 | 180 | Parchment |
| 133 | 11 | 240 | Parchment |
| 134 | 21 | 260 | 25 pound basis weight bleached kraft paper |
| 135 | 26 | 240 | 15 pound basis weight kraft paper |
| 136 | 29 | 200 | 15 pound basis weight kraft paper |
| 137 | 92 | 200 | 18 pound basis weight natural paper |
| 138 | 102 | 250 | 18 pound basis weight bleached paper |
| 139 | 3 | 250 | Trilayered cup paperboard (210 g/m2 weight) |
| CE 13 | CE 8 | 180 | Trilayered cup paperboard (210 g/m2 weight) |
| 140 | 11 | 240 | Trilayered cup paperboard (210 g/m2 weight) |
| 141 | 19 | 260 | Trilayered cup paperboard (210 g/m2 weight) |
| 142 | 23 | 235 | Trilayered cup paperboard (210 g/m2 weight) |
| 143 | 27 | 150 | Trilayered cup paperboard (210 g/m2 weight) |
| 144 | 30 | 215 | Trilayered cup paperboard (210 g/m2 weight) |
| 145 | 93 | 200 | Trilayered cup paperboard (210 g/m2 weight) |
| 146 | 103 | 250 | Trilayered cup paperboard (210 g/m2 weight) |
| 147 | 5 | 250 | 18 point paperboard |
| CE 14 | CE 8 | 180 | 18 point paperboard |
| 148 | 11 | 240 | 18 point paperboard |
| 149 | 20 | 240 | 12 point paperboard |
| 150 | 24 | 240 | 12 point paperboard |
| 151 | 28 | 200 | 12 point paperboard |
| 152 | 95 | 200 | 12 point paperboard |
| 153 | 104 | 250 | 18 point paperboard |

Comparative Example CE 12 would be found to have a lower product yield due to blocking of the laminated substrate as compared to Example 133. Comparative Example CE 13 would be found to have a lower product yield due to blocking of the laminated substrate as compared to Example 140. Comparative Example CE 14 would be found to have a lower product yield due to blocking of the laminated substrate as compared to Example 148.

Examples 131–138 are tested as fast food sandwich wrap packaging and would be found to have excellent deadfold performance.

Examples 131–138 would be formed and heat sealed by conventional processes into the shape of envelopes; and bags, including, for example, waste, trash, leaf, air-sickness, and grocery bags.

Examples 139–146 would be formed by conventional processes into the shape of cups; glasses; bowls; trays; liquid containers and cartons, including, for example, milk, juice, water, wine, yogurt, cream, and soda cartons/containers.

Examples 147–153 would be formed by conventional processes into the shape of trays; boxes; lidded sandwich containers; lidded salad containers; hinged lid sandwich containers; and hinged lid salad containers.

Example 154

The polymer that is prepared similarly to the Example 16 polymer, except at a larger scale, and poly(lactide) (from the Cargill Dow Company) are dried in a hopper dryer overnight at 60° C. to a −40° C. dew point. The polymer and poly(lactide) are coextruded in a weight ratio of 1:3 onto a trilayered paperboard weighing 210 gms/m² with a forward speed of 150 m/min. The melt temperatures of the polymer and the poly(lactide) are 240° C. The coated paperboard that is obtained has a total polymeric coating weight of 19.4 gms/m² in a weight ratio of 75 wt. % of the poly(lactide), which forms the outer layer, and 25 wt. % of the polymer, which forms the inner layer adhering to the paperboard.

The paperboard that is prepared would be formed by conventional processes into the shape of cups; glasses; bowls; trays; liquid containers and cartons, including, for example, milk, juice, water, wine, yogurt, cream, and soda cartons/containers.

Examples 155–160

The calendered paper laminates that are prepared by making an assembly of the film that is produced in the Examples noted below in Table 19 are coated onto release paper, in contact with a similar sized sheet of paper that is to be coated, and then the assembly is pressed through the nip between a heated polished metal top roll and an unheated resilient (silk) roll at a surface speed of 5 yds/min., at a temperature of 200° F. and under a pressure of 10 tons.

Details of the various paper substrates that could be laminated in accordance with the present invention are given in Table 19.

TABLE 19

| Example | Film Example | Paper Substrate | Paper Basis Wt./Thickness (oz/yd²/mils) |
|---|---|---|---|
| 155 | 36 | Towel, (Scott, Viva) | 1.2/6 |
| 156 | 42 | Towel, (G. P., Sparkle) | 1.3/10 |
| 157 | 45 | Toilet Tissue, (Charmin) | 0.9/6 |
| 158 | 54 | Wrapping Tissue, (white) | 0.5/2 |
| 159 | 99 | Newsprint | 1.5/4 |
| 160 | 112 | Kraft, (recycled) | 2.8/6 |

8-inch×8-inch squares of the above laminates are placed in a rotary composter with about 0.5 cubic yards squared of a mix of municipal solid waste (from which glass, cans, and much of the light plastic and paper is removed) and sewage sludge in the ratio of about 2:1. The composter is rotated once a week and the temperature and moisture content is monitored. The laminates of the present invention would be found to rapidly disintegrate.

Example 161

A laminated stock is produced from a combination of a paperboard and a corona-treated polyester film using a combination of two water-based acrylic adhesive formulations. The paperboard base stock is a bleached white paperboard of the type that is typically referred to as a solid bleached sulfate (SBS) paperboard, which is well known as a base stock for food packaging materials. The particular paperboard that is used here is uncoated milk carton stock with a thickness of 0.0235 inch and weighing 282 lbs/3,000 ft². The film is produced as described in Example 44, and is corona discharge treated by conventional means on one side to enhance adhesive bonding. The lamination process is run on a conventional wet-bond laminating machine with adhesive stations for applying adhesive to both the paperboard and the corona-treated side of the film. Adhesive is applied to the paperboard with a 110 line gravure roll applicator delivering about 3 lbs of wet adhesive per 1,000 ft² of paperboard. The adhesive that is applied to the paperboard consists of 200 lbs of Rhoplex® N-1031 acrylic latex from the Rohm & Haas Company and 1.5 ounces of Foamaster NXZ defoamer (predispersed in an equal volume of water) from the Diamond Shamrock Chemical Company. The adhesive that is applied to the corona-treated side of the polyester film consists of 375 lbs of Rhoplex® N-1031 acrylic latex from the Rohm & Haas Company, 11.5 lbs of Cymel® 325 melamine-formaldehyde crosslinking agent, 11.5 lbs of isopropyl alcohol, 23 lbs of water, and 3 ounces of Foamaster NXZ defoamer (predispersed in an equal volume of water) from the Diamond Shamrock Chemicals Company.

The laminating process is run with the paperboard and the film running simultaneously through the respective adhesive application stations, and then the paperboard and the film are both directed into a laminating nip where the two adhesive-coated surfaces are joined with the adhesive still moist on both surfaces. The laminating machine is run at a rate of 300 to 350 ft/min. The laminated stock is run the laminating nip into a hot air oven with an air temperature of 400° F. Residence time for the laminated stock in the oven is about 5 seconds. The laminated stock is then run over a chill roll and rewound into a finished roll.

The laminated stock that is prepared above would be formed by conventional processes into the shape of cups; glasses; bowls; trays; liquid containers and cartons, including, for example, milk, juice, water, wine, yogurt, cream, and soda cartons/containers.

Examples 162–182

These examples are demonstrating how the films of the present invention could be laminated onto preformed substrates. The operation is conducted in a Lab Form Inc. forming machine with a 10×10-inch platen. The preformed substrate is shuttled onto the platen. The film is unrolled, preheated for the time noted below in Table 20 by "Black Box Heating" with infrared type heaters. The preheated film is then positioned over the preformed substrate and pulled down onto the preformed substrate. Examples 162–168 utilize vacuum lamination by drawing a vacuum through the preformed substrate, which, in turn, draws the film onto the contours of the preformed substrate. Examples 169–175 utilize plug assisted vacuum lamination whereby, in addition to the above described vacuum, a plug helps to push the preheated film from the side opposite the preformed substrate to help reduce film thinning in deep draw preformed substrates. Examples 176–182 utilize pressure lamination by applying an air pressure to the preheated film side opposite the preformed substrate, thereby forcing the film into the contours of the preformed substrate. The lamination process typically takes from 5 to 100 seconds, at which time excess film is trimmed off the laminated substrate, and the laminated substrate is ejected and cooled.

The preformed substrates that could be used are as follows: 9-inch molded "pulp plate" that is prepared by conventional processes; formed frozen dinner paperboard "tray" that is prepared by conventional processes; 3.5 inch tall formed paperboard coffee "cup" that is prepared by conventional processes; 3 inch tall and 4 inch in diameter formed paperboard "bowl" that is prepared by conventional processes; 9 inch "foam plate" that is obtained by carefully stripping off the barrier film from commercially available plates that are obtained from the EarthShell Company, (Stock Number PL9V00001); 12 ounce "foam bowl" that is obtained by carefully stripping off the barrier film from commercially available bowls that are obtained from the EarthShell Company, (Stock Number BL12V00001); and hinged-lid salad and sandwich "foam containers" with a double-tab closure mechanism that are obtained by carefully stripping off the barrier film from commercially available containers that are obtained from the EarthShell Company, (Stock Number CLS00001).

TABLE 20

| Example | Film Example | Film Preheat Time (seconds) | Preformed Substrate |
|---------|--------------|------------------------------|---------------------|
| 162 | 34 | 50 | pulp plate |
| 163 | 38 | 45 | tray |
| 164 | 43 | 40 | cup |
| 165 | 46 | 55 | bowl |
| 166 | 49 | 50 | foam plate |
| 167 | 98 | 35 | foam bowl |
| 168 | 109 | 60 | foam containers |
| 169 | 36 | 50 | cup |
| 170 | 39 | 45 | bowl |
| 171 | 44 | 65 | foam bowl |
| 172 | 47 | 60 | foam containers |
| 173 | 54 | 20 | cup |
| 174 | 99 | 40 | bowl |
| 175 | 110 | 60 | pulp plate |
| 176 | 37 | 45 | pulp plate |
| 177 | 40 | 50 | tray |
| 178 | 45 | 55 | cup |
| 179 | 48 | 40 | bowl |
| 180 | 55 | 30 | foam plate |
| 181 | 101 | 40 | foam bowl |
| 182 | 111 | 60 | foam containers |

What is claimed is:

1. An aromatic copolyetherester comprising an acid component, a glycol component, and optionally an effective amount of a color reducing agent, wherein the acid component consists essentially of:
   a. 98.9 to 1.0 mole percent of an aromatic dicarboxylic acid component based on 100 mole percent total acid component,
   b. 1.0 to 99.0 mole percent of a hydroxyalkanoic acid component selected from lactic acid, glycolic acid and mixtures thereof, based on 100 mole percent total acid component,
   c. 0.1 to 10.0 mole percent of a sulfonate component based on 100 mole percent total acid component, and
   d. 0 to 5.0 mole percent of a polyfunctional branching agent selected from polyfunctional acid, glycol, and mixtures thereof based on 100 mole percent total acid component;
   and wherein the glycol component comprises:
   a. about 98.9 to about 1.0 mole percent of a single first glycol component selected from ethylene glycol, 1,3-propanedlol and 1,4-butanediol, based on 100 mole percent total glycol component,
   b. 0.1 to 30.0 mole percent of a poly(alkylene ether) glycol component having a molecular weight in the range of from about 500 to about 4000, based on 100 mole percent total glycol component, and
   c. 0 to about 5.0 mole percent of at least one of an other glycol component based on 100 mole percent total glycol component.

2. The aromatic copolyetherester of claim 1, having an inherent viscosity of at least 0.15, as measured on a 0.5 percent solution of the copolyester in a 50:50 solution of trifluoroacetic acid:dichloromethane solvent system at room temperature.

3. The aromatic copolyetherester of claim 2, wherein the inherent viscosity is at least 0.35 dL/g.

4. The aromatic copolyetherester of claim 1 wherein the other glycol component is selected from the group consisting of ethylene glycol, 1,3-propanediol, 1,6-hexanediol, 1,8-octanedlol, 1,10-decanedlol, 1,12-dodecanediol, 1,14-tetradecanediol, 1,16-hexadecanediol, dimer diol, 4,8-bis(hydroxymethyl)-tricyclo[5.2.1.0/2.6]decane, 1,4-cyclohexanedimethanol, isosorbide, di(ethylene glycol), tri(ethylene glycol), poly(elkylene ether)glycols in the molecular weight range of about 500 to about 4000, and mixtures derived therefrom.

5. The aromatic copolyetherester of claim 1 wherein the aromatic dicarboxylic acid component is selected from the group consisting of terephthalic acid, dimethyl terephthalate, bis(2-hydroxyethyl)terephthalate, bis(3-hydroxypropyl)terephthalate, bis(4-hydroxybutyl)terephthalate, isophthallc acid, dimethyl isophthalate, bis(2-hydroxyethyt)isophthalate, bis(3-hydroxypropyl)isophthalate, bis(4-hydroxybutyl)isophthalate; 2,6-napthalene dicarboxylic acid, dimethyl-2,6-naphthalate, 2,7-naphthalenedicarboxylic acid, dimethyl-2,7-naphthalate, 3,4'-diphenyl ether dicarboxylic acid, dimethyl-3,4'diphenyl ether dicarboxylate, 4,4'-diphenyl ether dicarboxylic acid, dimethyl-4,4'-diphenyl ether dicarboxylate, 3,4'-diphenyl sulfide dicarboxylic acid, dimethyl-3,4'-diphenyl sulfide dicarboxylate, 4,4'-diphenyl sulfide dicarboxylic acid, dimethyl-4,4'-diphenyl sulfide dicarboxylate, 3,4'-diphenyl sulfone dicarboxylic acid, dimethyl-3,4'-diphenyl sulfone dicarboxylate, 4,4'-diphenyl sulfone dicarboxylic acid, dimethyl-4,4'-diphenyl sulfone dicarboxylate, 3,4'-benzophenonedicarboxylate acid, dimethyt-3,4'-benzophenonedicarboxylic, 4,4'-berizophenonedicarboxylic acid, dimethyl-4,4'-benzophenonedicarboxylate, 1,4-naphthalene dicarboxylic acid, dimethyl-1,4-naphthalate, 4,4'-methylene bis(benzoic acid), dimethyl-4,4'-methylenebis(benzoate), and mixtures derived therefrom.

6. The aromatic copolyetherester of claim 1, comprising from about 98.9 to about 30 mole percent of the aromatic dicarboxylic acid component.

7. The aromatic copolyetherester of claim 1, comprising from about 98.9 to about 50 mole percent of the aromatic dicarboxylic acid component.

8. The aromatic oopolyetherester of claim 1, comprising from about 95 to about 50 mole percent of the aromatic dicarboxylic acid component.

9. The aromatic copolyetherester of claim 1, comprising from about 1 to about 70 mole percent of the hydroxyalkanoic acid component.

10. The aromatic copolyotherester of claim 1, comprising from about 1 to about 50 mole percent of the hydroxyalkanoic acid component.

11. The aromatic copolyetherester of claim 1, comprising from about 5 to about 50 mole percent of the hydroxyalkanoic acid component.

12. The aromatic copolyetherester of claim 1, comprising from about 0.1 to about 4 mole percent of the sulfonate component.

13. The aromatic copolyetherester of claim 1, comprising from about 0.1 to about 20 mole percent of the poly(alkylene ether) glycol component.

14. The aromatic copolyetherester of claim 1, comprising from about 0.1 to about 15 mole percent of the poly(alkylene ether) glycol component.

15. The aromatic copolyetherester of claim 1, wherein the branching agent is selected from the group consisting of 1,2,4-benzenetricarboxylic acid; trimethyl-1,2,4-benzenetricarboxylate; tris(2-hydroxyethyl)-1,2,4-benzenetricarboxylate; tris(3-hydroxypropyl)-1,2,4-benzenetricarboxylate; tris (4-hydroxybutyl)-1,2,4-benzenetricarboxylate; 1,2,4-benzenetricarboxylic anhydride; 1,3,5-benzenetricarboxylic acid; 1,2,4,5-benzenetetracarboxylic acid; 1,2,4,5-benzenetetracarboxylic dianhydride; 3,3',4,4'-benzophenonetetracarboxylic dianhydride; 1,4,5,8-Naphthalenetetracarboxylic dianhydride; citric acid; tetrahydrofuran-2,3,4,5-tetracarboxylic acid; 1,3,5-cyolohexanetricarboxylic acid; pentaerythritol; glycerol; 2-(hydroxymethyl)-1,3-propanediol; 2,2-bis(hydnxymethyl)propionic acid; and mixtures derived therefrom.

16. The aromatic copolyotherester of claim 1, comprising from about 0 to about 1.0 mole percent of the polyfunctional branching agent component.

17. The aromatic copolyetherester of claim 2, having an inherent viscosity of at least about 0.5 dL/g.

18. The aromatic copolyetherester of claim 2, having an inherent viscosity of at least about 0.65 dL/g.

19. The aromatic copolyetherester of claim 1, further comprising a filler.

20. The aromatic copolyetherester of claim 19, wherein the filler comprises a first set of particles having a first average particle size, and a second set of particles having a second average particle size, and wherein second average particle size is at least about 2 times that of the first average particle size.

21. The aromatic copolyetherester of claim 19, wherein the filler consists essentially of particles having an average diameter less than about 40 microns.

22. The aromatic copolyetherester of claim 20, wherein the filler consists essentially of particles having an average diameter less than about 20 microns.

23. A blend comprising the aromatic copolyetherester of claim 1 and at least one other polymer.

24. The blend of claim 23, wherein the other polymer is biodegradable.

25. The blend of claim 24, wherein the biodegradable polymer is selected from the group consisting of poly (hydroxy alkanoates), polycarbonates, poly(caprolactone), aliphatic polyesters, aromatic copolyesters, aliphatic-aromatic copolyetheresters, aliphatic-aromatic copolyamideesters, sulfonated aliphatic-aromatic copolyesters, sulfonated aliphatic-aromatic copolyetheresters, sulfonated aliphatic-aromatic copolyamideesters, and mixtures derived therefrom.

26. The blend of claim 23, wherein the other polymer is nonbiodegradable.

27. The blend of claim 23, wherein the other polymer is a natural polymer.

28. The blend of claim 27, wherein the natural polymer is a starch.

29. A shaped article formed from the aromatic copolyetherester of claim 1.

30. The shaped article of claim 29 selected from the group consisting of a film, a sheet, a fiber, a melt blown container, a molded part, and a foamed part.

31. A film comprising the aromatic copolyetherester of claim 1.

32. The film of claim 31, having a thickness from about 0.025 mm to about 0.15 mm.

33. The film according to claim 31, being an oriented film.

34. The oriented film of claim 33, wherein the oriented film is biaxially oriented.

35. The oriented film of claim 33, wherein the oriented film is uniaxially oriented.

36. A multilayer film comprising a layer comprising the aromatic copolyetherester of claim 1.

37. An article comprising a substrate and a coating on the substrate, the coating comprising the aromatic copolyetherester of claim 1.

38. The article of claim 37, wherein the coating has a thickness from about 0.2 to about 15 mils.

39. The article of claim 37, wherein the coating has a thickness from about 0.5 to about 2 mils.

40. The article of claim 37, wherein the substrate is selected from textiles, nonwovens, foil, paper, paperboard, and metals.

41. An article comprising a substrate having laminated thereon the aromatic copolyetherester of claim 1.

42. The article of claim 41, wherein the substrate is selected from the group consisting of paper, paperboard, cardboard, fiberboard, cellulose, starch, plastic, polystyrene foam, glass, metals, polymeric foams, organic foams, inorganic foams, organic-inorganic foams, and polymeric films.

43. A package comprising the article of claim 41.

44. A wrap comprising the aromatic copolyetherester of claim 1.

45. A sheet comprising the aromatic copolyetherester of claim 1.

46. The sheet of claim 45, having a thickness of at least about 0.50 mm.

47. A fiber comprising the aromatic copolyetherester of claim 1.

48. The fiber of claim 47, having a denier from about 0.1 to about 100.

49. The fiber of claim 47, having a denier from about 0.5 to about 20.

50. A fiber comprising the aromatic copolyetherester of claim 1 and at least one other polymer.

51. The fiber of claim 47 wherein the fiber comprises a blend of the aromatic copolyetherester and at least one natural fiber.

52. The fiber of claim 47, wherein the fiber is a heterogeneous fiber.

53. A foamed article comprising the aromatic copolyetherester of claim 16.

54. A shaped article formed from the aromatic copolyetherester of claim 16.

55. A shaped article of claim 54 selected from the group consisting of a film, a sheet, a fiber, a melt blown container, a molded part, and a foamed part.

56. A film comprising the aromatic copolyetherester of claim 19.

57. The film of claim 56, having a thickness from about 0.025 mm to about 0.15 mm.

58. The film according to claim 56, being an oriented film.

59. A multilayer film comprising a layer comprising the aromatic copolyetherester of claim 19.

60. An article comprising a substrate and a coating on the substrate, the coating comprising the aromatic copolyetherester of claim 19.

61. An article comprising a substrate having laminated thereon the aromatic copolyetherester of claim 19.

62. A wrap comprising the aromatic copolyetherester of claim 19.

63. A sheet comprising the aromatic copolyetherester of claim 19.

64. A foamed article comprising the blend of claim 23.

65. A shaped article formed from the blend of claim 23.

66. The shaped article of claim 65, selected from the group consisting of a film, a sheet, a fiber, melt blown container, a molded part, and a foamed part.

67. A film comprising the blend of claim 23.

68. The film of claim 67, having a thickness from about 0.025 mm to about 0.15 mm.

69. The film according to claim 67, being an oriented film.

70. A multilayer film comprising a layer comprising the blend of claim 23.

71. An article comprising a substrate and a coating on the substrate, the coating comprising the blend of claim 23.

72. An article comprising a substrate having laminated thereon the blend of claim 23.

73. A wrap comprising the blend of claim 23.

74. A sheet comprising the blend of claim 23.

75. A process for producing a package, comprising
i) providing a substrate;
ii) forming the substrate into a desired package form;
iii) providing an aromatic copolyetherester comprising an acid component, a glycol component, and optionally an effective amount of a color reducing agent, wherein the acid component consists essentially of
  a. 98.9 to 1.0 mole percent of an aromatic dicarboxylic acid component based on 100 mole percent total acid component,
  b. 1.0 to 99.0 mole percent of a hydroxyalkanoic acid component selected from lactic acid, glycolic acid and mixtures thereof, based on 100 mole percent total acid component
  c. 0.1 to 10 mole percent of a sulfonate component based on 100 mole percent total acid component, and
  d. 0 to about 5.0 mole percent of a polyfunctional branching agent selected from polyfunctional acid, glycol and mixtures thereof based on 100 mole percent total acid component; and
wherein the glycol component comprises:
  a. about 98.9 to about 1.0 mole percent of a single first glycol component selected from ethylene glycol, 1,3-propanediol and 1,4-butanediol, based on 100 mole percent total glycol component,
  b. 0.1 to 30.0 mole percent of a poly(alkylene ether) glycol component having a molecular weight in the range of from about 500 to about 4000, based on 100 mole percent total glycol component, and
  c. 0 to about 5.0 mole percent of at least one of an other glycol component based on 100 mole percent total glycol component; and
iv) laminating or coating the substrate with the aromatic copolyetherester to form the package.

76. The process of claim 75, wherein the substrate comprises a material selected from paper, paperboard, inorganic foams, organic foams, and inorganic-organic foams.

77. The process of claim 75, wherein the package form is selected from wrappers, stretch wrap films, bags, cups, trays, cartons, boxes, bottles, crates, packaging films, blister pack wrappers, skin packaging, and hinged containers.

78. A process for producing an aromatic copolyetherester, comprising providing a reaction mixture comprising an aromatic dicarboxylic acid component; a hydroxyalkanoic acid component; a single first glycol component a poly (alkylene ether) glycol component; optionally an other glycol component; a sulfonate component; optionally an effective amount of a color reducing agent, and optionally a polyfunctional branching agent; and allowing the dicarboxylic acid component, the hydroxyalkanoic acid component, the single first glycol component, the poly(alkylene ether) glycol component, the optional other glycol component, the sulfonate component, and the polyfunctional branching agent to polymerize to form an aromatic copolyetherester comprising an acid component and a glycol component, wherein the acid component consists essentially of:
  a. 98.9 to 1.0 mole percent of an aromatic dicarboxylic add component based on 100 mole percent total acid component, and
  b. 1.0 to 99.0 mole percent of a hydroxyalkanoic add component selected from lactic acid, glycolic acid and mixtures thereof, based on 100 mole percent total acid component,
  c. 0.1 to 10 mole percent of a sulfonate component based on 100 mole percent total acid component, and
  d. 0 to about 5.0 mole percent of a polyfunctional branching agent selected from polyfunctional acid, glycol and mixtures thereof based on 100 mole percent total acid component; and
and wherein the glycol component comprises:
  a. about 99.0 to about 1.0 mole percent of a single first glycol component selected from ethylene glycol, 1,3-propanediol and 1,4-butanediol,
  b. 0.1 to 30.0 mole percent of a poly(alkylene ether) glycol component having a molecular weight in the range of from about 500 to about 4000, and
  c. 0 to about 5.0 mole percent of at least one of an other glycol component based on 100 mole percent total glycol component.

79. The process of claim 75, further comprising providing the other glycol component in a quantity such that the glycol component of the polyester comprises up to 5.0 mole percent of the other glycol component, based on the total of the single first glycol component and the other glycol component.

80. The process of claim 75, further comprising providing the polyfunctlonal branching agent in a quantity such that the polyester comprises up to 5.0 mole percent of the polyfunctional branching agent, based on the total of the aromatic dicarboxylic acid component, the hydroxyalkanoic acid component, the sulfonate component and the polyfunctional branching agent.

* * * * *